(12) United States Patent
Stiansen et al.

(10) Patent No.: US 9,942,250 B2
(45) Date of Patent: Apr. 10, 2018

(54) NETWORK APPLIANCE FOR DYNAMIC PROTECTION FROM RISKY NETWORK ACTIVITIES

(71) Applicant: Norse Networks, Inc., St. Louis, MO (US)

(72) Inventors: Tommy Stiansen, Hillsborough, CA (US); Alfred Perlstein, San Francisco, CA (US); Sheldon Foss, Jr., Las Vegas, NV (US)

(73) Assignee: NORSE NETWORKS, INC., St. Louis, MO (US)

( * ) Notice: Subject to any disclaimer, the term of this patent is extended or adjusted under 35 U.S.C. 154(b) by 0 days.

(21) Appl. No.: 14/632,514

(22) Filed: Feb. 26, 2015

(65) Prior Publication Data
US 2016/0044054 A1 Feb. 11, 2016

Related U.S. Application Data

(60) Provisional application No. 62/034,001, filed on Aug. 6, 2014.

(51) Int. Cl.
*H04L 29/06* (2006.01)

(52) U.S. Cl.
CPC ...... *H04L 63/1416* (2013.01); *H04L 63/1433* (2013.01); *H04L 63/1458* (2013.01); *H04L 63/1483* (2013.01)

(58) Field of Classification Search
CPC ............. H04L 63/1441; H04L 63/1491; H04L 63/1416; H04L 63/1425; H04L 63/1433; H04L 63/1458; H04L 63/1483; H04L 2463/141; H04L 2463/142; H04L 2463/145

USPC .......................................................... 726/24
See application file for complete search history.

(56) References Cited

U.S. PATENT DOCUMENTS

| | | | |
|---|---|---|---|
| 7,451,489 B2 * | 11/2008 | Cantrell et al. | 726/25 |
| 7,490,356 B2 | 2/2009 | Lieblich et al. | |
| 7,543,740 B2 | 6/2009 | Greene et al. | |
| 7,708,200 B2 | 5/2010 | Helsper et al. | |
| 7,721,336 B1 | 5/2010 | Adjaoute | |
| 7,823,202 B1 | 10/2010 | Nucci et al. | |
| 7,835,361 B1 | 11/2010 | Dubrovsky et al. | |
| 7,890,627 B1 | 2/2011 | Thomas | |
| 7,904,959 B2 | 3/2011 | Sidiroglou et al. | |
| 7,913,303 B1 | 3/2011 | Rouland et al. | |
| 7,937,480 B2 | 5/2011 | Alperovitch et al. | |
| 7,953,852 B2 | 5/2011 | Chandrashekar et al. | |
| D649,973 S | 12/2011 | Matas | |
| 8,132,260 B1 | 3/2012 | Mayer et al. | |
| 8,201,257 B1 | 6/2012 | Andres et al. | |

(Continued)

OTHER PUBLICATIONS

Co-pending U.S. Appl. No. 29/524,595, filed Apr. 21, 2015.

(Continued)

*Primary Examiner* — Mahfuzur Rahman
*Assistant Examiner* — Narciso Victoria
(74) *Attorney, Agent, or Firm* — Wilson Sonsini Goodrich & Rosati

(57) ABSTRACT

Electronic appliances, computer-implemented systems, non-transitory media, and methods are provided to identify risky network activities using intelligent algorithms. The appliances, systems, media, and methods enable rapid detection of risky activities.

24 Claims, 30 Drawing Sheets

(56) References Cited

U.S. PATENT DOCUMENTS

| | | |
|---|---|---|
| 8,260,914 B1 | 9/2012 | Ranjan |
| 8,468,606 B2 | 6/2013 | Van De Weyer et al. |
| 8,478,708 B1 | 7/2013 | Larcom |
| 8,495,746 B2 | 7/2013 | Fissel et al. |
| 8,516,590 B1 | 8/2013 | Ranadive et al. |
| 8,533,842 B1 | 9/2013 | Satish |
| 8,533,844 B2 | 9/2013 | Mahaffey et al. |
| 8,726,379 B1 | 5/2014 | Stiansen et al. |
| 8,832,832 B1 * | 9/2014 | Visbal ............... H04L 63/1441 726/22 |
| 8,984,649 B2 | 3/2015 | Ryan |
| D740,842 S | 10/2015 | Liu et al. |
| D747,329 S | 1/2016 | Lessin et al. |
| 9,294,498 B1 | 3/2016 | Yampolskiy et al. |
| 9,317,680 B2 | 4/2016 | Carter, III et al. |
| 2007/0299777 A1 | 12/2007 | Shraim et al. |
| 2008/0080518 A1 | 4/2008 | Hoeflin et al. |
| 2008/0262991 A1 * | 10/2008 | Kapoor et al. ................. 706/20 |
| 2008/0307526 A1 | 12/2008 | Chung et al. |
| 2013/0133072 A1 | 5/2013 | Kraitsman et al. |
| 2014/0007017 A1 | 1/2014 | Sternfeld et al. |
| 2014/0067656 A1 | 3/2014 | Cohen Ganor et al. |
| 2014/0189864 A1 | 7/2014 | Wang et al. |
| 2014/0366132 A1 | 12/2014 | Stiansen et al. |
| 2015/0170288 A1 | 6/2015 | Harton et al. |
| 2015/0237061 A1 | 8/2015 | Shraim et al. |
| 2015/0261379 A1 | 9/2015 | Kneuper et al. |
| 2015/0261955 A1 | 9/2015 | Huang et al. |
| 2015/0271193 A1 | 9/2015 | Estes et al. |
| 2015/0288711 A1 * | 10/2015 | Jorgensen ........... H04L 63/1416 726/23 |
| 2015/0347545 A1 | 12/2015 | Parent et al. |
| 2015/0373044 A1 | 12/2015 | Stiansen et al. |
| 2016/0099962 A1 | 4/2016 | Peach et al. |
| 2016/0182556 A1 | 6/2016 | Tatourian et al. |
| 2016/0337315 A1 * | 11/2016 | Maestas .............. H04L 63/0236 |

OTHER PUBLICATIONS

Co-pending U.S. Appl. No. 29/519,137, filed Mar. 2, 2015.
U.S. Appl. No. 13/550,354 Office Action dated Oct. 25, 2013.
U.S. Appl. No. 14/224,822 Office Action dated Jan. 7, 2015.
U.S. Appl. No. 14/842,603 Office Action dated Apr. 22, 2016.
Co-pending U.S. Appl. No. 15/197,567, filed Jun. 29, 2016.
U.S. Appl. No. 14/842,603 Office Action dated Aug. 25, 2016.
U.S. Appl. No. 15/197,567 Office Action dated Oct. 24, 2016.
Co-pending U.S. Appl. No. 29/571,962, filed Jul. 22, 2016.
U.S. Appl. No. 15/197,567 Office Action dated Mar. 24, 2017.
U.S. Appl. No. 29/519,137 Office Action dated Mar. 23, 2016.

* cited by examiner

| | | |
|---|---|---|
| [Search] | | |

| | | |
|---|---|---|
| Botnet | High risk Network | High risk Network |
| Botnet | High risk site | High risk Site |
| Carding | Porn Content | porn |
| Carding download | Gambling | gamble |
| Fraud | Chat | chat |
| financial piracy | Web Radio | webradio |
| Financial Insider | Webmail | webmail |
| Merchants API | Warez | warez |
| Intelligence | Shopping | shopping |
| Identify Theft | Advertisment | adv |
| Cracking | Movies | movies |
| Cyber Stalking | Violence | violence |
| Arms Dealer | Music | music |
| Narcotics | Hacking | hacking |
| Narcotics | ISP | isp |
| Pharmaceutical | Drugs | drugs |
| Industrial Espionage | Aggressive | aggressive |
| Hacked | News | news |
| Stock Scams | Redirector | redirector |
| Stock Scams | Spyware | spyware |
| High Risk User | Dating | dating |
| | Dynamic | dynamic |
| | Job Search | jobsearch |
| | Tracker | tracker |
| | Models | models |
| | Forum | forum |
| | Web TV | webtv |
| | Downloads | downloads |
| | Ring Tones | ringtones |
| | Search Engine | searchengines |
| | Social Net | socialnet |
| | Update Sites | updatesites |
| | Weapons | weapons |
| | Web Phone | webphone |
| | Religion | religion |
| | Image Hosting | imagehosting |
| | Podcast | podcasts |
| | Hospitals | hospitals |
| | Military | military |
| | Politics | politics |
| | Remote Control | remotecontrol |
| | Fortine Telling | fortinetelling |
| | Library | library |
| | Cost Traps | costtraps |
| | Homestyle | homestyle |
| | Government | government |
| | Alcohol | alcohol |
| | Radio TV | radiotv |

FIG. 5B

Agent Masking using proprietary protocols in the

Appropriate geographical location relationship to target and

Having the ability to communicate in multiple protocols

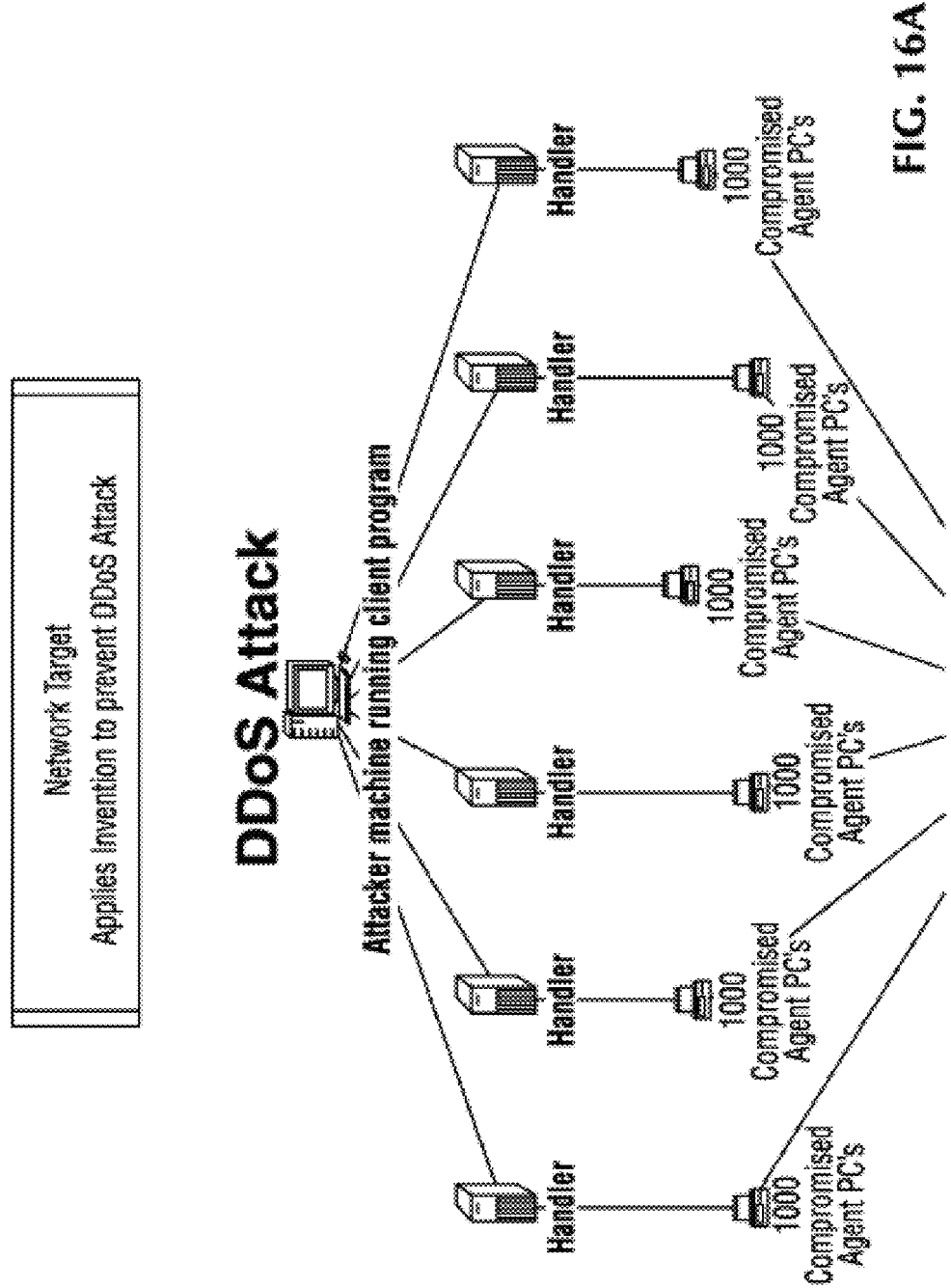

1. Live attack intelligence automatically & regularly imported into DarkWatch physical or virtual appliance.
2. User clicks on malicious URL in a browser, instant message, or social media site
3. DarkWatch matches malicious URLs or IPs to enhanced Darklist using polymorphic matching
4. Outgoing connection blocked before infection can occur

FIG. 25

Network Intel

| IP Address | Host | ISP | Organization | AS Number | AS Name |
|---|---|---|---|---|---|
| 198.27.65.12 | Ss10.tguhost.com | OVH Hosting | OVH Hosting | n/a | n/a |

Geographic Intel

| Country | Region | City | Latitude | Longitude |
|---|---|---|---|---|
| Canada | - | Montreal | 45.5 | -73.5833 |

Context Rationale

| Category Name | Protocol Name | Overall Protocol | Last Seen |
|---|---|---|---|
| Malware | Malware URL | Malware | 2013-10-29T03:25:51-07:00 |
| Passive DNS | Malware domain | DNS | 2013-10-29T02:48:14-07:00 |
| Botnet | Bot | Botnet | 2013-10-07T11:34:31-07:00 |

Device Type

| Device Type | Operating Sys | Category | Probability | Encountered |
|---|---|---|---|---|
| Server | Unknown | Corporate | 98% | 2013-11-03T01:34:47-07:00 |

Factoring

| Country Risk Factor | 0.4 | Region Risk Factor | 0 | IP Resolve Factor | -2 |
|---|---|---|---|---|---|
| Asn Record Factor | 10 | Asn Threat Factor | 5 | Bgp Delegation Factor | -2 |
| Iana Allocation Factor | -1 | Ipviking Personal Factor | -1 | Ipviking Category Factor | 102 |
| Ipviking Geofilter Factor | 0 | Ipviking Geofilter Rule | 0 | Data Age Factor | 20 |
| Geomatch Distance | 0 | Geomatch Factor | 0 | Search Volume Factor | 0 |

Malware URLs

| Category | MIME | URL | Last Seen |
|---|---|---|---|
| malware | binary | https://dls.mplayerdownloader.com/p151/FlashPlay... | 2013-10-02T01:16:51-07:00 |
| malware | binary | https://dls.xvidupdate.com/p/151/FlashPlayer/79/418/ | 2013-10-02T01:16:51-07:00 |

Passive DNS

| Domain | Malware/Total URLs | Last Seen |
|---|---|---|
| dlp.downloadyourplayer.com | 29/29 | 2013-10-08T21:50:06-07:00 |
| dls.gufairu.com | 2/2 | 2013-10-02T17:18:40-07:00 |
| dlp.totalvideoplugin.com | 1/1 | 2013-10-02T01:43:43-07:00 |
| dls.dowloadgratuiti.com | 1/1 | 2013-10-02T09:55:23-07:00 |
| dls.softgu.com | 4/5 | 2013-10-02T12:37:59-07:00 |
| dlp.getvideoplayer.com | 9/9 | 2013-10-02T12:55:16-07:00 |
| dlp.fullvideoplayer.com | 3/3 | 2013-10-02T12:55:16-07:00 |
| dls.mplayerfree.com | 12/14 | 2013-10-02T12:57:18-07:00 |

NETWORK APPLIANCE FOR DYNAMIC PROTECTION FROM RISKY NETWORK ACTIVITIES

CROSS-REFERENCE TO RELATED APPLICATIONS

This application claims the benefit of U.S. Application Ser. No. 62/034,001, filed Aug. 6, 2014, which is hereby incorporated by reference in its entirety.

FIELD OF THE INVENTION

This disclosure relates to the field of network security; specifically, the protection of computer systems and networks from electronic attack by detecting, classifying, and rating security threats presented by a given network connection in real time.

BACKGROUND OF THE INVENTION

Every computer connected to the Internet is connected in some fashion to every other computer connected to the Internet, and all of these computers are capable of communicating with each other through various layers of network communications protocols. These protocols differ widely at the physical level, with some protocols communicating through changes in voltage across copper wires, others utilizing pulses of light across fiber optic cable, and still others using radio and microwave signals broadcast through the air.

However, the key to the Internet's success is the Internet Protocol—a routing and addressing protocol layered on top of the physical protocols and ignorant of the actual physical medium used. The Internet Protocol allows any one computer to find any other computer on the Internet by knowing only one thing about the remote computer: the Internet Protocol network address associated with that remote computer. This "IP Address" is a thirty-two bit binary number, commonly represented visually in "dotted-decimal" format for improved human-readability, such as: 150.50.10.34.

Each computer on the Internet generally must have a unique IP Address. When data packets are broadcast to the Internet identifying the IP Address of the intended recipient, devices with knowledge of network topography determine where to send the packets. When the destination machine receives the data packets, it verifies that the packet is intended for it by examining the destination IP Address stored in the Internet Protocol packet header, and disregards packets that are not intended for it. Further, the datagrams must also identify the IP Address of the sending computer so that the destination device knows where to send responses. IP Addresses are so fundamental to the Internet that even novice Internet users generally are aware of them.

Additional protocols are built on top of IP to improve the reliability of network communications, such as the Transmission Control Protocol ("TCP"). TCP handles the "session" between each endpoint of network communications, breaking large chunks of data into small datagrams and sending each datagram separately, reassembling the datagrams in proper order when they are received by the destination computer, and re-transmitting lost datagrams. TCP and IP are the workhorses of the Internet and, due to their complementary functions, are often referenced in concert as "TCP/IP," though they are technically distinct protocols.

Application protocols are then layered on top of TCP/IP to enable specific types of Internet communications. For example, the HyperText Transfer Protocol ("HTTP") is used by web browsers to exchange web page between web sites and web browsers. Other such protocols include the Simple Mail Transfer Protocol ("SMTP"), which is used to transfer one-to-one messages between Internet users, what is now known as "e-mail." Other venerable open protocols include FTP, IRC, IMCP, and SNMP. Newer protocols include peer-to-peer protocols and closed protocols, some of them layered on top of these and other open protocols. Network protocols are sometimes referred to as a "protocol stack" because each higher level protocol is generally independent of the protocols "beneath" it.

When these fundamental building blocks of the Internet were engineered, virtually all computers, people, and institutions with access to the Internet could be trusted to behave themselves. In its infancy, the Internet was used almost exclusively by academics at major research institutions, the government, a handful of private corporations, and a very small number of individual users with benign intentions. The engineering goal of the Internet was physical security, not data security, and the system was designed to survive disruptions caused by damage to physical components, such as by acts of warfare or terrorism. As such, little attention was paid to data security threats originating within the network, and the protocols do not capture much information being used to identify nefarious individuals or malicious data. For example, TCP/IP captures little identifying information beyond the source and destination IP Addresses. Similarly, the designers of protocols such as SMTP, FTP, and IRC had little reason to include any form of source verification. For example, SMTP simply assumes that the sender of an e-mail is who the sender claims to be. The designers of newer protocols, notably peer-to-peer file sharing protocols, specifically engineered them to protect anonymity and frustrate attempts to identify the user.

SUMMARY OF THE INVENTION

When the Internet was commercialized during the tech bubble of the 1990s, the open nature of Internet's basic protocols was abused to flood the Internet with unwanted traffic. For example, the scourge of the 1990s was unsolicited junk e-mail known as "spam," which was blasted through open relays on the Internet which blindly and obediently forwarded SMTP traffic as they always had, creating a substantial industry in highly sophisticated spam-detection and spam-blocking software solutions. Because the authenticity of the sender is nearly impossible to validate, spam solutions generally examine the content of the e-mail to determine whether to categorize it as spam.

While spam is annoying, compared to modern threats to data security, spam now appears in hindsight like the quaint troubles of a bygone era of naiveté. An enormous amount of money now is exchanged across the world in on-line financial transactions, ranging from ordinary consumer purchases, to sales of securities, to interbank and intergovernmental transfers. Individuals also exchange private, personal information such as social security numbers, dates of birth, photos of their families, addresses and phone numbers, insurance information, credit card numbers, and bank information. Lawyers and doctors send their clients confidential and privileged information; corporate board members, government agencies, and military personnel exchange messages and documents regarding strategies and secret new projects. All of this activity takes place on top of the open TCP/IP protocols, protected only by additional security layered on top of these basic building blocks.

The opportunity for malefactors to interject themselves into the stream of on-line activity and create havoc is manifest, and the modern threats to data and network security are myriad and include: fraud, theft, corporate and sovereign espionage, hacking, virus distribution, smuggling, child pornography, drug sales, conspiracy, organized crime, terrorism, and other behaviors injurious to nations, firms, and individuals. The threat is exacerbated by the fact that sophisticated malefactors manipulate the open structure of the Internet to hide their activities. After all, law enforcement and cybersecurity personnel have only an IP Address at their disposal to identify the source of malicious data.

However, even that limited amount of information—an IP Address—assumes that the malefactor is carrying out an attack or fraudulent transaction from his own computer. In the modern day, sophisticated security threats also come in the form of "bots"—intelligent software planted on otherwise innocuous networked computers and commandeered by the malefactor without the knowledge of the infected computer's operator. The wrongdoer plants these bots on a remote machine using "Trojan horse" techniques—sneaking the malicious software past technological security, such as by taking advantage of unpatched security flaws in operating systems, and past human vigilance, such as disguising the program as a legitimate download or burying malicious code in a funny video. The infected computer then becomes a "zombie" under the wrongdoer's control, and the wrongdoer directs the zombie to carry out attacks or fraudulent transactions, thus removing the true source of the attack from the apparent source of the attack by another degree of separation and further frustrating attempts to identify and stop the malefactor.

In addition to obscuring the true source of the malicious behavior, bots also allow malefactors to carry out attacks not otherwise possible on the shoestring budget of a cybercriminal. For example, governments and large corporations usually have substantial bandwidth available to handle Internet traffic and use sophisticated load balancers to route incoming traffic to idle resources which promptly services the connection. No one individual computer on commodity hardware has the horsepower to take down this kind of corporate network. However, in some embodiments the wrongdoer utilizes a "bot herder" program to organize millions of zombies into a "botnet" and coordinate a simultaneous distributed attack on a single system. The botnet floods the victim network with traffic that appears innocent but quickly brings the system to its knees, causing legitimate users to receive a "timeout" message stating that the web site is too busy to serve them. This type of attack is known as Distributed Denial of Service ("DDoS") attack.

While a DDoS attack is frustrating to the business, major DDoS attacks are easy to spot once they begin and the victim corporation simply issues a press release informing the public of why the website is not available. Antivirus solutions for the infected zombie computers are usually developed quickly and enough of the bots are disabled to reduce the DDoS traffic to a manageable volume. Consequently, even a highly sophisticated DDoS attack is rarely successful for more than a few days, and often no more than a few hours, resulting in some interruption of normal business operations with only modest financial damage.

However, in some situations zombies and botnets also be leveraged to carry out more nefarious activities carrying a higher price tag for the individual user than merely not being able to reach a favorite web site. The bot software residing on the infected computer collects personally identifying information, such as by monitoring the keystrokes of the user and recognizing common patterns of potentially useful information such as social security numbers, phone numbers, credit card numbers, bank account numbers, addresses, dates of birth, and passwords. The zombie forwards this information to the bot herder, which redistributes the information to other bots to carry out fraudulent transactions. In some cases, the zombies work in concert to defraud a single user, but are usually more effective if each zombie acts individually by emulating an individual, specific person. Using the gathered personally identifying information, the zombies connect to commercial websites, such as banks and retailers, to withdraw or transfer money, or purchase goods or services.

The amount of damage that a sophisticated botnet inflicts increases with the price performance of commodity hardware. A graphics card in a high-end gaming computer today has more processing power than an entire server farm only a decade ago and costs only a few hundred dollars. The wide variety of methods, techniques, and sources for malware attacks creates the need to develop and deploy equally flexible, adaptive, and sophisticated countermeasures. Unfortunately, the breadth and depth of these threats is such that countermeasures tend to be complex, cumbersome, expensive, and intrusive upon legitimate use, pushing unto innocent users too much of the burden of dealing with bad actors.

Further, modern countermeasures are, at best, only partially successful. Because the only identifying information typically available for any given packet of network information is the IP Address, countermeasures focus on examining the payload to determine the threat profile it presents, if any. However, in some embodiments because the actual data transmitted over TCP is broken into separate datagrams which arrive out of sequence, the payload often is examined and analyzed until it has been received, at which point it already presents a threat. This means that a requested transaction or connection from a client must be accepted, and the data transmitted from that client must be accepted, before the threat is identified and countermeasures are marshaled. By then, it is too late.

The technology described herein can continuously collect and analyze vast amounts of live high-risk Internet traffic to identify compromised hosts, botnets, Advanced Persistent Threats (APTs), and other sources of cyber attack and online fraud. Using Norse's proprietary big data analytics platform, over 1,500 different threat and risk factors are used to deliver a live risk score and deep contextual information providing visibility into the threat profile of any public IP address. Delivered in milliseconds via a global high-speed delivery platform, the technology provides a proprietary IP address risk grading—the IPQ score—and detailed threat context that enable highly effective solutions for online fraud prevention and protection from cyber attacks including zero-day exploits and APTs.

The focus of the technology described herein is on network traffic from "places" on the Internet where bad actors are found. TOR proxies, botnets, IRC chat rooms and many other areas are a haven for attackers with ill intentions, and it is from these sources that the technology gathers most useful intelligence.

One way around this is to maintain "blacklists" of IP Addresses known to be malicious. This technique has been used on peer-to-peer ("P2P") networks to identify "polluters" who intentionally distribute bad data to frustrate the efficacy of P2P networks. Known polluters are identified in a blacklist, and P2P clients are programmed to check new connections against the blacklist and ignore connections from known polluters.

However, IP Addresses are no longer static. Innovations such as the Dynamic Host Configuration Protocol ("DHCP") allow routers to autonomously assign IP Addresses to computers within that router's subnet, effectively creating self-configuring sub-networks that require little maintenance or attention. As mobile device use becomes more prolific, the one-to-one relationship between an IP Address and a particular device is being eroded. For example, when a mobile device (e.g., iPhone, smartphones, tablets, laptops) is within range of a wireless network and joins it, the device receives a new IP Address on the subnet. When the iPhone's owner wanders away, that IP Address is recycled and assigned to another device, and when the iPhone user stops at another location, the iPhone will receive a new IP Address on another subnet. Even the WAN IP Address for a home cable Internet connection changes over time and with it, the IP Addresses for all computers on the private home network. Thus, it's not enough to blacklist a given IP Address; countermeasures must also be able to remove IP Addresses from the blacklist as they are recycled and assigned to new users presenting no threat or risk. Blacklists are also insufficient because in some embodiments an IP Address that presents a risk for one type of transaction presents no risk at all for another type of transaction.

Tracking the ebb and flow of IP Addresses is made even more difficult because of the size of the addressing space. As mentioned, an IP Address is a thirty-two bit binary number, meaning there are theoretically more than four billion possible IP Addresses. About three billion are assigned at any given time. The use of home routers to create private networks also hides additional computers behind a single address, meaning that a single IP Address assigned to a cable subscriber actually represents transactions from multiple computers accessing the Internet through a shared gateway, some of which are malicious, and others of which are not. This presents a serious processing bottleneck. Further, the four billion possible IP Addresses pertains to version four of the Internet Protocol, but in version six, the IP Address is a 128-bit number allowing for not only trillions of IP Addresses, but trillions of trillions of trillions.

Consequently, current threat mitigation systems do not focus on identifying malicious IP Addresses, but instead narrowly define potential threat factors based on the payload sent. That is, existing systems do not determine whether a particular IP Address presents a threat, but instead whether the particular payload or transaction for that IP Address is malicious. Examining a payload sometimes provides a proxy for detecting a criminal, and if the payload is not delivered, the criminal activity is not carried out. However, the sophistication and signature of attacks changes rapidly, and firms providing malware protection services struggle to keep up with the speed and flexibility of these programs. Further exacerbating the situation, it is difficult to anticipate the new ways in which payloads are hidden or disguised and existing solutions to malware are thus generally reactive, rather than proactive.

The overarching subject matter disclosed herein is a network appliance (implemented by electronics, computing devices, and/or software) able to locally monitor the data traffic of a computer network. Advantages of the subject matter disclosed herein allow a network administrator to install such an appliance to ease the tasks of network security management. When the appliance is installed, data traffic will not be diverted to a third-party service for data packet investigation. Instead, the data traffic is simply examined by the network appliance. Once a malicious component is present in the inbound/outbound traffic or an inbound/outbound URL, the data packets will be blocked or cleaned by the network appliance. One benefit is to reduce the risk during data diverting, which exposes the traffic to many unknown devices (e.g., routers, switches, servers, etc) before the traffic arrive the third-party data examiners and after the examined traffic is sent back. In particular, when the traffic is classified as safe but infected with a malicious activity during its trip back to the local network, the computers on the local network will be infected, leading to a catastrophe. Since the network appliance is able to better protect the network, unexpected network interruptions will be significantly reduced. The encountered losses (e.g., financial loss, missing transactions, data breaches, network administration burden, etc) will be minimized as well.

Below summarize the features of the subject matter. The summary should provide to the reader a basic understanding of some aspects of the invention, and it is not intended to identify critical components of the invention, nor in any way to delineate the scope of the invention. The sole purpose of the summary is to provide in simplified language some aspects of the invention as a prelude to the more detailed description represented below.

In one aspect, described herein, among other things, are appliances, systems, devices and methods directed toward the provisioning of actionable real time security intelligence data concerning the nature and degree of on-line security threat presented by an IP Address at a point in time.

In another aspect, described herein, among other things, is a system for reducing the security risk of transactions with a computer over a computer network comprising: a computer network; a first computer on the computer network having a first computer network address and communicating with a second computer on the computer network; a communication between said first computer and said second computer being indicative of a user of the first computer being engaged in a risk activity and including the first computer network address; a monitoring system on the computer network having one or more monitoring agents autonomously obtaining the first computer network address from the communication; one or more algorithms assigning a risk score to transactions over the computer network from the first computer network address, the risk based at least in part on the communication; wherein the monitoring system utilizes the risk score to inhibit a communication between the first computer and a third computer.

In an embodiment, a computer network addresses is an Internet Protocol address. The computing system includes one or more of the monitoring agents being selected from the group consisting of: a bot; a daemon; a terminate-and-stay-resident program; a honeypot; a computer; a virtual computer; a network device; a virtual network device; a spider; a P2P networking client; a P2P networking server; a packet filter; a packet sniffer; a firewall; a chat client; a chat server; a file transfer client; a file transfer server; a newsgroup reader; a newsgroup server provider; a file sharing client; a file sharing server; a web server; a web site; a web page; a translation program; a genetic algorithm; a learning algorithm; a self-replicating program; a worm; a Trojan horse.

In an embodiment, one or more of the algorithms is selected from the group consisting of: pattern recognition; inferential algorithm; planning algorithm; heuristic algorithm; logical algorithm; search algorithm; decision tree algorithm; red-black tree algorithm; Levensthein algorithm; CacheHill algorithm; PCRE algorithm; Oliver decision graph algorithm; genetic algorithm; learning algorithm; self-teaching algorithm; self-modifying algorithm.

In an embodiment, one or more of the risk activities is selected from the group consisting of: fraud; identify theft; crime; cyberbullying; denial-of-service; hacking; virus authoring or distribution; exploit authoring or distribution; digital piracy; intellectual property infringement; pornography production or distribution; controlled substance trade; terrorism; insurrection; smuggling; organized crime; civil disobedience; money laundering.

In an embodiment, the risk score is provided through an application programming interface.

In an embodiment, the risk score is in the value range 0 to 100 inclusive.

Also described herein, among other things, is a method for reducing the security risk of transactions with a computer over a computer network comprising: providing a computer network; providing a first computer on the computer network having a first computer network address and communicating with a second computer on the computer network; providing a communication between the first computer and the second computer including the first computer network address and the communication being indicative of a user of the first computer being engaged in a risk activity; obtaining the first computer network address from the communication; assigning a risk score to the first computer network address based at least in part on the communication; transmitting the risk score over the computer network to a third computer communicating with the first computer over the computer network; inhibiting communication between the first computer and the third computer; reducing the security risk of transactions with the first computer over the computer network.

In an embodiment, the computer network is the Internet.

In an embodiment, the first computer network addresses is an Internet Protocol address.

In an embodiment, the risk activity is selected from the group consisting of: commercial risk; fraud risk; identify theft risk; criminal risk; social risk; denial-of-service risk; hacking risk; virus risk; exploit risk; infringement risk; pornography risk; drug risk; terrorism risk.

In an embodiment, the risk score is provided autonomously through an application programming interface.

In an embodiment, the risk score is in the value range 0 to 100 inclusive.

In another aspect, disclosed herein is an electronic appliance on a computer network comprising: (a) a data storage configured to store a darklist, wherein the darklist comprises a plurality of data entries comprising one or more risk activities or one or more risky source addresses; (b) a receiving module configured to receive one or more data packets from a computing device; and (c) a detection module configured to (1) analyze the one or more data packets to identify a risky data component associated with the one or more risk activities or the one or more risky source addresses, wherein the analysis is based on one or more intelligent algorithms without using one or more of the following: a deep packet inspection, a signature, and a virtual network machine; and (2) block the one or more data packets, or generate one or more safe data packets by removing the risky data component. In some embodiments, the darklist is updated regularly or irregularly. In some embodiments, the darklist is updated automatically by a configuration device, wherein the configuration device is local or remote. In some embodiments, the number of data entries is greater than three million. In some embodiments, the plurality of the data entries further comprise one or more of the following: one or more Internet protocol addresses, geolocation information, one or more categories, one or more communication protocols used, and one or more risk scores. In some embodiments, the one or more risk activities comprise one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the one or more risky source addresses comprise one or more of the following: an Internet protocol address, a numerical address, a portion of a numerical address, a domain name, a portion of a domain name, and an email address. In some embodiments, the data storage is further configured to store a blacklist, wherein the blacklist is defined by a user. In some embodiments, the data storage is further configured to store a white list, wherein the white list is defined by a user. In some embodiments, the receiving module is further configured to receive simultaneously two or more data packets from two computing devices, the data packets being sent under a single communication protocol or different communication protocols. In some embodiments, the receiving the one or more data packets comprises hijacking the one or more data packets in a communication link to the computing device. In some embodiments, the receiving the one or more data packets comprises hijacking the one or more data packets of fake data being transmitted by the computing device or being sent to the computing device. In some embodiments, the one or more data packets are in an outbound traffic. In some embodiments, the one or more data packets are in an inbound traffic. In some embodiments, the analyzing the one or more data packets comprising analyzing simultaneously two or more data packets, the data packets being sent under a single communication protocol or different communication protocols. In some embodiments, the analyzing the one or more data packets comprising one or more of the following: identifying a source address of the packets; identifying or track a location of the packets; exploring a history of past analyses; associating a risk category with the packets; and computing a risk score of the packets. In some embodiments, the one or more intelligent algorithms comprise one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling. In some embodiments, the detection module is further configured to detect an infected host within the computer network, wherein the infected host comprises the risky data component. In some embodiments, the detection module is further configured to send a notification to a user upon blocking the one or more data packets. In some embodiments, the detection module is further configured to pass the one or more data packets when the detection module does not identify a risky data component associated with the one or more risk activities or the one or more risky source addresses. In some embodiments, the detection module is further configured to pass the one or more data packets when the appliance is in a failure mode. In some embodiments, the detection module is further configured to block the one or more data packets when the appliance is in a failure mode. In some embodiments, the appliance further comprises a touch screen display, the touch screen display being configured to perform one or more of the following: interacting with a user to configure the appliance, displaying real-time data, summarizing a traffic, generating an alert when blocking the one or more data packets takes place, generating an alert when the appliance is in an abnormal mode. In some embodiments, the appliance further comprises a transmission module configured to transmit the one or more safe data packets to a destination computing device. In some embodiments, the appliance further comprises an alert module configured to generate an alert when a risky activity or a risky source address is identified, the alert comprising one or more of the following: a visual alert, a sound alert, a text alert, and an email alert. In some embodiments, the computer network comprises a virtual computer network. In some embodiments, the computer network comprises a software configured computer network. In some embodiments, the computer network comprises a home network. In some embodiments, the computer network comprises an enterprise network. In some embodiments, the appliance comprises redundant data storage. In some embodiments, the appliance further comprises a power supply. In some embodiments, the appliance comprises a redundant power supply. In some embodiments, the appliance is configured to monitor one or more of the following: emails, web pages, web sites, data communication, phone calls, financial transactions, and purchase and sale activities.

In another aspect, disclosed herein is a system placed on a computer network, the system comprising: (a) a digital signal processor; (b) a data storage configured to store a darklist, wherein the darklist comprises a plurality of data entries comprising one or more risk activities or one or more risky source addresses; (c) memory and an operating system configured to execute computer instructions to create an software application, the software application comprising: (1) a receiving module configured to receive one or more data packets from a computing device; (2) a detection module configured to: (i) analyze the one or more data packets to identify a risky data component associated with the one or more risk activities or the one or more risky source addresses, wherein the analysis is based on one or more intelligent algorithms without using one or more of the following: a deep packet inspection, a signature, and a virtual network machine; and (ii) block the one or more data packets, or generate one or more safe data packets by removing the risky data component. In some embodiments, the darklist is updated regularly or irregularly. In some embodiments, the darklist is updated automatically by a configuration device, wherein the configuration device is local or remote. In some embodiments, the number of data entries is greater than three million. In some embodiments, the plurality of the data entries further comprise one or more of the following: one or more Internet protocol addresses, geolocation information, one or more categories, one or more communication protocols used, and one or more risk scores. In some embodiments, the one or more risk activities comprise one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the one or more risky source addresses comprise one or more of the following: an Internet protocol address, a numerical address, a portion of a numerical address, a domain name, a portion of a domain name, and an email address. In some embodiments, the data storage is further configured to store a blacklist, wherein the blacklist is defined by a user. In some embodiments, the data storage is further configured to store a white list, wherein the white list is defined by a user. In some embodiments, the receiving module is further configured to receive simultaneously two or more data packets from two computing devices, the data packets being sent under a single communication protocol or different communication protocols. In some embodiments, receiving the one or more data packets comprises hijacking the one or more data packets in a communication link to the computing device. In some embodiments, receiving the one or more data packets comprises hijacking the one or more data packets of fake data being transmitted by the computing device or being sent to the computing device. In some embodiments, the one or more data packets are in an outbound traffic. In some embodiments, the one or more data packets are in an inbound traffic. In some embodiments, the analyzing the one or more data packets comprising analyzing simultaneously two or more data packets, the data packets being sent under a single communication protocol or different communication protocols. In some embodiments, analyzing the one or more data packets comprises one or more of the following: identifying a source address of the packets; identifying or track a location of the packets; exploring a history of past analyses; associating a risk category with the packets; and computing a risk score of the packets. In some embodiments, the one or more intelligent algorithms comprise one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling. In some embodiments, the detection module is further configured to detect an infected host within the computer network, wherein the infected host comprises the risky data component. In some embodiments, the detection module is further configured to send a notification to a user upon blocking the one or more data packets. In some embodiments, the detection module is further configured to pass the one or more data packets when the detection module does not identify a risky data component associated with the one or more risk activities or the one or more risky source addresses. In some embodiments, the detection module is further configured to pass the one or more data packets when the appliance is in a failure mode. In some embodiments, the detection module is further configured to block the one or more data packets when the appliance is in a failure mode. In some embodiments, the system further comprises a touch screen display, the touch screen display being configured to perform one or more of the following: interacting with a user to configure the system, displaying real-time data, summarizing a traffic, generating an alert when blocking the one or more data packets takes place, generating an alert when the system is in an abnormal mode. In some embodiments, the software application further comprises a transmission module configured to transmit the one or more safe data packets to a destination computing device. In some embodiments, the software application further comprises an alert module configured to generate an alert when a risky activity or a risky source address is identified, the alert comprising one or more of the following: a visual alert, a sound alert, a text alert, and an email alert. In some embodiments, the computer network comprises a virtual computer network. In some embodiments, the computer network comprises a software configured computer network. In some embodiments, the computer network comprises a home network. In some embodiments, the computer network comprises an enterprise network. In some embodiments, the system further comprises redundant data storage. In some embodiments, the system further comprises a power supply, and/or a redundant power supply. In some embodiments, the system is configured to monitor one or more of the following: emails, web pages, web sites, data communication, phone calls, financial transactions, and purchase/sale activities.

In another aspect, disclosed herein are non-transitory computer-readable storage media encoded with a computer program including instructions executable by a processor to create an application, the application comprising: (a) a database configured to store a darklist, wherein the darklist comprises a plurality of data entries comprising one or more risk activities or one or more risky source addresses; (b) a receiving module configured to receive one or more data packets from a computing device on a computer network; and (c) a detection module configured to: (1) analyze the one or more data packets to identify a risky data component associated with the one or more risk activities or the one or more risky source addresses, wherein the analysis is based on one or more intelligent algorithms without using one or more of the following: a deep packet inspection, a signature, and a virtual network machine; and (2) block the one or more data packets, or generate one or more safe data packets by removing the risky data component. In some embodiments, the darklist is updated regularly or irregularly. In some embodiments, the darklist is updated automatically by a configuration device, wherein the configuration device is local or remote. In some embodiments, the number of data entries is greater than three million. In some embodiments, the plurality of the data entries further comprise one or more of the following: one or more Internet protocol addresses, geolocation information, one or more categories, one or more communication protocols used, and one or more risk scores. In some embodiments, the one or more risk activities comprise one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the one or more risky source addresses comprise one or more of the following: an Internet protocol address, a numerical address, a portion of a numerical address, a domain name, a portion of a domain name, and an email address. In some embodiments, the database is further configured to store a blacklist, wherein the blacklist is defined by a user. In some embodiments, the database is further configured to store a white list, wherein the white list is defined by a user. In some embodiments, the receiving module is further configured to receive simultaneously two or more data packets from two computing devices, the data packets being sent under a single communication protocol or different communication protocols. In some embodiments, receiving the one or more data packets comprises hijacking the one or more data packets in a communication link to the computing device. In some embodiments, receiving the one or more data packets comprises hijacking the one or more data packets of fake data being transmitted by the computing device or being sent to the computing device. In some embodiments, the one or more data packets are in an outbound or inbound traffic. In some embodiments, analyzing the one or more data packets comprising analyzing simultaneously two or more data packets, the data packets being sent under a single communication protocol or different communication protocols. In some embodiments, analyzing the one or more data packets comprises one or more of the following: identifying a source address of the packets; identifying or track a location of the packets; exploring a history of past analyses; associating a risk category with the packets; and computing a risk score of the packets. In some embodiments, the one or more intelligent algorithms comprise one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling. In some embodiments, the detection module is further configured to detect an infected host within the computer network, wherein the infected host comprises the risky data component. In some embodiments, the detection module is further configured to send a notification to a user upon blocking the one or more data packets. In some embodiments, the detection module is further configured to pass the one or more data packets when the detection module does not identify a risky data component associated with the one or more risk activities or the one or more risky source addresses. In some embodiments, the detection module is further configured to pass the one or more data packets when the appliance is in a failure mode. In some embodiments, the detection module is further configured to block the one or more data packets when the appliance is in a failure mode. In some embodiments, the application of the media further comprises an interface configured to perform one or more of the following: interacting with a user to configure the application, displaying real-time data, summarizing traffic, generating an alert when blocking the one or more data packets takes place, generating an alert when the application is in an abnormal mode. In some embodiments, the application further comprises a transmission module configured to transmit the one or more safe data packets to a destination computing device. In some embodiments, the application further comprises an alert module configured to generate an alert when a risky activity or a risky source address is identified, the alert comprising one or more of the following: a visual alert, a sound alert, a text alert, and an email alert. In some embodiments, the computer network comprises a virtual computer network. In some embodiments, the computer network comprises a software configured computer network. In some embodiments, the computer network comprises a home network. In some embodiments, the computer network comprises an enterprise network. In some embodiments, the media is configured to monitor one or more of the following: emails, web pages, web sites, data communication, phone calls, financial transactions, and purchase and sale activities.

In another aspect, disclosed herein is an electronics appliance on a computer network comprising: (a) a data storage configured to store a template of a risky activity; (b) a receiving module configured to receive one or more data packets from a computing device; (c) a detection module configured to (i) analyze the one or more data packets to identify a risky data component associated with the risky activity, wherein the analysis is based on one or more intelligent algorithms without one or more of the following: a deep packet inspection, a signature, and a virtual network machine; and (2) block the one or more data packets, or remove the risky data component and generate one or more safe data packets. In some embodiments, a risky activity comprises one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, and money laundering. In some embodiments, the computing device is a remote device on the computer network, a local device on the computer network, or a component of the appliance. In certain embodiments, the computing device comprises one or more of the following: a server, a desktop computer, a portable computer, a mobile device, a smartphone, a router, a switch, a hot spot, a wired computing device, and a wireless computing device. In some applications two or more computing devices use different communication protocols. In an embodiment, the one or more data packets comprise an address associated with the source of the one or more data packets. In some embodiments, the analyzing the one or more data packets comprising one or more of the following: identifying a source address of the packets; identifying or track a location of the packets; exploring a history of past analyses; associating a risk category with the packets; and computing a risk score of the packets. In some embodiments, the intelligent algorithm comprises one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling. In some cases, the appliance further comprises a transmission module configured to transmit the one or more safe data packets to the computing device. In further embodiments, the appliance further comprises an alert module configured to generate an alert when a risky activity is identified.

In another aspect, disclosed herein is an electronics appliance on a computer network comprising: (a) a communication module configured to allow the appliance to communicate with a honeypot computer or a computing device on the computer network; (b) a data storage configured to store information of risky activities, wherein the information of risky activities are provided by the honeypot computer regularly or irregularly; (c) a receiving module configured to receive one or more data packets from the computing device; (d) a detection module configured to (1) receive the information of risky activities from the data storage or from the honeypot computer; (2) analyze the one or more data packets to identify a risky data component associated with the risky activity, wherein the analysis is based on one or more intelligent algorithms without one or more of the following: a deep packet inspection, a signature, and a virtual network machine; and (3) block the one or more data packets, or remove the risky data component and generate one or more safe data packets. In some embodiments, a risky activity comprises one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, and money laundering. In certain embodiments, the computing device is a remote device on the computer network, a local device on the computer network, or a component of the appliance. In some examples, the computing device comprises one or more of the following: a server, a desktop computer, a portable computer, a mobile device, a smartphone, a router, a switch, a hot spot, a wired computing device, and a wireless computing device. In further examples, two or more computing devices use different communication protocols. In some applications, the one or more data packets comprise an address associated with the source of the one or more data packets. In various embodiments, the analyzing the one or more data packets comprising one or more of the following: identifying a source address of the packets; identifying or track a location of the packets; exploring a history of past analyses; associating a risk category with the packets; and computing a risk score of the packets. In additional embodiments, the intelligent algorithm comprises one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling. In some embodiments, an embodiment includes the appliance comprising a transmission module configured to transmit the one or more safe data packets to the computing device. In some cases, the appliance further comprises an alert module configured to generate an alert when a risky activity is identified. In certain applications, the appliance further comprises an analytics module configured to visualize and summarize risky activities happening within a period of time.

In another aspect, disclosed herein is a system on a computer network, the system comprising: (a) a digital signal processor; (b) memory and an operating system configured to execute computer instructions to create an application comprising: (1) a database configured to store a template of a risky activity; (2) a software module configured to receive one or more data packets from a computing device; (3) a software module configured to (i) analyze the one or more data packets to identify a risky data component associated with the risky activity, wherein the analysis is based on one or more intelligent algorithms without one or more of the following: a deep packet inspection, a signature, and a virtual network machine; and (ii) block the one or more data packets, or remove the risky data component and generate one or more safe data packets. In some embodiments, a risky activity comprises one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, and money laundering. In certain embodiments, the computing device is a remote device on the computer network, a local device on the computer network, or a component of the system. In an embodiment, the computing device comprises one or more of the following: a server, a desktop computer, a portable computer, a mobile device, a smartphone, a router, a switch, a hot spot, a wired computing device, and a wireless computing device. Some embodiments include two or more computing devices which use different communication protocols. In some cases, the one or more data packets comprise an address associated with the source of the one or more data packets. In some embodiments, analyzing the one or more data packets comprises one or more of the following: identifying a source address of the packets; identifying or track a location of the packets; exploring a history of past analyses; associating a risk category with the packets; and computing a risk score of the packets. In certain embodiments, the intelligent algorithm comprises one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling. In further embodiments, the software application comprises a software module configured to transmit the one or more safe data packets to the computing device. In an embodiment, the software application comprises a software module configured to generate an alert when a risky activity is identified.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5A and FIG. 5B provide examples of a classification format that is used in an embodiment for rating different IP Addresses.

FIG. 16A and FIG. 16B illustrate an embodiment of a system used to inhibit the effectiveness of a distributed denial of service attack.

FIG. 25 shows an embodiment of an interface showing various aspects of computer security information.

DESCRIPTION OF THE PREFERRED EMBODIMENTS

Figure 1:
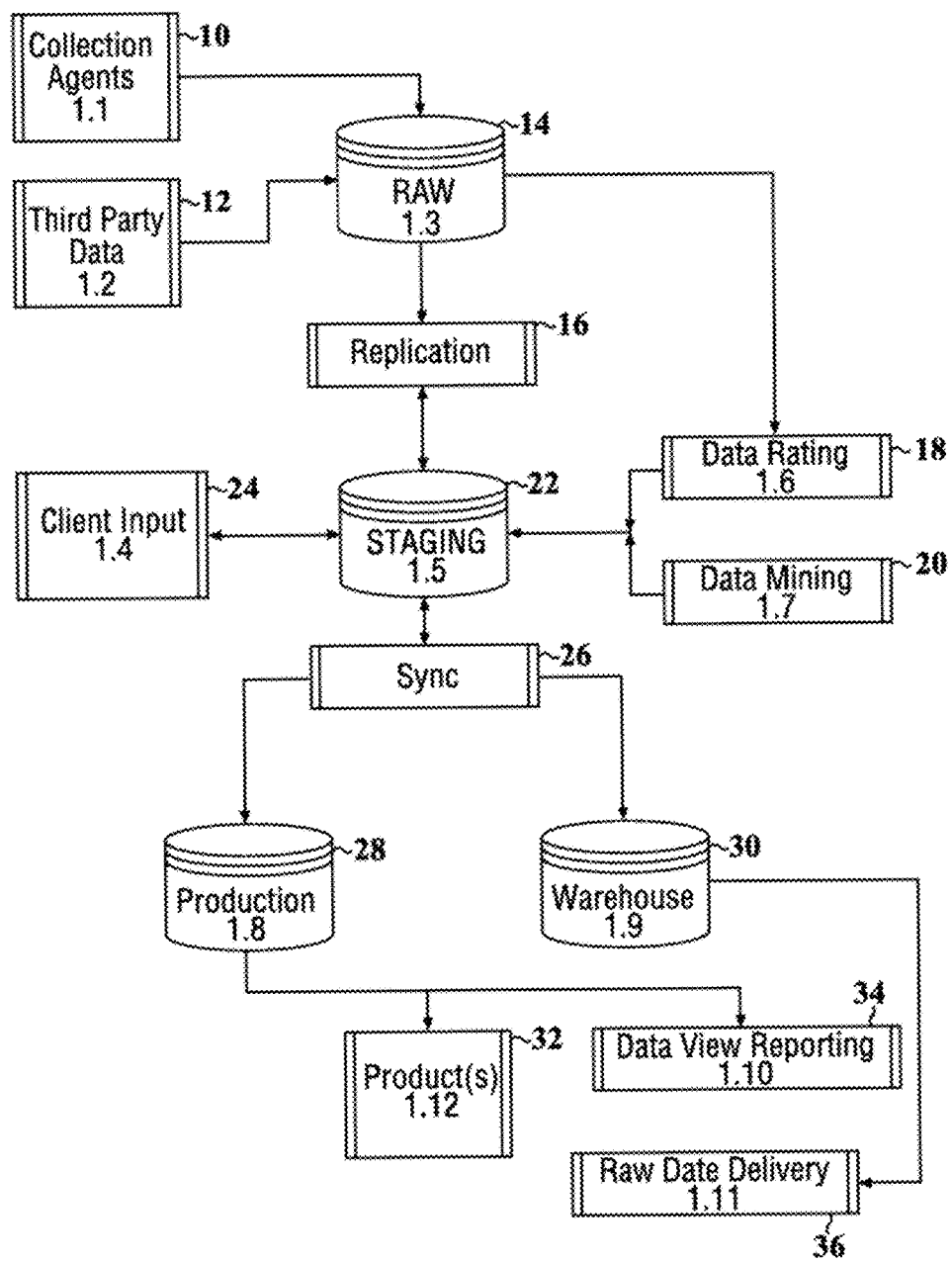
FIG. 1 provides a diagram of the architectural logic of an embodiment of a system for detecting and classifying Internet protocol addresses which are used maliciously.

The subject matter disclosed herein includes a network appliance which is installed on a computer network to monitor the inbound/outbound traffic without using a third-party service. In some embodiments, the inbound/outbound traffic comprises URLs. The appliance utilizes various intelligent algorithms to inspect data packets. When a risky activity is detected, the traffic is blocked or cleaned, and a system administrator is notified. Without using third-party inspection services, the data traffic is examined by the network appliance locally. The local inspection reduces the wandering time the data packets spend between the local network and the third-party inspection server. The reduced wandering time minimizes risk exposure. Furthermore, the network appliance assists network administrators to precisely identify the true source of malicious activities. Automatic analysis and detection by the network appliance reduce required manpower for network administration. Overall, network administrators manage networks in an easier way, and institutions will suffer much less loss.

Throughout this disclosure the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, and mainframe computers.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer in some embodiments is distributed across a number of individual machines. This distribution is functional, as where specific machines perform specific tasks; or, balanced, as where each machine is capable of performing most or all functions of any other machine and is assigned tasks based on its available resources at a point in time. Thus, the term "computer," as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable binary files, object code, compiled libraries, implementations, algorithms, or any instruction or set of instructions capable of being executed by a computer processor, or capable of being converted into a form capable of being executed by a computer processor, including without limitation virtual processors, or by the use of run-time environments or virtual machines. In some embodiments, those of ordinary skill in the art recognize that software is wired directly onto hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth and other wireless communication devices, virtual memory, storage devices and associated controllers, firmware, and device drivers.

Computer Network

Throughout this disclosure, the term "Internet" refers to the public Internet offering network interconnectivity to other computer networks, including other internets. This definition includes not only the public components of the Internet but all devices communicating or capable of communicating through the Internet and the various protocols used to communicate through the Internet. Although this disclosure specifically references the Internet Protocol as discussed above, any protocol used for addressing and routing data through an internet, or the Internet, is contemplated.

In some embodiments, the system, appliance and media described herein include a computer network. The computer network comprises a network with two or more linked computing devices. In additional embodiments, the computer network comprises one or more of the following: a virtual computer network, a software configured computer network, a home network, an enterprise network, and the Internet. The networks include wireless, wired, or both of them.

IP Address

Throughout this disclosure, the term "IP Address" generally refers to the network address or addresses associated with an endpoint for network communications as stored in the header data of an Internet Protocol packet. Those of ordinary skill in art know that the proliferation of private networks and Network Address Translation ("NAT") techniques creates ambiguity with respect to the meaning of IP Address because a device on a private network is assigned one IP Address by the edge router for its subnet yet appear to devices outside of the private network to have a different IP Address, such as the IP Address of the edge router itself. For purposes of this disclosure, IP Address of a device generally refers to the IP Address of the device as it appears to other devices not located on the same subnet as the device.

In some embodiments, a malicious IP address is embedded in an inbound or outbound URL. Alternatively, the malicious IP address is embedded in inbound or outbound traffic/data packets.

Real-Time

Throughout this disclosure, the term "real time" refers to software operating within operational deadlines for a given event to commence or complete, or for a given module, software, or system to respond. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that where the operational context is a graphical user interface, "real time" normally implies a response time of less than one second of real time, and preferably milliseconds or microseconds of real time. However, those of ordinary skill in the art also understand that under other operational contexts, a system operating in "real time" in some cases exhibits delays longer than one second.

Although the present invention is described with particular reference to the accompanying drawings, it is to be understood at the outset that it is contemplated that the present invention varies in specific detail from that illustrated and described herein while still achieving the desirable characteristics and features of the present invention. Accordingly, the description that follows is intended to be understood as a broad enabling disclosure directed to persons skilled in the applicable arts, and is not to be understood as being restrictive.

Security Threats

In certain embodiments, the risky activity comprises one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In an embodiment, the risky source address comprises one or more of the following: an Internet protocol address, a numerical address, a portion of a numerical address, a domain name, a portion of a domain name, and an email address.

Figure 11:
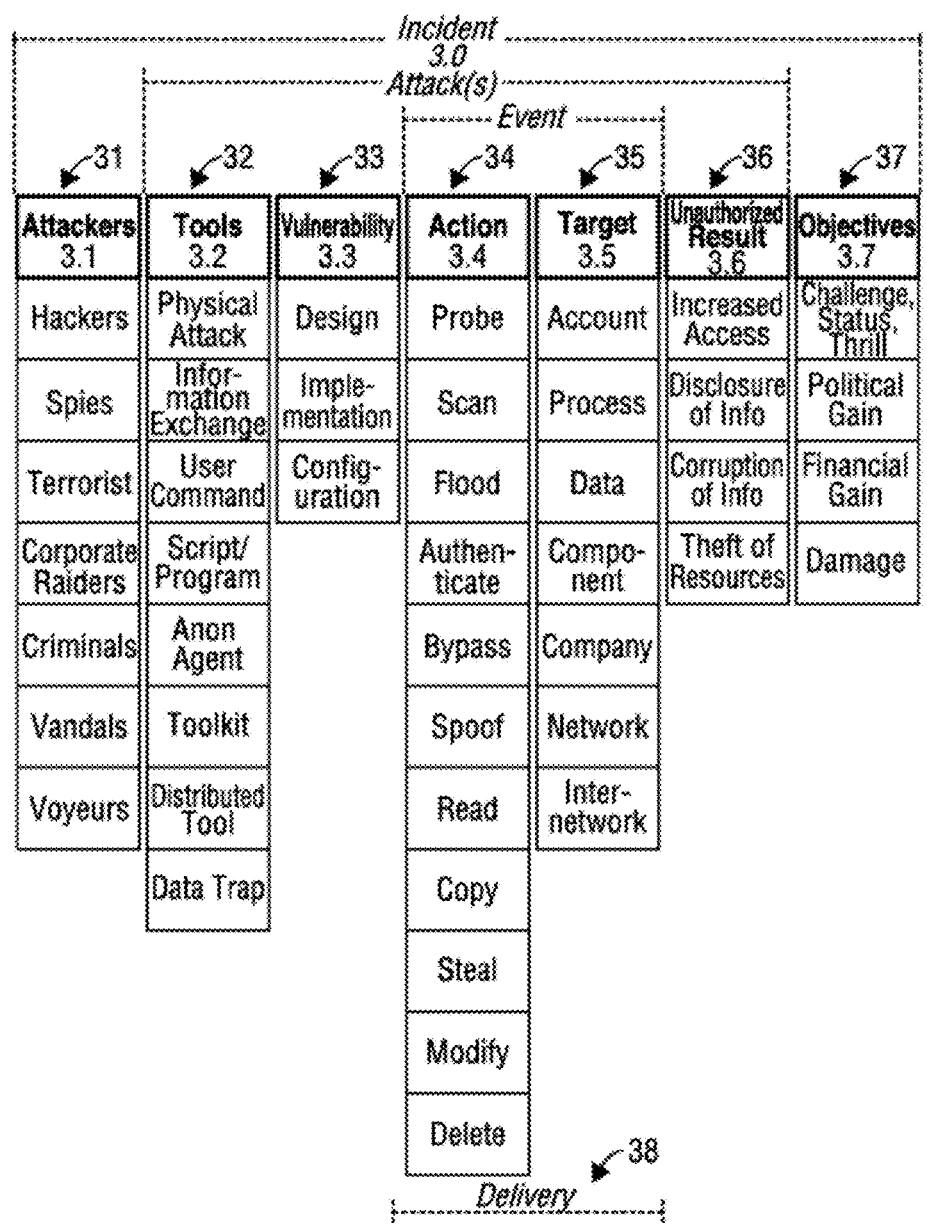
FIG. 11 provides a diagram showing a spectrum of Internet-based threat factors.

Those of ordinary skill in the art recognize that security threats over a computer network come in a limitless variety of forms, and new types of threats are generated constantly, and other threats fade from public concern. Certain types of threats are more prevalent on specific operating systems than others. As depicted in FIG. 11, security threats and attacks generally consist of an attacker (31) using tools (32) to exploit a vulnerability (33) to take certain actions (34) against a target (35), achieving an unauthorized result (36) that accomplishes an objective (37). For example, a low-grade hacker (31), sometimes colloquially called a "script kiddie," uses a port-scanner (32) and rootkit (32) to exploit configuration (33) vulnerabilities in a web server (35). If successful, the hacker (31) is authenticated (34) as a superuser and uses the compromised machine (35) to carry out further attacks, such as scans (34) of other networks (35) to search for vulnerable targets (35), to which the hacker (31) also attempts to gain access for purposes of destroying information (36) to impress his peers (37).

As shown in FIG. 11, there is a broad spectrum of factors making up any given threat, and thwarting any given attack is difficult because of all the variables involved. For example, thwarting a script kiddie (31) running a port scanner (32) requires the pre-emptive use of a firewall or packet filter which intercepts ICMP packets, but thwarting a sophisticated hacker (31) attempting a brute-force password crack (32) with an octopus bot (32) requires a different type of defense. Due to the enormous variety in attack vectors, it is difficult and expensive for an enterprise to protect itself from all possible threats without seriously crippling legitimate network operations as well. However, all of these threats share a unifying characteristic: the user (31) must access the Internet to carry out these attacks, which means the user (31) must operate over the Internet protocol, which in turn means the user's (31) device must have an IP Address and communications to and from that device must include the IP Address.

In an embodiment, the systems and methods described herein identify an IP Addresses suspected of being engaged in a risk activity. In an embodiment, the systems and methods described herein classify the nature, probability, and/or severity of that risk activity. In an embodiment, the systems and methods described herein provide data and/or reports including the IP Address, risk activity, and/or risk score for that risk activity. In one embodiment, a consumer makes a business decision on whether and how to interact with that IP Address based on the data and/or reports.

In the embodiment depicted in FIG. 1, a collection agent (10) identifies IP Address suspected of being engaged in a risk activity. IP Addresses are generally contained within an addressing space defined by a protocol specification. In an embodiment, this addressing space is the space of, or a subspace of, the IP Addresses allowed by the specification for the Internet Protocol, version four ("IPv4"). In an embodiment, this addressing space is the space of, or a subspace of, the IP Addresses allowed by the specification for the Internet Protocol, version six ("IPv6"). In another embodiment, this address space includes IP Addresses occurring on the computer network whether or not the IP Addresses are allowed by the applicable protocol specification. In an embodiment, this addressing space is the space of, or a subspace of, another protocol suitable for routing data through an internet, whether or not such protocol presently exists or is in the future developed.

While the term "IP Address" is used herein in reference to protocols presently implemented on the public Internet, any addressing mechanism and/or protocol suitable for identifying the endpoints of computer network communications and routing data between and among such endpoints is contemplated. In an embodiment, all IP Addresses in the addressing space are evaluated, but in another embodiment, a subset of the IP Addresses is evaluated.

Collection Agents

There are one or more collection agents (10). In an embodiment, a plurality of collection agents (10) works independently and/or in concert. The number of autonomous collection agents (10) which work together will necessarily depend upon the type of data gathered by those collection agents (10). By way of example and not limitation, a number of collection agents (10) working in concert participate in peer-to-peer network communications to provide actionable intelligence data about IP Addresses involved in those peer-to-peer network transmissions. In an embodiment, there are at least 100 collection agents (10). In a further embodiment, there are at least 1,000 collection agents (10). In a still further embodiment, there are at least 10,000 collection agents (10). In a still further embodiment, there are at least 100,000 collection agents (10). In a still further embodiment, there are at least 1,000,000 collection agents (10). In certain embodiments, collection agents (10) are software, hardware, or software in combination with hardware.

In the depicted embodiment of FIG. 1, one or more collection agents (10) identify a suspicious IP Address and gather data about the type of activity in which communications to and from that IP Address are involved. This intelligence is supplemented by third party data (12). Collection agents (10) are generally autonomous or semi-autonomous software having artificial intelligence to identify an IP Address which is engaged in a risk activity. In an embodiment, a collection agent (10) examines network traffic to identify indicative security risk data associated with an IP Address. For example, a collection agent (10) monitors network activity, participate in certain types of network communications, or act as an Internet server or client. In an embodiment, a collection agent (10) attempts to communicate directly with a target IP Address. In an embodiment, a plurality of collection agents (10) act as a monitoring system.

Figure 9:
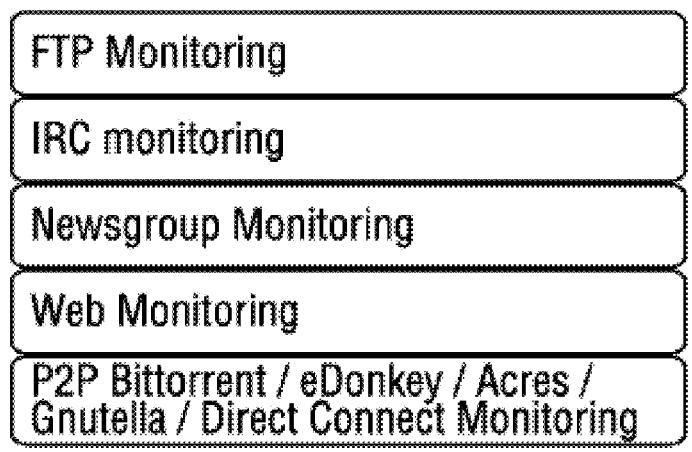
FIG. 9 provides a conceptual diagram of agent monitoring modules in an embodiment.

In an embodiment, a collection agent (10) identifies a suspicious IP Address by recording the IP Address of clients connected or transmitting packets through network servers and network services. These network servers include hardware and/or software. The services which a collection agent (10) monitors include those depicted in FIG. 9, as well as, without limitation: echo servers, daytime servers, netstat servers, quote servers, FTP servers, telnet servers, secure shell and other encrypted connection servers including without limitation servers implementing the SSL protocol, mail and associated servers including POP and IMAP and Exchange servers, SMTP servers, ICP servers, RLP servers, ARPA or WINS servers, WHOIS and NSLOOKUP servers, DNS servers, Usenet and newsgroup servers or services, BOOTP servers, DHCP servers, Gopher servers, HTTP servers, authentication servers, address and protocol translation servers, ident servers, database servers including but not limited to SQL database servers, SGMP servers, SNMP servers, graphical user interface servers including but not limited to X Servers, BGP servers, IRC servers, IPX servers, BGMP servers, LDAP servers, SLP servers, syslog servers, routing and network intelligence servers, instant messaging servers, tunneling servers, RPC servers, synchronization and coordination protocols including rsync, file system protocols including but not limited to NFS, file exchange and transfer servers including without limitation P2P networking systems.

It should be noted that new protocols and servers are constantly introduced and deprecated, and it is impossible to list all possible network servers, services, systems, and/or protocols through which a collection agent (10) collects IP Addresses and/or other risk data pertaining to an IP Address. It is specifically contemplated that a collection agent (10) identifies suspicious IP Addresses through network servers not currently in existence or use. The network servers run on any hardware or operating system, including without limitation Windows, Mac OS, UNIX, Linux, and minicomputer and/or mainframe operating systems. The network servers are open, closed, public, private, or any combination thereof. In an embodiment, a collection agent (10) is a network server. In another embodiment, a collection agent (10) is a network client. In an embodiment, a collection agent (10) monitors a network server, which is also a collection agent (10). In another embodiment, a collection agent (10) monitors a network server, which is not a collection agent (10).

In an embodiment, a collection agent (10) gathers information by examining a file. A "file" is a file stored on physical media, or a stream of related data whether or not stored. For example, a YouTube video is a "file" although the viewer watches the video in a streaming format without storing a copy. In an embodiment, a collection agent (10) gathers information about a file located on or transferred over a network. The mechanism for storage or transfer is any one of the servers, systems, services, or protocols described herein, or any other server, service, system, or protocol suitable for file transfer or storage over the Internet. By way of example and not limitation, these include FTP, P2P, web sites, mobile device applications, instant messaging clients, social networking tools, and future technological developments performing, facilitating, or allowing file transfer and/or storage over a network.

In an embodiment, a collection agent (10) gathers information about the file content, including without limitation by: examining some or all the data comprising the file content; examining some or all of the file metadata associated with the file; examining some or all of the file system or operating system metadata associated with the file; examining some or all of the hardware metadata associated with the file; examining a checksum or digest of the file.

In an embodiment, a collection agent (10) collects information about file metadata, including without limitation: filename; file size; file format; file checksum or digest; file extension; creation date/time; creation user; last modified date/time; last modified user; file path or network location; dimensional information, including without limitation resolution and pixel depth of images or videos; duration of audio and video recordings; encoding and/or compression mechanisms or formats; source library; user-defined metadata tags; transcripts; embedded descriptions; copyright and other authorship and/or attribution data; source, including without limitation type of hardware used to create, edit, or record multimedia content; access permissions; last access date/time; last access user; confidentiality information; technical metadata; business metadata; process metadata; identity metadata; legal metadata; DRM metadata; source, destination, or transmittal/broadcast metadata; database metadata; storage metadata. In an embodiment, a collection agent (10) computes or causes another process or element, which is optionally an element of present invention, to compute a checksum or digest of the content.

In an embodiment, a collection agent (10) gathers information about an IP Address by monitoring and/or analyzer natural language communications to or from that IP Address. By way of example and not limitation, a collection agent (10) examines the content of messages on chat servers, instant messaging systems, video game chat channels, text messages, bulletin board systems, web sites, discussion groups, newsgroups, and the like. In an embodiment, a collection agent (10) monitors natural language communications for keywords associated with a risk activity and records the IP Address of connections transmitting or receiving those messages. In an embodiment, a collection agent (10) transmits a message or keyword associated with a risk activity and records the IP Addresses of connections responding to those messages or keywords. The messages and/or communications is public, semi-public, or private.

In an embodiment, a collection agent (10) is a "honeypot." A honeypot is a computer or virtual computer which is intended to be attacked. A honeypot is intentionally deployed with security vulnerabilities to encourage malicious software attacks, or is robust and resilient. In an embodiment, the honeypot (10) includes one or more collection agents (10) monitoring the honeypot (10). In another embodiment, a separate collection agent (10) monitors the honeypot (10). By way of example, a collection agent (10) is an unpatched Windows system. When the system is attacked by a hacker, the IP Addresses of those attacks are recorded by the collection agent (10).

Figure 10:
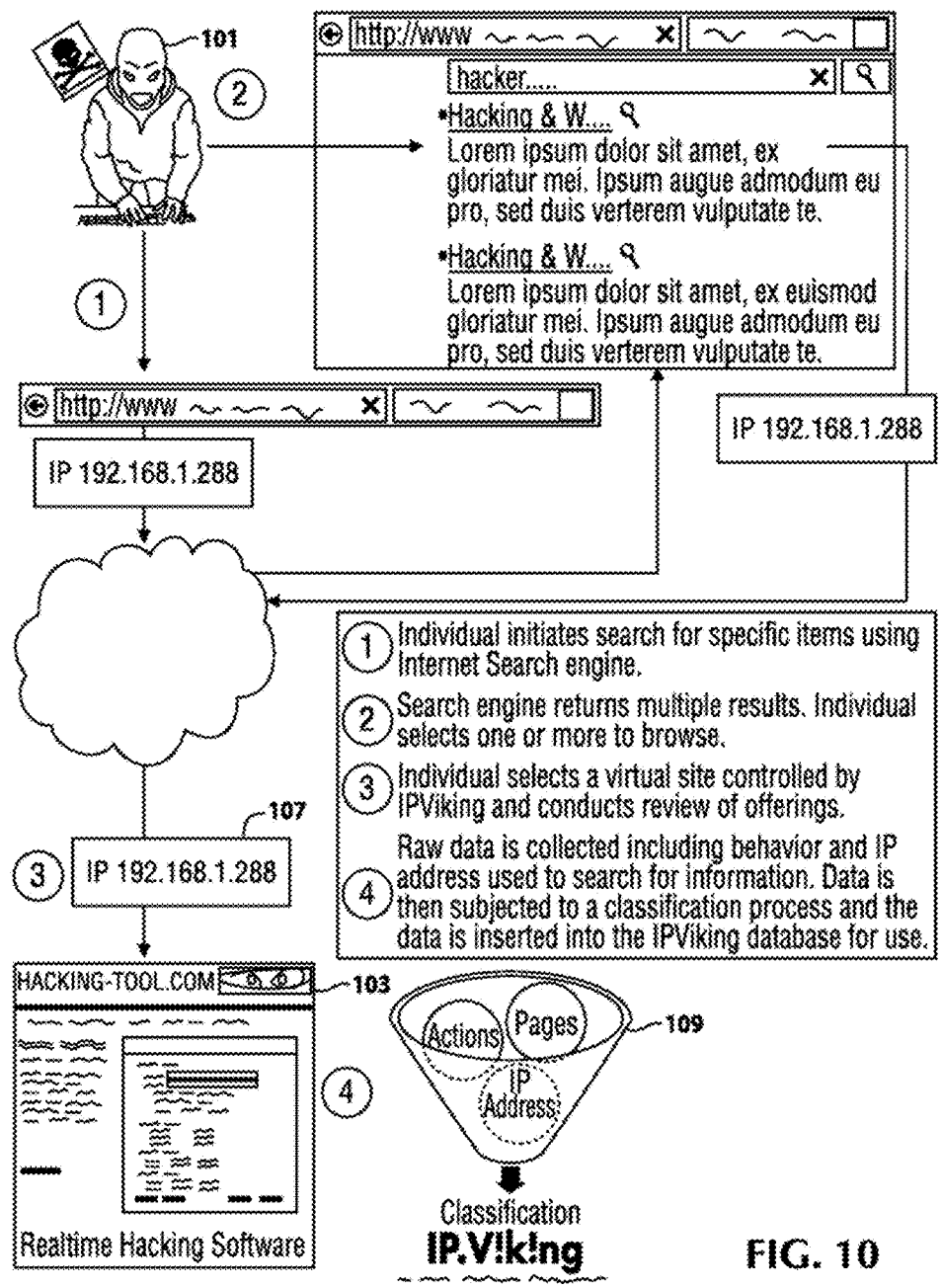
FIG. 10 provides a diagram showing how collection of IP data takes place in an embodiment.

In the embodiment depicted in FIG. 10, one or more of the collection agents (10) is a website (103). The web agent (103) is indexed by one or more third party search engines (105) such that the web agent (103) appears in search results produced by such third party search engines (105) in response to a user (101) using search terms indicative of a risk activity. By way of example and not limitation, a web agent (103) has or appears to have content concerning recipes for constructing improvised explosive devices. When a user (101) searches a third party engine (105) for bomb recipes, the web agent (103) appears in the search results. When the user (101) selects the web agent (103), the user's IP Address (107) is exposed to the web agent (103). The web agent (103) and/or another collection agent (10) records the IP Address (107), and one or more collection agents (10), which includes the web agent (103), gather risk information about that IP Address (107). The type of risk activity presented by the web agent (103) is associated with the IP Address (107) by the collection agent (10) or by an analytical module (18, 20) to classify the type of risk activity presented by the IP Address (107). For example, because the user (101) was seeking instructions for building improvised explosives, that user (101) presents a threat for terrorism or school violence. A web site agent (10) is indicative of one or more risk activities. In an embodiment, the third party search engine (105) is Google, Bing, or Yahoo. In an embodiment, the search engine (105) is a collection agent (10). By way of example and not limitation, the web agent (103) contains HTML metadata, keywords, or links including or referencing search terms indicative of a risk activity.

In the depicted embodiment of FIG. 10, a web site agent (103) or another collection agent (10) monitors a user's (101) activity on a web site agent (103). By way of example and not limitation, the web site agent (103) offers or purports to offer links, files, services, or other information concerning one or more risk activities. In an embodiment, these risk activities are the same as, or different from, the risk activity associated with the user's (101) search terms. For example, the web site agent (103) appears to contain a list of recipes for homemade bombs designed for remote detonation. When the user (101) clicks on those links, a collection agent (10), which is the web site agent (103), associates with the user's (101) IP Address (107) with one or more risk activities pertaining to homemade explosives, including but not limited to: terrorism, bullying, crime, violence, or weapons.

It is important to observe that the link on the web site (103) need not actually provide any data; it is enough to know that the user (101) wanted information that the link purported to provide. In this manner, information about the user's (101) interests and intentions are gathered without providing the user with dangerous or illegal material. By way of example and not limitation, a web site agent (103) appears to offer for download infringing digital copies of popular films, games, or songs. The web site agent (103) need not actually distribute or even have copies of such infringing materials; it is enough for a collection agent (10) to record the IP Addresses (107) of users (101) who attempted to download those infringing materials, as this information is indicative of the user (101) being engaged in risk activities associated with on-line piracy. This technique is also used by collection agents (10) to identify one or more IP Addresses interested in other risk activities as well, without actually providing access to dangerous or illegal materials, services, or activities.

In an embodiment, a collection agent (10) is an FTP agent. FTP is a standard protocol for transferring files between computers on a network and is layered on top of TCP/IP. FTP is generally considered a security risk because ordinary FTP transmissions and connections are not secure or encrypted, and FTP sites have traditionally provided open access to the public, allowing any user to store or retrieve files on the FTP server without providing any identifying information or verifiable credentials, such as name, address, telephone number, e-mail address, user name, or a password. Although FTP servers often request an e-mail address, there is no verification mechanism and public FTP servers often allow "anonymous" or fake e-mail addresses. The content of FTP servers is also generally not indexed by major search engines, placing it "off the radar" of simple and inexpensive search and detection techniques which could quickly and easily reveal networked computers full of illegal or suspicious material. Although FTP is still primarily used for legitimate purposes, these characteristics are indicative of a risk activity.

In an embodiment, a collection agent (10) is an FTP server. In another embodiment, a collection agent (10) is an FTP client. In a still further embodiment, a collection (10) monitors network traffic associated with FTP servers, sites, and/or clients. In an embodiment, an FTP site, which is an FTP agent (10), includes or appears to include content indicative of a risk activity. A collection agent (10), which is an FTP agent (10), records the IP Address of a user (101) connected to the FTP site or engaged in FTP transactions with the site. In an embodiment, an FTP agent (10) monitors a user (101) by monitoring which files or materials the user (101) attempts to access, and which risk activities are associated with that content. In an embodiment, a user (101) downloads or attempts to download files or other content from an FTP server monitored by a collection agent (10), which is the FTP server itself. By way of example and not limitation, an FTP server agent (10) contains or appears to contain digital media files infringing on copyrights. When a user (101) attempts to access or download those files, a collection agent (10) records the user's (101) IP Address (107) and associates that IP Address (107) with risk activities pertaining to digital piracy and intellectual property infringement.

In an embodiment, a user (101) uploads materials or content to an FTP server agent (10) and a collection agent (10), which is the FTP server agent (10), submits data pertaining to the uploaded content for analysis and classification of any risk activities associated with the uploaded content. In another embodiment, the collection agent (10) itself performs some or all of this analysis and classification. By way of example and not limitation, if a user (101) uploads an image file having a signature matching known child pornography images, the collection agent (10) records the IP Address (107) for that user (101) and associates the IP Address with risk activities pertaining to the distribution of child pornography.

In an embodiment, a collection agent (10) is an IRC agent. IRC is an open protocol for real time chat or text messaging, and is mainly designed for group communication organized into topical discussion forums, sometimes called channels. Many IRC servers also allow one-to-one private messages, as well as data and file transfer. IRC is built on top of TCP/IP and was originally engineered with little security or identity verification. IRC channels generally are not indexed by major search engines, placing IRC "off the radar" of simple and inexpensive search and detection techniques which could quickly and easily reveal networked computers full of illegal or suspicious material. Though a substantial amount of legitimate and innocent traffic takes place over IRC servers, IRC remains an attractive medium for individuals with nefarious intent, and use of IRC is indicative of a risk activity.

In an embodiment, a collection agent (10) is an IRC server. In another embodiment, a collection agent (10) is an IRC client. In a still further embodiment, a collection agent (10) monitors network traffic associated with IRC servers, sites, and/or clients. In a still further embodiment, a collection agent (10) monitors messages, interactions, and communications on an IRC server, including without limitation: chat on public or private channels; private messaging; file exchange; connection and disconnection times; user handles; source and destination IP Addresses. In an embodiment, an IRC site, which is an IRC agent (10), includes or appears to include content indicative of a risk activity. A collection agent (10), which is an IRC agent (10), records the IP Address of a user (101) connected to an IRC site or engaged in IRC transactions, including file transfers and natural language communications. In an embodiment, an IRC agent (10) monitors a user's (101) activity such as, without limitation, by monitoring which files or chat channels the user (101) attempts to access, and which risk activities are associated with those files or chat channels. In an embodiment, a user (101) downloads, exchanges, or attempts to download or exchange files or other content through an IRC server monitored by a collection agent (10), which is the IRC server itself. By way of example and not limitation, an IRC server agent (10) contains chat channels for discussion of cracking digital rights management technologies. When a user (101) joins those chat channels, and/or transmits or receives messages or natural language communications about that topic, a collection agent (10) records the user's (101) IP Address (107) and associates that IP Address (107) with risk activities pertaining to digital piracy and intellectual property infringement.

In an embodiment, a user (101) uploads or transmits natural language communications to an IRC server and a collection agent (10) submits to analytical modules (18, 20) data pertaining to the uploaded content for analysis and classification of any risk activities associated with the uploaded content. In another embodiment, the collection agent (10) itself performs some or all of this analysis and classification. By way of example and not limitation, if an IRC user (101) transmits a communication which matches keywords known to be used by those engaged in the transmission or production of child pornography images, a collection agent (10) records the IP Address (107) for that user (101) and associates the IP Address (107) with risk activities pertaining to the distribution of child pornography.

In an embodiment, a collection agent (10) is a newsgroup agent. A Usenet newsgroup is generally a repository of binary or plain text information posted by users, ostensibly for the purpose of discussion. Particular client software is generally required for connecting to a newsgroup and examining its content, and newsgroup participation is largely confined to individuals who are familiar and comfortable with older Internet technologies. Newsgroups allow the distribution of binary files, but because Usenet was engineered with the transmission of text in mind, binary data is usually encoded using a technique called uuencode, and a single file is split up over multiple postings, requiring the user to manually reassemble the uuencoded data and then uudecode the data using a specialized program. In the modern day, news clients are able to automatically perform this decoding and encoding. Newsgroups disproportionately attract individuals with nefarious intent, and are indicative of a risk activity.

In an embodiment, a collection agent (10) is a newsgroup server or service provider. In another embodiment, a collection agent (10) is a newsgroup client or participant. In a still further embodiment, a collection agent (10) monitors network traffic associated with newsgroup servers, service providers, sites, and/or clients. In an embodiment, a newsgroup hierarchy monitored by a collection agent (10) includes or appears to include content indicative of a risk activity. A collection agent (10) records the IP Address of a user (101) connecting to a newsgroup or engaged in newsgroup transactions, including file transfers and natural language communications. A collection agent (10) monitors a user's (101) activity such as, without limitation, by monitoring which files or materials the user (101) attempts to access, and which risk activities are associated with that content. In an embodiment, a user (101) downloads, exchanges, or attempts to download or exchange files or other content through a newsgroup monitored by a collection agent (10), which is the newsgroup service provider itself. By way of example and not limitation, a newsgroup contains or appears to contain files infringing on intellectual property rights or discussion about cracking digital rights management technologies. When a user (101) transmits or receives messages or files about that topic, a collection agent (10) records the user's (101) IP Address (107) and associates that IP Address (107) with risk activities pertaining to digital piracy and intellectual property infringement.

In an embodiment, a user (101) uploads or transmits materials or content to a newsgroup and a collection agent (10) submits data pertaining to the uploaded content for analysis and classification of any risk activities associated with the uploaded content. In another embodiment, the collection agent (10) itself performs some or all of this analysis and classification. By way of example and not limitation, if a newsgroup user (101) transmits a natural language communication which matches keywords known to be used by those engaged in the transmission or production of child pornography images, a collection agent (10) records the IP Address (107) for that user (101) and associates the IP Address (107) with risk activities pertaining to the distribution of child pornography.

In an embodiment, a collection agent (10) participates in a P2P network. P2P networks were developed in the late 1990s and early 2000s as a response to lawsuits shutting down file sharing programs primarily used to carry out copyright infringement, notably Napster. A number of other file sharing services have come and gone over the years, including Gnutella, eDonkey, Morpheus, and Limewire. These file sharing repositories were vulnerable to legal attack because a successful lawsuit shutting down the central repository generally spelled the end of file sharing through that system. However, with true P2P networks, file sharing does not depend upon a central repository; rather the individual clients participating in the P2P network speak directly to each other and exchange data directly with each other. In a P2P network, any given participant downloading a file downloads different pieces of that single file from dozens or hundreds or even thousands of different users, rendering it difficult to put a stop to the file sharing. Further, it is also difficult to detect participation in a P2P network because any given data packet transmitted through that system will contain at most a tiny fraction of a much larger file, such as an audio file or a movie. P2P networks require little to no user verification, authentication, or other security, one need only download and install the appropriate client software, and begin to use it anonymously. As a consequence, certain types of illegal activity are rampant on P2P networks, notably digital piracy. Additionally, the anonymous and distributed nature of P2P networks is conducive towards the distribution of criminal material, such as child pornography. P2P networking systems include, but are not limited to: bittorrent, and Ares Galaxy, the de facto successor to Gnutella.

In an embodiment, a collection agent (10) participates in a P2P network, including without limitation as a: web site, server, client, user, system, network, reference, relay, seeder, leecher, host, or anonymizer. In a still further embodiment, a collection agent (10) monitors network traffic associated with P2P servers, service providers, sites, and/or clients. In an embodiment, a P2P network or site monitored by a collection agent (10) includes or appears to include content indicative of a risk activity. A collection agent (10) records the IP Address of a user (101) connecting to a P2P service or engaged in P2P transactions, including file transfers and natural language communications. A collection agent (10) monitors a user's (101) activity such as, without limitation, by monitoring which files or materials the user (101) attempts to access, and which risk activities are associated with that content. In an embodiment, a user (101) downloads, exchanges, or attempts to download or exchange files or other content through a P2P network monitored by a collection agent (10). By way of example and not limitation, a P2P network contains files infringing on intellectual property rights. When a user (101) transmits, receives, or attempts to transmit or receive such infringing files, a collection agent (10) records the user's (101) IP Address (107) and associates that IP Address (107) with risk activities pertaining to digital piracy and intellectual property infringement.

In an embodiment, a user (101) uploads or transmits materials or content to a P2P network and a collection agent (10) submits data pertaining to the uploaded content for analysis and classification of any risk activities associated with the uploaded content. In another embodiment, the collection agent (10) itself performs some or all of this analysis and classification. By way of example and not limitation, if a P2P user (101) transmits a file whose signature is known to be associated with a child pornography image, a collection agent (10) records the IP Address (107) for that user (101) and associates the IP Address (107) with risk activities pertaining to the distribution of child pornography.

Figure 8:
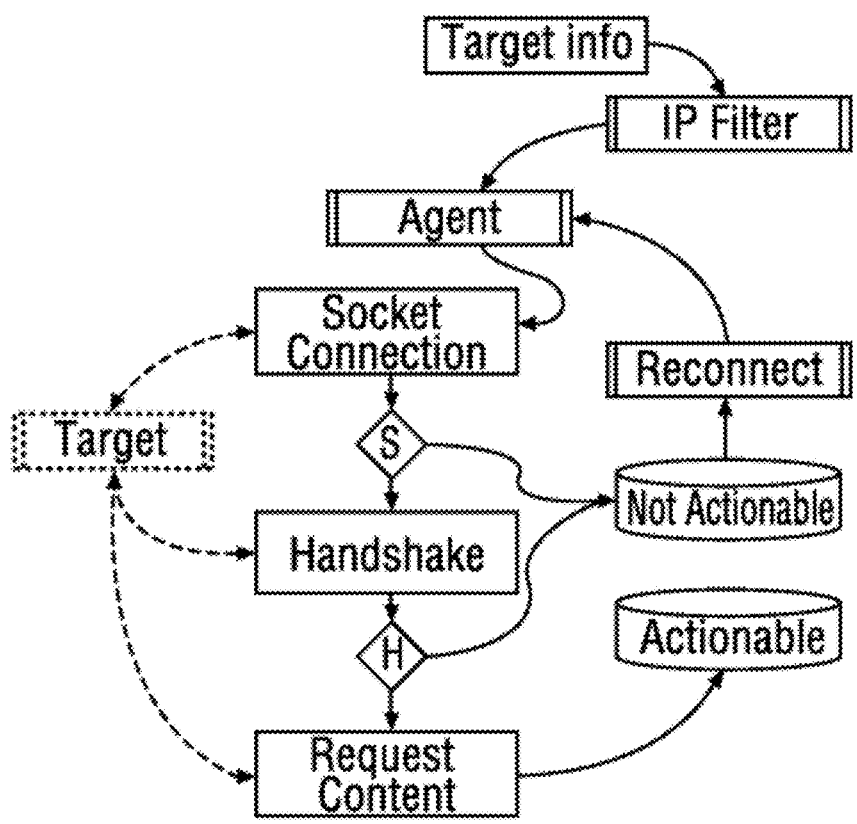
FIG. 8 provides a diagram of agent logic from an embodiment of a virtual agent.

In the embodiment depicted in FIG. 8, a collection agent (10) attempts direct connection monitoring with an IP Address identified as a potential security risk. Network connections over TCP/IP generally require two pieces of information to "talk to" a remote machine: the IP Address, and a port number. The port number indicates which service provided by the remote computer the connecting machine wishes to interact with. Certain port numbers are conventionally associated with specific services, such as running web servers on port 80. In an embodiment, a collection agent (10) attempts to open a socket connection with an IP Address on a port. If that connection fails, the fact that the IP Address does not accept connections on that port is indicative of a risk activity, or lessens the probability of a risk activity. In another embodiment, a failed connection is disregarded. Whether a failed connection on a given port is indicative depends not only on the embodiment, but on the nature of the target and the service associated with the port. By way of example and not limitation, the fact that an individual's desktop computer is not accepting connections on port 80 generally is not suspicious because desktop computers do not normally provide web hosting services.

If a collection agent (10) successfully connects to a target IP Address at a port, the collection agent (10) attempts to communicate with the remote host using a protocol. This protocol is the protocol conventionally associated with the port, or another protocol. If the remote host does not properly respond, the collection agent (10) record this as indicative of a risk activity, or, depending on the nature of the failure, simply disregard the incidence, such as a misconfigured system. By way of example, and not limitation, a server running on port 80 which does not appear to recognize or communicate using HTTP is indicative of a risk activity. In another embodiment, the ability of a remote host to communicate using a protocol which is not generally associated with a given port is indicative of a risk activity. For example, a web server running on a port in the ephemeral port range is indicative of a risk activity, as it suggests a web server avoiding attention.

In an embodiment, combinations of these and other collection agents (10) works cooperatively and independently to gather intelligence information. By way of example and not limitation, one collection agent (10) on a newsgroup post a bogus file purporting to contain a "theater cam" copy of a recently released film, and another collection agent (10) records the IP Addresses of users who respond to that post or attempt to download it. Another collection agent (10) then attempts direct connections with one or more of those IP Addresses using well-known ports for services such as FTP and HTTP. Where connections are made, the collection agents (10) navigate the remote systems in search of files matching the signatures of widely-distributed infringing files, and other collection agents (10) monitor P2P networks for traffic to and from those IP Addresses. Other collection agents (10) posing as web sites hosting infringing content or offering access to P2P networks hosting infringing content also records hits from these IP addresses. As these agents (10) yield and store evidence of infringing materials associated with certain IP Addresses, those IP Addresses is highly rated for copyright infringement risk by the rating engine (18) and/or data mining engine (20).

Although certain examples of particular implementations of collection agents (10) using certain technologies and/or protocols have been described in detail herein, it is specifically contemplated that collection agents (10) take the form of other types of servers, clients, service providers, systems, networks, protocols, tools, utilities, software, and/or hardware. The specific explanation of some types of collection agents (10) should not be understood to exclude other types of collection agents (10).

In an embodiment, a collection agent (10) need not actually provide or facilitate the transfer of any data or files. Generally speaking, it is enough to know that a user (101) wanted data, files, or materials that the collection agent (10) appears to facilitate or provide. In this manner, information about the user's (101) interests and intentions is gathered without providing the user (101) with dangerous or illegal materials. In an embodiment, a collection agent (10) inhibits further distribution of dangerous or illegal content, such as by deleting or polluting files, applying watermarks to files, or transmitting garbage or noise.

It is important to note that these technologies have legitimate uses. They are indicative of a risk activity because they tend to attract use by individuals interested in engaging in malicious or criminal activity. These technologies generally share several features in common, notably lack of user identification or verification, open protocols, exclusion from search engine indexing, and use of specialized clients.

In the embodiment depicted in FIG. 1, a collection agent (10) is autonomous. Autonomous collection agents (10) generally operate without direct human input or control. An autonomous collection agent (10) gathers information and performs its other functions, which are discussed elsewhere in this disclosure, using artificial intelligence and algorithms. Autonomous collection agents (10) will, for example, automatically provide gathered information to analytical modules (18, 20), as depicted in FIG. 1.

In an embodiment, a collection agent (10) is semi-autonomous. Semi-autonomous collection agents (10) operate generally independently, but their behavior is altered, tweaked, reconfigured, or otherwise modified as necessary without having to redeploy or rebuild the collection agent (10) in response to changing conditions or operational needs. For example, the collection agent (10) is software which is configured to receive and recognize certain signals from a master control program, such as a spider or friendly bot herder, which directs a collection agent (10) to, by way of example and not limitation: activate, de-activate, hibernate, change targets, focus on a specific target, ignore a specific target, terminate, self-destruct, or transmit or submit gathered data for analysis.

In an embodiment, autonomous and semi-autonomous collection agents (10) is augmented and supplemented by human agents (10) who monitor communications and data. In a still further embodiment, such human agents (10) launch and maintain additional autonomous or semi-autonomous collection agents (10), or to provide information directly to the rating system (18), based on security intelligence data gathered by the human agents (10).

In an embodiment, a collection agent (10) is implemented through a virtual computer. In another embodiment, a virtual collection agent (10) is created, constructed, and/or maintained using host systems located within secured facilities. In a still further another embodiment, a virtual collection agent (10) is created, constructed, and/or maintained through the use of "friendly bot herders," spiders, or similar programs designed to control and coordinate multiple collection agents (10). In a still further embodiment, a collection agent (10) utilize an existing bot network, including without limitation a bot network intended for illegitimate or malicious purposes.

In an embodiment, a collection agent (10) identifies and/or classifies invalid Internet traffic. By way of example and not limitation, a collection agent (10) identifies bogon IP Addresses. A "bogon" IP Address is an IP Address that should not exist. Bogon IP Addresses is created inadvertently or intentionally, and are generally indicative of a risk activity. In another embodiment, a collection agent (10) identifies "Martian packets." Martian packets are Internet Protocol packets whose source or destination addresses are not possible under the conventions, standards, specifications, rules and/or operational guidelines of the Internet. By way of example and not limitation, a collection agent (10) identifies packets on the public Internet purporting to originate from a private netblock, such as 192.168.0.0/16, or packets originating from localhost IP Addresses, such as 127.0.0.1, but appearing on a non-loopback interface. In an embodiment, a collection agent (10) identifies a legitimate and/or valid source and/or destination IP Address for a bogon IP Address and/or Martian packet. In an embodiment, a collection agent (10) identifies a legitimate and/or valid source and/or destination netblock for a bogon IP Address and/or Martian packet.

Data Analysis

In the embodiment depicted in FIG. 1, the system gathers security intelligence data through third party sources (12). It is impossible to enumerate and describe all possible third party sources of data (12) which is utilized, as new threats emerge daily, and new sources of usable third party data (12) come and go. Generally speaking, third party data (12) includes data provided by the Internet Assigned Numbers Authority ("IANA") and Internet access and service providers ("ISPs"), including but not limited to: dial-up providers, DSL providers, cable Internet providers, wireless networking services, microwave providers, radio wave providers, satellite providers, ISDN providers, T1 and T3 providers, fiber optic providers, direct Ethernet providers, frame relay providers, ATM providers, tier two providers, and tier three providers. In an embodiment, the type of data (12) produced by these and other sources pertains to valid IP Addresses in the addressing space for a given network or sub-network. These data sources are used, for example, to identify Martian packets and bogons. Any method is used to collect this third party data (12), including without limitation by subscription, by request, or through the use of automated or semi-automated processes such as collection agents (10). In an embodiment, third party data (12) is stored in a database (14).

Figures 6, 7:
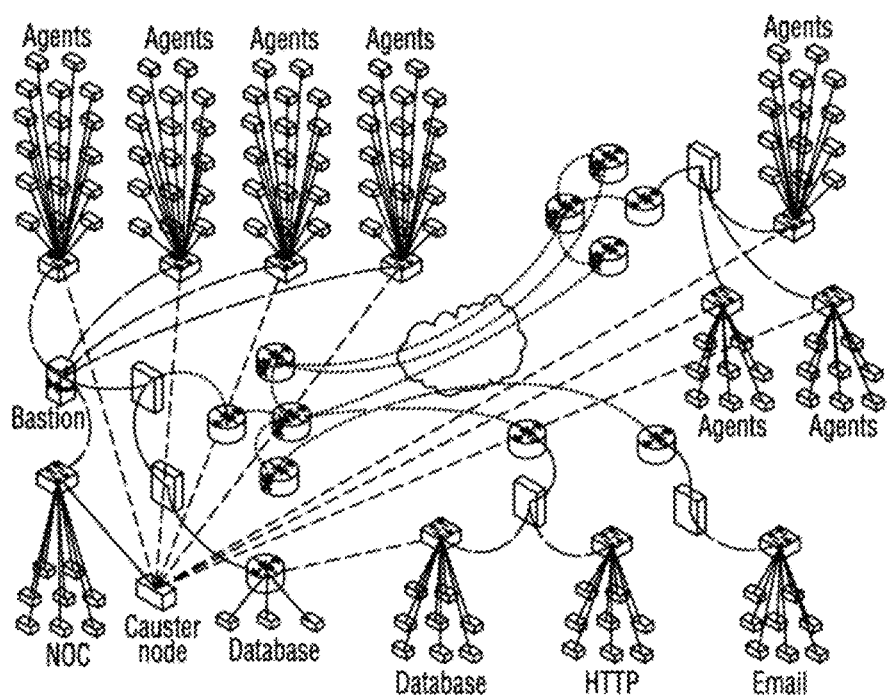
FIG. 6 provides a conceptual diagram of the operation of collection agents in an embodiment.
FIG. 7 provides a conceptual diagram of agent anonymity in an embodiment.

In an embodiment, a central control program tracks IP Addresses belonging to collection agents (10) and causes collection agents (10) to disregard each other as potential security threats. The collection agents (10) generally are anonymous and indistinguishable from ordinary Internet users. By purposefully obscuring the nature of the collection agent (10), persons engaged in risk activities are not discouraged from interacting with them, believing them to be "safe" connections or other wrongdoers complicit in malicious attacks and criminal conduct. FIG. 7 provides some of the techniques utilized to obscure and mask the nature of collection agents (10).

In an embodiment, the collection agents (10) provide the security risk data to one or more analytical modules (18, 20). These modules (18, 20) are discussed in detail elsewhere in this disclosure, but generally include, without limitation: methods, systems, and software to perform statistical analysis, categorization, rating, and data mining. In an embodiment, the collection agents (10) provide the data by storing it in a database (14) accessible to the analytical modules (18, 20), but the specific format and mechanism for providing the gathered intelligence to these modules will necessarily vary from embodiment to embodiment.

In an embodiment, a database system (e.g., 14, 22, 28, 30) is of any degree of complexity, including but not limited to a commercial enterprise-grade relational database management solution, a flat file, a series or set of flat files, or memory-mapped binary file, or a series or set of memory-mapped binary files. In an embodiment, the database is a commercial or proprietary database, such as but not limited to: Oracle, MS Access, SQL Server, DB2, Adabas, FoxPro, or Sybase. In another embodiment, the database is an open source or free software database, or a derivation thereof, such as but not limited to: MySQL, PostgreSQL, or SQLite. In an embodiment, more than one database system is utilized. The particular database will vary depending upon the amount of storage needed, the processing power required, and the operating system or operating systems in the environment. In an embodiment, the database is written from scratch or adapter from an existing database system.

In an embodiment, the collection agents (10) continuously transmit newly gathered information for analysis and processing. This is done by storing in a database (14) or through some other means. In another embodiment, the collection agents (10) cache or store gathered intelligence and transmit security risk intelligence for analysis and processing on a periodic basis, in response to signals, events, or instructions. In a further embodiment, both techniques are utilized.

In an embodiment, the collection agents (10) provide the data to the analytical modules (18, 20) through a means other than by storing the data in a database (14), including, but not limited to: shared memory; a network socket connection; a domain socket; interprocess communications mechanisms; a message queue; or through some other message passing protocol or mechanism. In an embodiment, the collection agents (10) provide the data collected directly to the analytical modules (18, 20). A combination of techniques is utilized, such as by a collection agent (10) storing to a raw database (14) by connecting over a network socket to a database server or another device connected to the database server.

In the depicted embodiment of FIG. 1, data collected by collection agents (10) is primarily stored in a "raw" database (14) prior to being processed or analyzed. This "raw" database effectively contains a snapshot of all security intelligence data gathered by the collection agents (10) at any point in time, reflecting a holistic real-time view of all security threats known to the system as of that moment in time. In an embodiment, this "raw" database (14) is replicated (16) for backup, archival, and business continuity purposes. In another embodiment, the "raw" database (14) is replicated (16) into a "staging" database (22). The replication is done through any known means of duplicating a database, and the specific means will necessarily depend on the operating system, database system, overall system architecture, and other tools for migrating data.

The systems and methods discussed herein, among other things, analyze the gathered intelligence to assess the risk profile presented by a given IP Address at a given point in time. In an embodiment, the raw data associated with each IP Address is stored in a database (14) and examined by various rating processes (18, 20) to arrive at an assessment of the risk presented by that IP Address with respect to specific types of transactions. This assessment is sometimes referred to herein as a "score" or "risk score." In an embodiment, this score is a numerical value ranging from 0 to 100, with a risk score of 0 representing the least risk for a particular risk category and a risk score of 100 representing the most risk for a particular risk category.

In an embodiment, the rating process (18) uses an algorithm, or set of algorithms, to determine the categories of risk activity for an IP Address, the likelihood of a category of risk activity for an IP Address, and/or the severity of threat presented for a category of risk activity for an IP Address. In an embodiment, one or more algorithms include an AI or machine learning algorithm. A plurality of algorithms operates independently or in concert. In a further embodiment, a plurality of algorithms interoperates as a system and develops machine learning over time. In a still further embodiment, a plurality of algorithms learns and teaches itself. In a still further embodiment, a plurality of algorithms learns and teaches itself by examining its own past performance. By way of example and not limitation, a plurality of algorithms teach itself by using its own data output (32) as one or more predicates, postulates, assumptions, or other knowledge or input into the rating engine (18).

Figure 3:
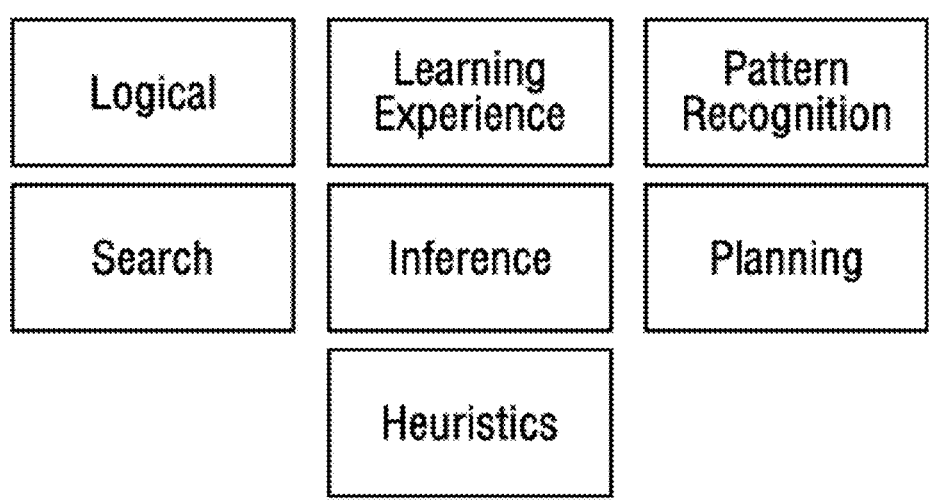
FIG. 3 provides a conceptual diagram of various types of artificial intelligence that are optionally used in an embodiment.
Figure 4:
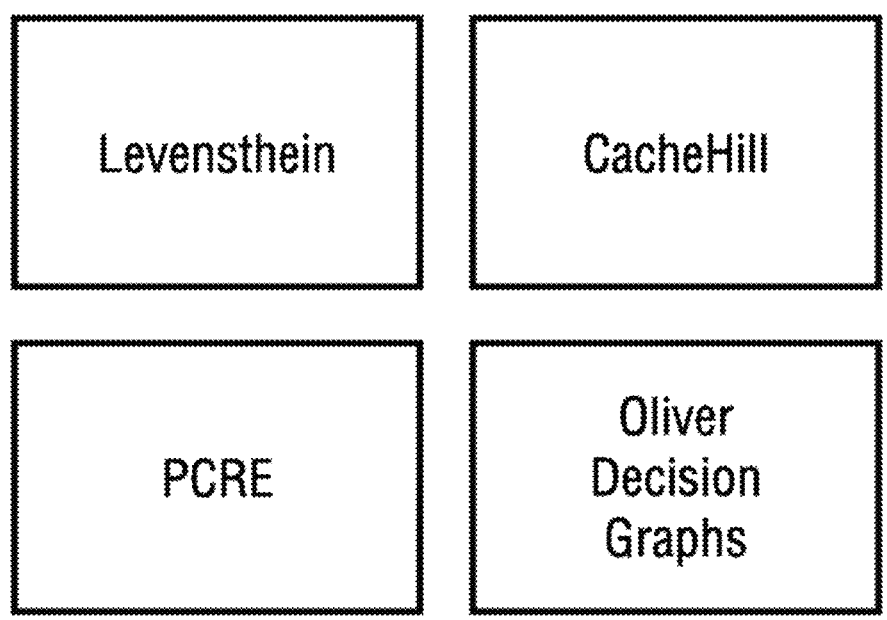
FIG. 4 provides a conceptual diagram of rating algorithms that are optionally used in an embodiment.

FIG. 3 and FIG. 4 provide a conceptual overview of some of the types of AI techniques and methodologies used within the rating engine (18). In an embodiment, the rating process (18) performs risk evaluation of the raw data (14) based on various factors and methodologies including without limitation: logic; learning; experience; pattern recognition; searching; inferential; planning; heuristic; Levensthein; CacheHill; PCRE; Oliver decision graphs; or any combination thereof. In addition to the depicted algorithms, an embodiment utilize, without limitation: machine learning; inductive logic; decision trees; association rules; neural networking; genetic programming; clustering; Bayesian networking; representation learning; support vector learning; reinforcement learning; supervised learning; unsupervised learning; transduction learning; self-modifying learning; self-teaching learning; or any combination thereof. In an embodiment, algorithms is utilized that are not presently known but which would be suitable to the analytical framework of the rating system (18). In an embodiment, one or more algorithms provide a look-back to prior decisions made by the system, and/or a look-forward to apply lessons learned in those prior decisions to future decisions made by the system.

Figure 2:
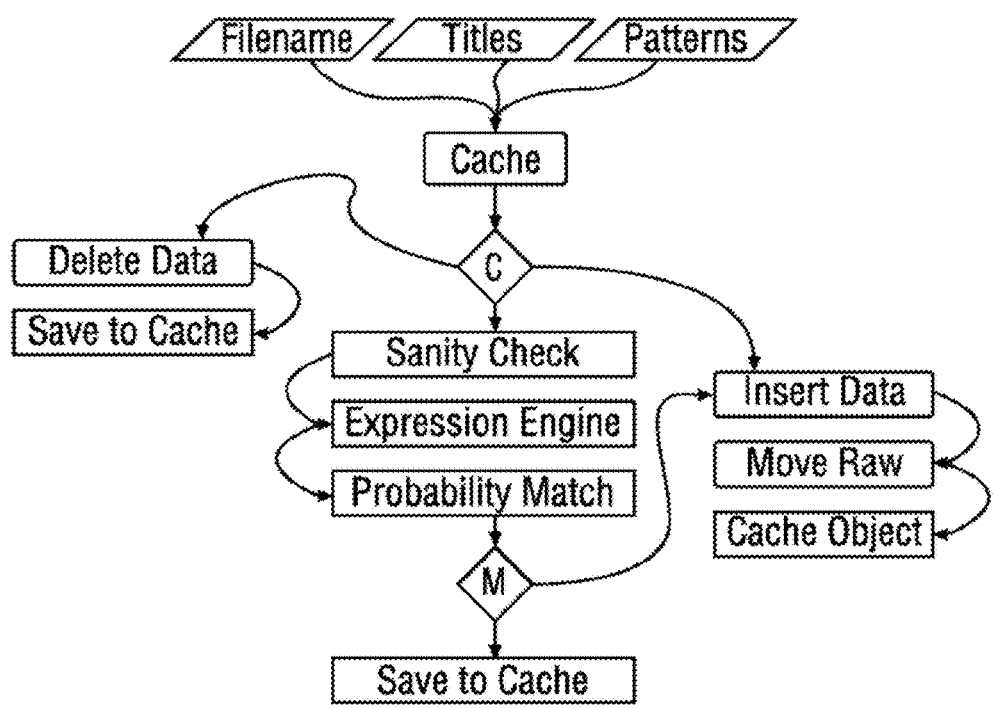
FIG. 2 provides a diagram of inductive rating logic flow in an embodiment.

FIG. 2 depicts an embodiment of a rating system (18) algorithm data flow using an inductive logic algorithm to compute risk ratings for the collected data. In an embodiment, the rating system (18) utilizes core modules to categorize, classify, and rank the risk presented by an IP Address based on the data associated with that IP Addresses collected by one or more collection agents (10). In an embodiment, the rating engine (18) is capable of neurological growth. In an embodiment, the results, conclusions, products, and/or outputs of the rating engine (18) are utilized as predicates or background knowledge for the rating engine (18).

In an embodiment, the rating engine (18) receives risk intelligence regarding an IP Address and/or a particular communication from collection agents (10) and the rating engine (18) rates and categorizes the risk for that IP Address. This rating and categorization include keywords, knowledge, predicates, or other information which modifies or improves the intelligence-gathering functions the collection agents (10) perform. By way of example and not limitation, the collection (10) identifies a malicious Internet site whose users have adopted new jargon or terminology in chat rooms to disguise their intentions. These keywords are gathered by the collection agents (10) and submitted to the rating engine (18) for analysis and evaluation, and those keywords then are distributed to other collection agents (10) as a new keywords for the collection agents (10) to utilize in gathering security intelligence from other sites and IP Addresses, allowing the system to learn and distribute newly acquired knowledge. In an embodiment, databases (14, 22) are utilized to store, share, and/or distribute knowledge acquired by the system between and among collection agents (10), the rating engine (18), and other analytical modules (20). In an embodiment, a data mining module (20) performs or augments these analytical tasks.

In an embodiment, the rating system (18) is software. Rating system (18) software is implemented in any language or combination of languages, whether compiled, interpreted, scripted, or executed through a virtual machine or other run-time environment, and is compiled or otherwise made executable on any operating system or combination of operating systems. In an embodiment, the rating system (18) is written in C, C++, Java, LISP, or Prolog. In an embodiment, the rating system (18) utilizes one or more multiprocess architectures, multithreaded architectures, multiplatform architectures, interprocess communication techniques, interthread communication techniques, distributed and/or cloud computing architectures, and/or a combination thereof. In an embodiment, the rating system (18) is used on a Unix or Linux operating system. In an embodiment, the rating system (18) is used on an operating system compliant with one or more POSIX standards.

In an embodiment, the rating system (18) is configured, controlled and/or guided by one or more sets of filters and/or rules. These rules is provided to the rating system (18) through any technique, including without limitation by: hard-coding, configuration file, command line parameters or arguments, environment variables, selection from a database, transmission over a network or domain socket, signal interrupt, instruction from other software, direct human input, or a combination thereof.

In an embodiment, the rating system (18) operates in real time. In an embodiment, the rating engine weighs and compares different factors to arrive at a numerical assessment of the severity of risk presented by a given IP Address, as well as the risk categories for that risk activity. Because the present systems and methods are designed to be "learning" systems, a complete examination of the weighing and balancing of these factors is impossible, but some illustrative, but not limiting, examples are provided herein, such as in FIG. 2.

In an embodiment, the rating system (18) includes one or more modules which are separated from other modules. Modules are separated using any criteria, including without limitation by: rating methodology; type of threat; type of intelligence gathered. In an embodiment, a customer using an embodiment of the present invention use zero, one, or more than one of the rating system (18) modules included in the embodiment. In another embodiment, a customer includes rating services, modules, or products offered by a third party and not included in the embodiment. In an embodiment, a rating system and/or module (18) operate in a "stand-alone" mode. In another embodiment, one or more rating system (18) modules are under the custody and/or control of the customer or a third party.

In the depicted embodiment of FIG. 1, the systems and methods include one or more data mining (20) processes. In an embodiment including a data mining (20) process, data mining (20) is used to improve the accuracy of the rating system (18). For example, data mining (20) processes perform statistical analysis on data (14) to identify trends, relationships, and other statistically useful data about the data (14). Data mining (20) is part of the rating process (18), or a separate and distinct process.

In an embodiment, data mining (20) provides security risk data to a rating engine (18). Such intelligence is used to more accurately and consistently identify and classify security risk. By way of example and not limitation, a collection agent (10) identifies a single IP Address as a likely security threat and the rating process (18) classify that threat as a botnet zombie. Data mining (20) then further identify: other zombies in thrall to the same bot herder; the IP Address of the bot herder; other IP Addresses utilized by the hot herder; and/or, the attack being attempted. In an embodiment, data mining (20) output is stored in a database (14, 22). In another embodiment, the data mining (20) output is stored through some mechanism other than a database.

The specific architecture and relationship between where and how raw data (14) is stored, staging data (22) is stored, and the results of data rating (18) and data mining (20) are stored, will necessarily depend upon the specific operating systems, hardware systems, network architecture, and other enterprise-specific business decisions. By way of example and not limitation, these various systems and elements is implemented or executed on the same or different physical hardware, in the same or different facilities, using the same or different database system, using the same or different database schema, using the same or different database, using the same or different number of network subnets, or any combination thereof.

Client

There are myriad categories of threats presented on-line, but for any given user of the present invention, not all categories of threats are necessarily relevant to the user's business. By way of example and not limitation, an IP Address that poses a significant threat for on-line music piracy pose little or no threat for fraud or identity theft, and an on-retailer is happy to conduct a commercial transaction with that IP Address, whereas a content hosting service not. In an embodiment, the end-user of the present invention, sometimes referred to as the "client," provides client input (24) specifying the classes and categories of transactions and/or risk on which the client wishes to receive risk assessment data. For example, the client selects risk categories which present the most significant negative impact on the client's operations. In such an embodiment, the client is able to protect itself from certain types of risk activity while accepting others. By way of example and not limitation, the client protect itself from fraudulent or commercially dubious retail transactions without inadvertently blocking legitimate transactions with IP Addresses that pose little commercial threat, but pose other types of risk.

Client input (24) refers to customers or clients using the systems and methods described herein, or of businesses offering the systems and methods of the present invention as a product or service. This usage should not be confused with the term "client" as applied to a network client or application client, such as a program attempting to open network sockets to remote hosts, or with input provided to such network clients or by such clients. One of ordinary skill in the art determines from context which of these two separate uses of the term "client" to apply.

In the depicted embodiment of FIG. 1, the raw data (14) is processed by the data rating (18) and/or data mining (20) processes and stored in a staging database (22). In the depicted embodiment, the staging (22) data has been "rated" and includes a list of IP Addresses classified and rated as presenting a threat in the categories of risk activity selected by the client (24). In an embodiment, this data is provided directly to the client from this database (22). This data is synchronized (26) to a production database server (28) and/or a warehouse database (30).

In the depicted embodiment, a warehouse database (30) includes, among other things, raw data. This raw data include, for example, raw intelligence gathered by collection agents (10), output from rating (18) or data mining (20), client input (24), dumps of tables from one or more databases (14, 22, 28, 30), or any combination thereof. This data is provided to the customer (36) through any of the means that rated data output (32) is provided. The particular architecture and delivery mechanism for output (32) will necessarily vary depending upon the business needs and resources of a particular client.

In an embodiment, a production database server (28) provides rated data to a customer. As depicted in FIG. 1, the production database (28) is synchronized (26) with the staging database (22) and thus contains IP Addresses determined to be malicious according to the criteria selected by the client (24). In an embodiment, the business client contacts the production database (28) directly, or through another device or computer. For example, in an embodiment, the production database (28) not is accessible to the public Internet, but only through a web server. Clients would then connect to the web server and request data, and the web server would then retrieve the appropriate data from the production database (28) and provide it to the client. In an embodiment, the flow of information is continuous from the collection agents (10) to the production database (28); meaning that the output from the production database (32) reflects real time data about each IP Address. In such an embodiment, as IP Addresses appear and disappear from the Internet, or the security risks presented by those IP Addresses alter in severity or classification, the risk score for that IP Address for each category selected by the client (24) flows through the depicted embodiment to the production database (28) and is reflected in the output (32) in real time.

System output (32) is delivered through any means, including without limitation: an appliance; software-as-a-service; a web site; an application; a mobile device; a mobile device application; digital or written reports; a database query; a network transmission; a file exchange; a remote procedure call; a software interface; an application programming interface; or, a software utility. An application programming interface ("API") for obtaining output (32) is implemented in any computer language, for use with any computer language, including but not limited to: machine languages, assembly languages, C, ANSI C, C++, Perl, PHP, Ruby, Java, JavaScript, Common Gateway Interface, HTTP, Flash, Actionscript, Virtual Basic, Python, AJAX, JSP, ASP, C#, .NET, Objective C, or any high level language or protocol through which an API request is transmitted and answered over a network.

In an embodiment, the production database (28) is a local computer to the client. In another embodiment, the production database (28) is a remote computer to the client. In a still further embodiment, the production database (28) is a remote computer to the client and the client has a local server which communicates with the remote production database (28).

A customer typically uses the present invention by checking whether an IP Address seeking to conduct a transaction with the customer is listed as presenting a significant threat for the type of activity proposed. This check is generally done by submitting the IP Address to the production database (28) and checking the output (32), which includes the nature and severity of threats presented by that IP Address. In an embodiment, the interface produces (32) to the client a list of all threats presented. In another embodiment, the interface produces (32) to the client only those threats selected by the client in the client input (24). In a still further embodiment, the client specifies in the client's inquiry the categories of risk for which the client is requesting a risk score, and the interface produces (32) the risk scores only for those categories.

In an embodiment, a customer conditionally allow a proposed transaction from a suspicious IP Address, giving the appearance to the IP Address user that the transaction has been accepted, but the customer then validate the purchase before finalizing the order and releasing products or services. Also by way of example and not limitation, in a transaction involving a credit or debit card, the credit card company or bank place a hold on the transaction and contact the cardholder of record to validate the transaction before releasing the funds. In an embodiment where the client is not able to validate the transaction, this fact itself also be collected (10) and used by the system to assess the risk associated with the IP Address at issue.

Figure 12A:
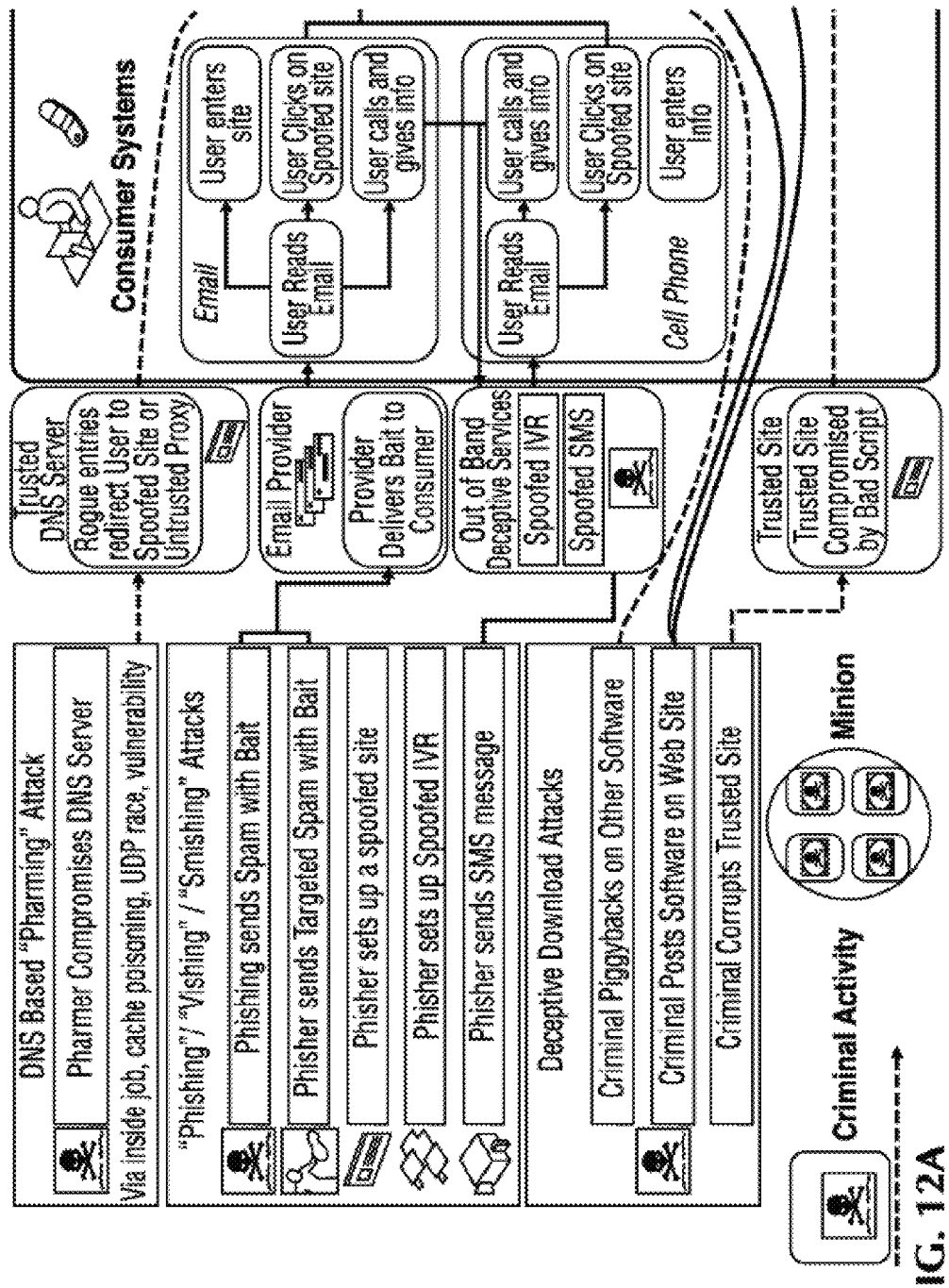
FIG. 12A, FIG. 12B, and FIG. 12C provide conceptual diagrams about how personal data is moved.
Figure 12B:
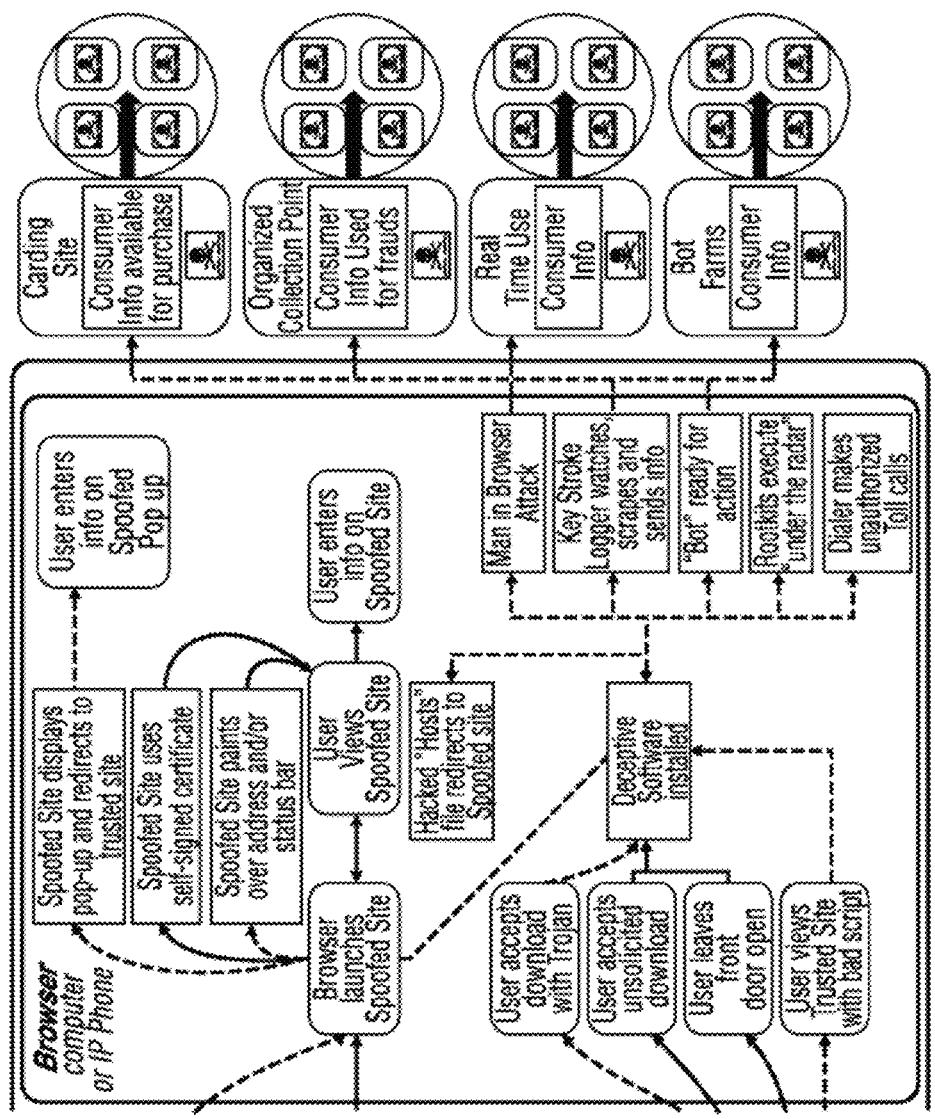
Figure 12C:
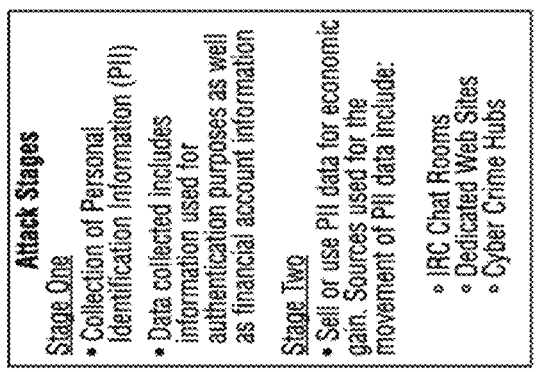
Figure 13:
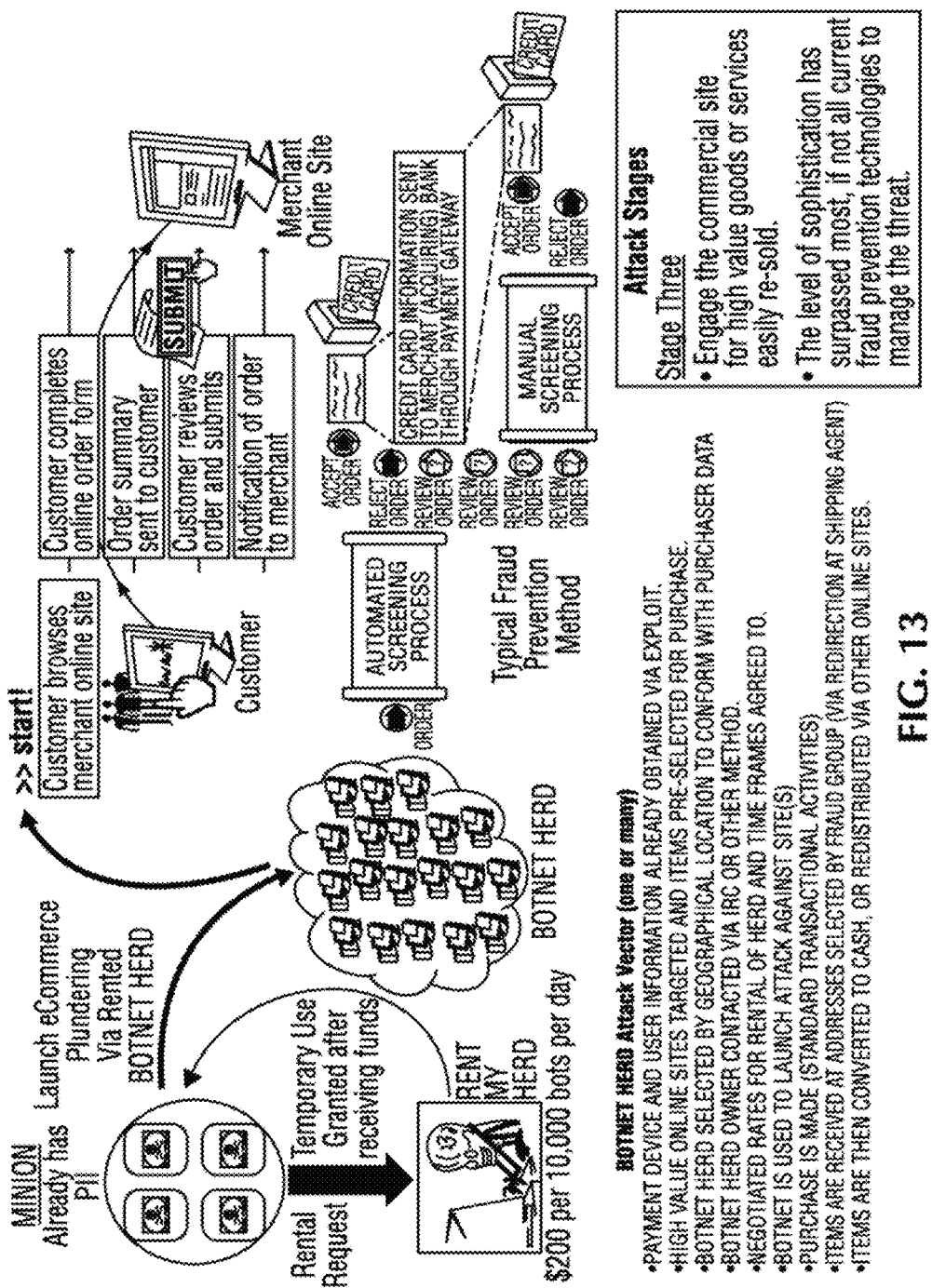
FIG. 13 provides a conceptual diagram on the prosecution of a retail fraud transactional attack using botnets.
Figure 14:
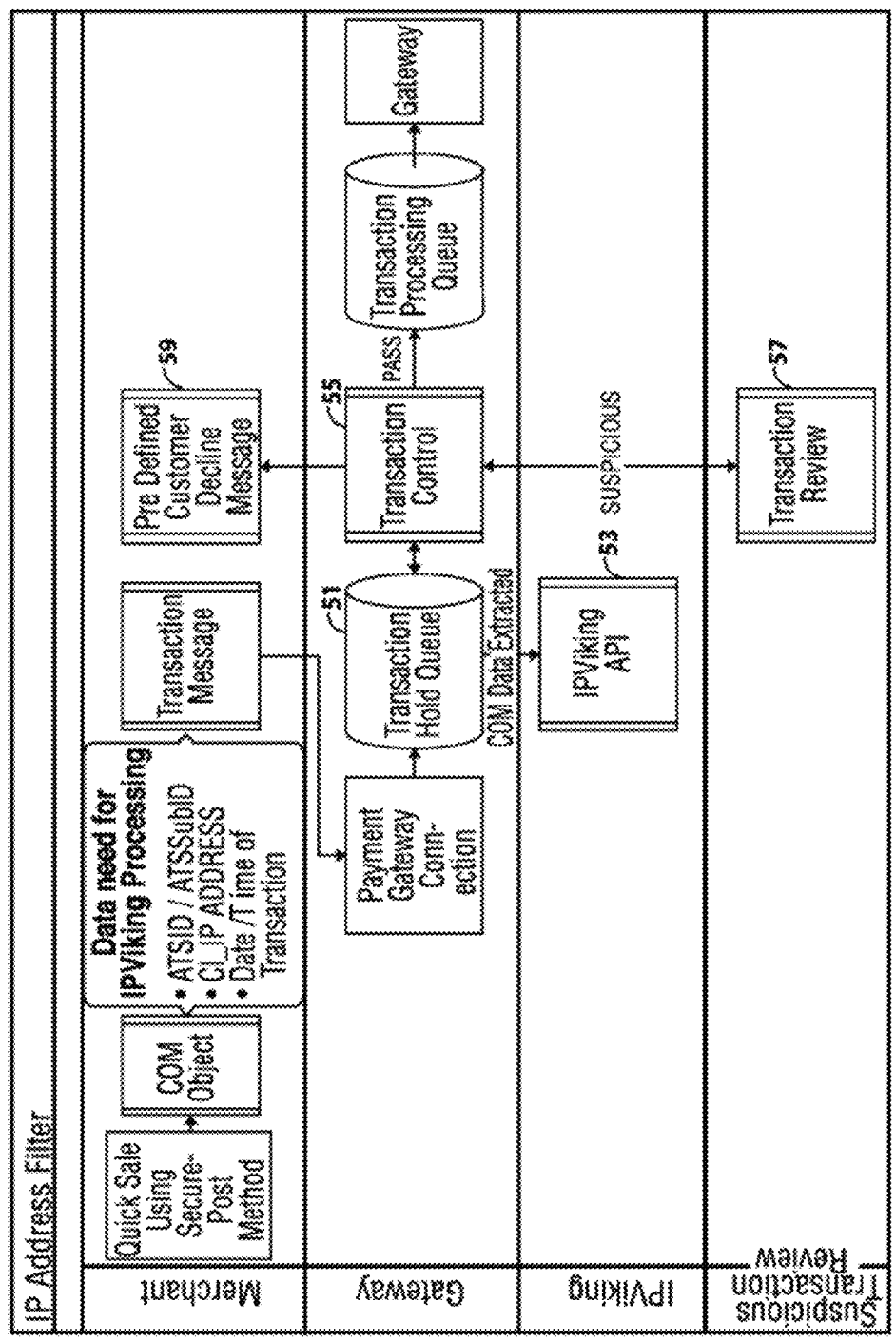
FIG. 14 provides a flowchart showing how an embodiment is used to inhibit a fraudulent transaction and hinder the attack depicted in FIG. 13.

FIGS. 12-14 depict a fraudulent on-line transaction, and an embodiment of the present invention from the perspective of a customer or user of the embodiment in the context of preventing a fraudulent commercial transaction. FIG. 12 depicts a mechanism for obtaining personal information to carry out identifies theft, and FIG. 13 depicts a fraudulent consumer transaction over a network. In the depicted embodiment of FIG. 14, a retail vendor on the Internet utilizes the systems and method of the present invention to refuse a transaction with an IP Address that is likely to be engaged in identity theft, fraud, or to otherwise present a threat to the legitimacy of an on-line sales transaction. In the depicted embodiment, the merchant has a transaction queue (51) processing sales or other transactions requested by customers over the Internet, and the merchant uses an API (53) to request security information about the IP Address associated with each proposed transaction. If the IP Address has been identified as presenting a high risk for commercial activity, the merchant then makes a business decision whether to accept or reject (59) the transaction, or to "hold" the transaction while the merchant further reviews (57) the transaction for authenticity. From the customer perspective, the IP Address is submitted to the system and the customer receives a risk score and classification data, and the specific implementation of the system itself is not important to the customer. For example, in an embodiment, the API contacts a raw database (14), staging database (22), production database (28), or another source of data entirely.

Figure 15:
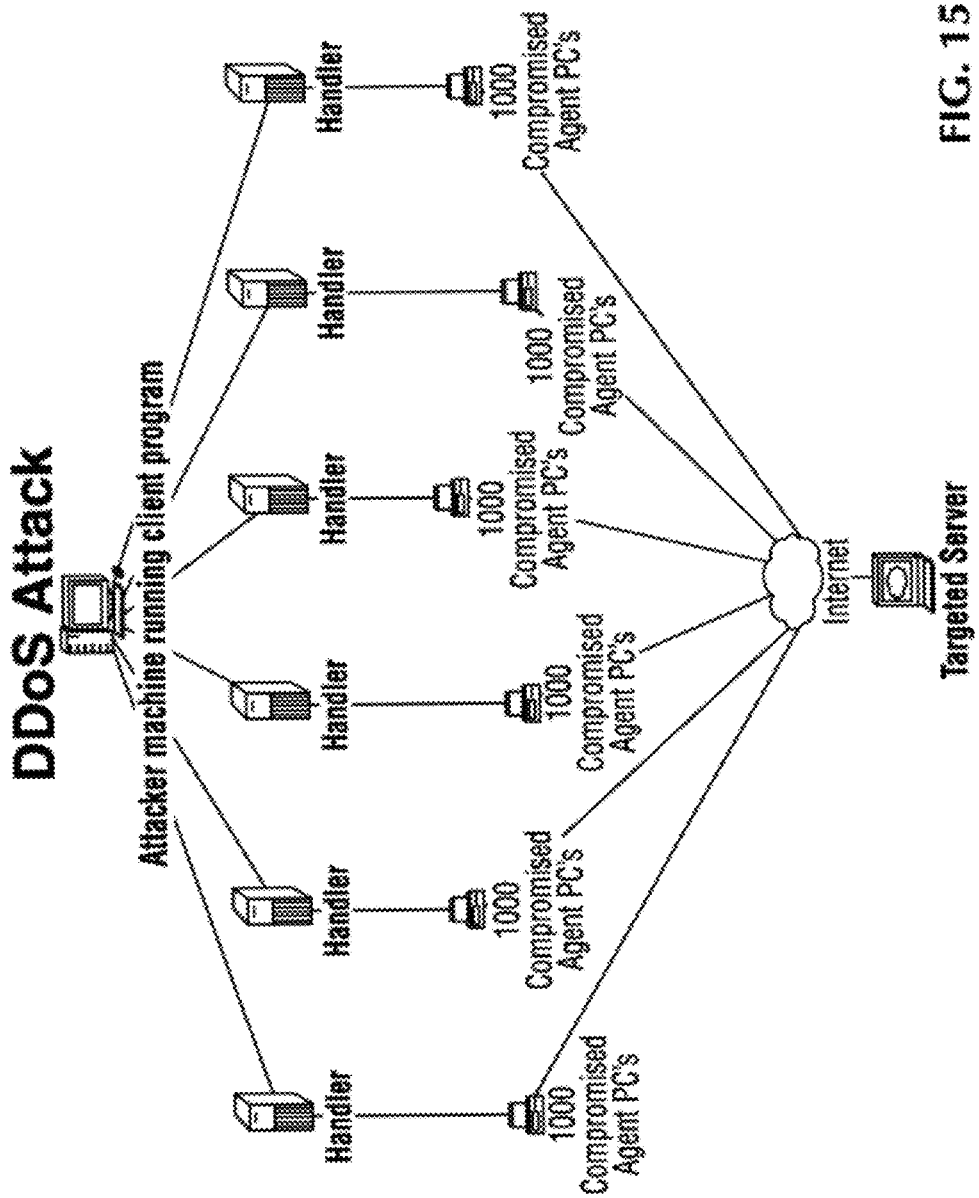
FIG. 15 shows a general block diagram illustrating how a distributed denial of service attack is carried out.
Figure 16B:
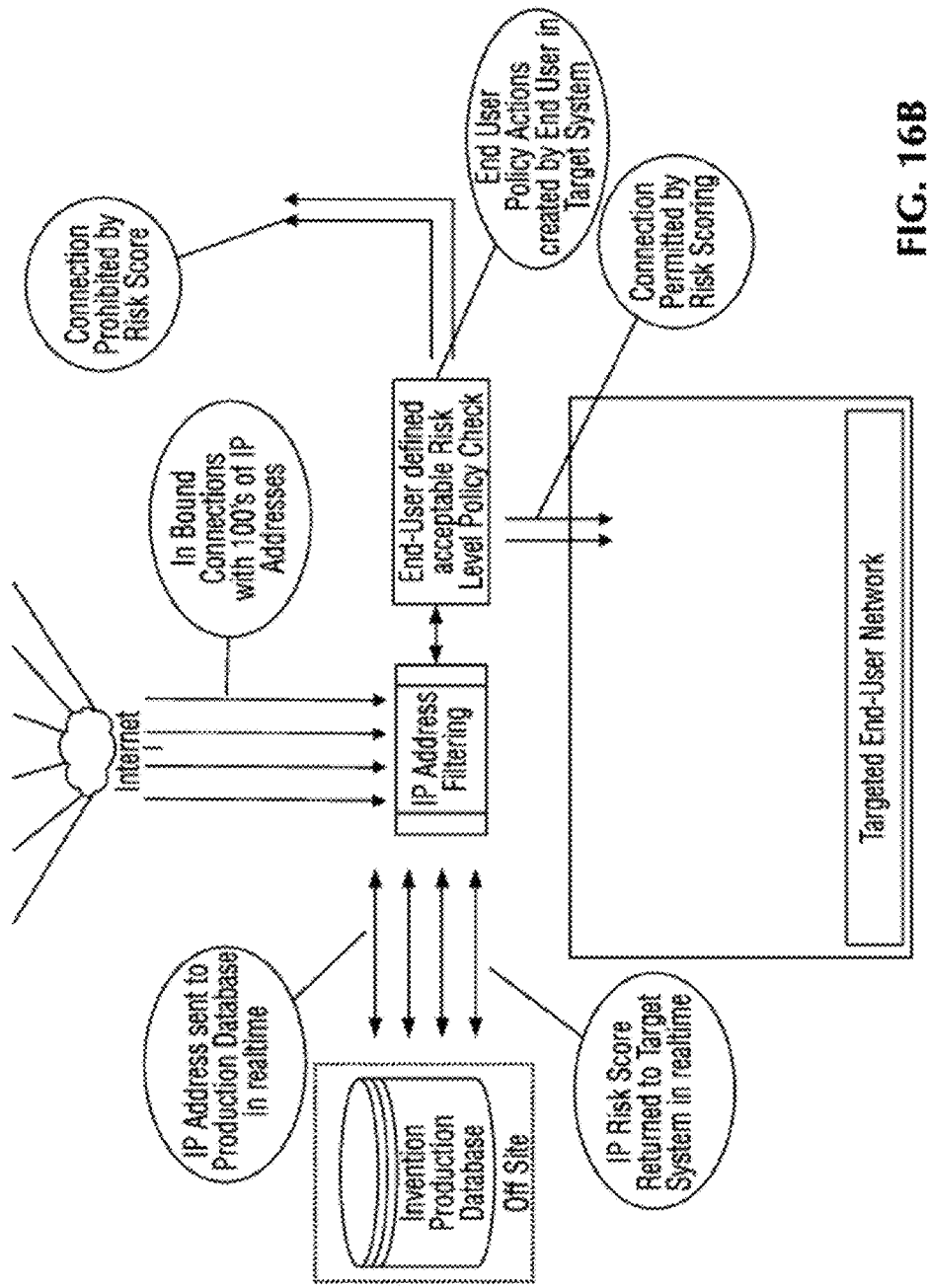

Similarly, FIG. 15 and FIG. 16 depict a botnet attack and an embodiment of the present invention from the perspective of a customer or user of the embodiment in the context of counteracting a distributed denial of service attack from a botnet. The customer's interaction with the invention is similar to that depicted in FIG. 14, in that before the customer allows a proposed transaction—in this case merely accepting a network connection from the IP Address at all—the IP Address is sent to a database (28), or other data source, having data concerning IP Addresses posing botnet risk. In the depicted embodiment, the customer has defined his threshold, or "pain tolerance," for botnet attacks in advance. A large and sophisticated enterprise with advanced load balancers and large bandwidth only wish to turn aside IP Addresses that are almost certain to be botnets. By way of example and not limitation, the customer determines that IP Addresses with a botnet risk score of 75 or higher should be filtered out and connections prohibited. However, a smaller enterprise have less bandwidth and less tolerance for mischief, and determine that an IP Address presenting a botnet risk score of 40 or higher should be filtered out and the connection prohibited. While the latter case is likely to inadvertently prohibit more legitimate connections than the former, the latter case is also likely to prohibit more botnet connections than the former. If an incoming connection's IP Address has a risk in excess of the threshold, the connection is rejected entirely. The customer's ability to define these "pain tolerance" thresholds allows the present invention to be tailored to the business needs of individual customers without having to alter the embodiment itself The flexibility of the collection agents (10), analytical modules (18, 20), and other components of the present invention makes a potent defense against activities and behaviors which pose security risks on a computer network By receiving both the category of risk presented by the IP Address and the severity of that risk, the client has enough information to make a decision regarding how the client wishes to interact with that IP Address, if at all, and to set thresholds for interactions and responses to IP Addresses based upon the risk severity and categories. In this way, clients determine the appropriate level of protection the client wishes to achieve, while simultaneously not overly excluding legitimate and harmless connections.

Figure 5A:
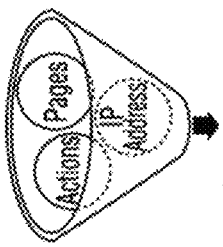

A partial and exemplary list of categories of risk activities and protocol settings is provided in FIG. 5. Due to the dynamic and quick changing nature of online threats, it is impossible to list all possible threats and risk categories. As new types of risk develop, increase, or existing types of risk subside or are mitigated, new categories will necessarily be added, and old categories is deprecated, merged, or phased out. Some of these risks are depicted in FIG. 11. Other risk activities include without limitation: infringement of intellectual property; terrorism; civil disobedience; vandalism; cyber bullying; pornography exchange; drug and other controlled substance distribution or smuggling; human trafficking; identify theft; fraud; hacking; child pornography; financial misconduct; cyber-terrorism; identify theft; cyber-stalking; arms; drugs; espionage; music piracy; games piracy; movie piracy; stocks and/or securities misconduct; information piracy; privacy violations; celebrity stalking; cyber-bullying; pornography; hacking; criminal activity; organized crime; spyware; malware; phishing; gambling; violence; scams; fraud; solicitation; insider trading; or instructions or guidance on carrying out any of these types of activities. In an embodiment, risk activity is categorized by the type of activity for which the IP Address represents a threat including but not limited to the above list. In another embodiment, risk activity is categorized by the technological facets of the IP Address causing suspicious, including but not limited to: open proxies; open relays; brute force attempts; use of bogons; use of botnets; bitcoin and other virtual currency transactions; anonymizing services; use of certain open protocols including without limitation FTP, IRC, newsgroups, file sharing protocols, BitTorrent, Gnutella, P2P networks, and web services, particularly web services running on nonconventional ports (i.e., ports other than port 80).

It is important to note that while certain enumerated risk activities are specifically contemplated, the present invention is also specifically intended as a countermeasure against risk activities not specifically enumerated herein, including risks and threats that have not yet materialized. By its nature, the present invention is infinite and limitless in the scope of breadth of attacks that are detected and inhibited. The absence of specific discussion or description of the use of the systems and methods disclosed herein as a countermeasure to a specific risk or threat, whether known or unknown, should not be understood as excluding said risk from the scope of the present invention. Similarly, the presence of specific discussion or description of the use of the systems and methods disclosed herein as a countermeasure to a specific risk or threat, whether known or unknown, should not be understood as excluding risks or threats not specifically discussed. Rather the present invention should be understood as detecting new and emerging sources of computer network security risk not yet known or identified.

While the invention has been disclosed in connection with certain preferred embodiments, this should not be taken as a limitation to all of the provided details. Modifications and variations of the described embodiments is made without departing from the spirit and scope of the invention, and other embodiments should be understood to be encompassed in the present disclosure as would be understood by those of ordinary skill in the art.

Darklist

In some embodiments, the system, appliance, device, media and method described herein include a data storage or a database. Non-limiting examples of data storage include electronic registers, cache memory, DRAM, hard drive, flash drive. The data storage is configured to store one or more of the following: a template of a risky activity, and a template of a risky source address. Alternatively, the template is called a darklist. In general, the template/darklist comprises a plurality of data entries comprising one or more risk activities or one or more risky source addresses. In some cases, the data entries comprise a particular network domain, so the darklist is further called a darknet. In some embodiments, the number of the data entries is greater than 1000, greater than 2000, greater than 3000, greater than 4000, greater than 5000, greater than 6000, greater than 7000, greater than 8000, greater than 9000, greater than 10000, greater than one hundred thousand, greater than one million, greater than two million, greater than three million, greater than four million, greater than five million, greater than six million, greater than seven million, greater than eight million, greater than nine million, or greater than ten million.

In some embodiments, the template/darklist is updated regularly or irregularly. In certain embodiments, the template/darklist is updated automatically by a configuration device, wherein the configuration device is on the local computer network or is remote to the computer network.

In additional embodiments, the plurality of the data entries further comprise one or more of the following: one or more Internet protocol addresses, geolocation information, one or more categories, one or more communication protocols used, and one or more risk scores.

In some embodiments, the template/darklist is configured or defined by a user. The list associated with risky activities/addresses is called blacklist; the list associated with non-risky activities/addresses is called white list.

Packet Analysis

In some embodiments, a system comprises a receiving module configured to receive one or more data packets from a computing device. In further embodiments, the one or more data packets comprise an address associated with a source of the one or more data packets. Additional embodiments configure the receiving module to receive simultaneously two or more data packets from two computing devices, where the data packets are sent under a single communication protocol or different communication protocols.

In general, the one or more data packets are in an outbound traffic, or in an outbound traffic, or both. In one embodiment, receiving the one or more data packets comprises hijacking the one or more data packets of fake data being transmitted by the computing device or being sent to the computing device. In another embodiment, receiving the one or more data packets comprises hijacking the one or more data packets in a communication link to the computing device.

In some embodiments, a system comprises a detection module configured to analyze the one or more data packets to identify a risky data component associated with the risky activity or with the risky source address generating the risky activity, wherein the analysis is based on one or more intelligent algorithms without using one or more of the following: a deep packet inspection, a signature, and a virtual network machine. In further embodiments, the detection module is configured to block the one or more data packets; or remove the risky data component and generate one or more safe data packets. In additional embodiments, the detection module includes analyzing simultaneously two or more data packets, the data packets being sent under a single communication protocol or different communication protocols. In certain embodiments, analyzing the one or more data packets comprises one or more of the following: identifying a source address of the packets; identifying or track a location of the packets; exploring a history of past analyses; associating a risk category with the packets; and computing a risk score of the packets.

Non-limiting examples of intelligent algorithms include: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling.

In some embodiments, the detection module is configured to detect an infected host within the computer network, wherein the infected host has risky activities or risky data packets. In further embodiments, the detection module is further configured to send a notification to a user upon blocking the one or more data packets. However, when the detection module does not identify a risky data component associated with the one or more risk activities or the one or more risky source addresses, the detection module is further configured to pass the one or more data packets.

In some embodiments, the detection module is further configured to pass the one or more data packets when the appliance is in a failure mode. Alternatively, the detection module is configured to block the one or more data packets when the appliance is in a failure mode.

In some embodiments, the system/appliance comprises a transmission module configured to transmit the one or more safe data packets to a destination computing device.

In some embodiments, the appliance/system detects risky activities based on investigating the source addresses (e.g., IP addresses, email addresses in email headers) of the data packets, without looking at other data components. In some embodiments, the appliance/system detects risky activities based on investigating data components of the data packets, without looking at the source addresses. Alternatively, the appliance/system detects risky activities based on investigating both the source addresses (e.g., IP addresses, email addresses in email headers) and the data components of the data packets.

In some embodiments, the detection module identifies risky activities based on the information of an existing template of risky activities and/or risky source addresses. Alternatively, the detection is achieved by deriving/inferring (e.g., based on intelligent algorithms) a new type of risky activity or a new risky source address, which are then added to the existing templates.

When a risky data packet is identified, the system/appliance has various options. In some embodiments, the system/appliance blocks the data packets; alternatively, it removes the risky data component and generates one or more safe data packets. In some embodiments, the system/appliance adds a tag to the detected risky data packets and further transmits the tagged risky data packets. In some embodiments, the system/appliance removes the risky data components, generates safe data packets, and adds a tag to the safe data packets, followed by transmitting the tagged safe data packets.

Interface

In some embodiments, the appliance/system comprises a user interface. In the case of electronic appliance, the user interface comprises a touchscreen to allow a user to operate and interact with the appliance. In the embodiments of software systems, the user interface comprises a graphical user interface to allow a user to operate and interact with the appliance. Operating the appliance/system includes setting parameters, adjusting security levels, and/or updating the templates.

In the embodiments of system/appliance, the interface comprises a touch screen display. In the embodiments of media, the interface comprises a graphical user interface. In general, the interface is configured to perform one or more of the following: interacting with a user to configure the appliance, displaying real-time data, summarizing a statistics of traffics (e.g., mean, variance, average during a time window, time series information, etc), generating an alert when blocking the one or more data packets takes place, generating an alert when the appliance is in an abnormal mode.

In some embodiments, the computing device is a remote device on the computer network. Alternatively, the device is a local device on a local area network of the computer network. In certain embodiments, the computing device is a build-in electronic component inside the system/appliance. In some examples, the computing device or computer comprises one or more of the following: a server, a desktop computer, a portable computer, a mobile device, a smartphone, a router, a switch, a hot spot, a wired computing device, and a wireless computing device.

In some embodiments, the system/appliance comprises an alert module configured to generate an alert when a risky activity or a risky source address is identified, the alert comprising one or more of the following: a visual alert, a sound alert, a text alert, and an email alert.

System Architecture

In some embodiments, the aforementioned modules are achieved by hardware implementations, such as electronic circuits, field-programmable gate arrays (FPGA). In some systems, the aforementioned modules are implemented by software modules. In certain examples, the modules are realized by a hybrid of hardware modules (e.g., electronic circuits, FPGA) and software modules.

In an embodiment, the system/appliance is installed at the gateway of a network. In such case, the system/appliance checks in-bound traffic, out-bound traffic, or both in-bound and out-bound traffic.

In some embodiments, the system/appliance comprises a high speed network interface. The high line speeds into the appliance with 1 Gb or more, 2 Gb or more, 5 Gb or more, 10 Gb or more, 15 Gb or more, 20 Gb or more, 50 Gb or more, 100 Gb or more, 150 Gb or more, 200 Gb or more, 250 Gb or more, 300 Gb or more.

In some embodiments, the system, appliance and media described herein are configured for specific purpose, for example, monitoring emails. Other examples include monitoring web pages, web sites, data communication, phone calls, financial transactions, and/or purchase-and-sale activities.

Digital Processing Device

In some embodiments, the platforms, systems, software applications, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the platforms, systems, software applications, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application is written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, software applications, media, and methods disclosed herein include software, server, and/or database modules, or use of the same. In view of the disclosure provided herein, software modules are created by techniques known to those of skill in the art using known machines, software, and languages. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, software applications, media, and methods disclosed herein include one or more databases, or use of the same. In view of the disclosure provided herein, those of skill in the art will recognize that many databases are suitable for storage and retrieval of network event data. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is employed in practicing the invention.

Example 1—Threat Intelligence Appliance

Figure 17:
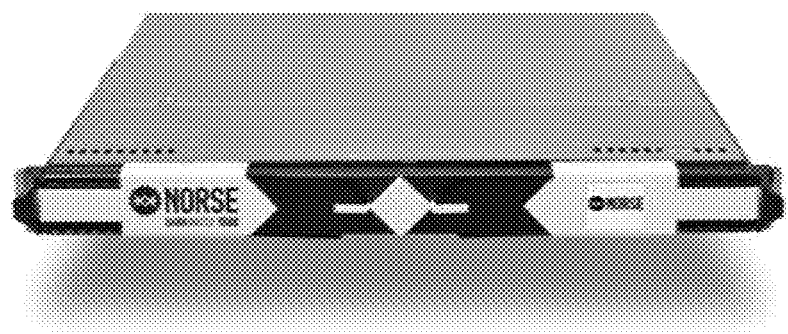
FIG. 17 shows an embodiment of an appliance for detecting risky network activities and protecting organizations from the activities.

FIG. 17 shows an example of an electronics appliance disclosed herein. The intelligence appliance was specifically designed to detect and defend against the new sophisticated threats emerging from darknets and the rest of the Internet—attacks that most existing current security infrastructure is missing.

The appliance was designed as blade server. In an embodiment, a single appliance was used to protect a local network. In another embodiment, multiple appliances were connected and stacked up to create a single, giant platform to detect and defend risky network activities.

Alternatively, multiple appliances were distributed globally as a "distant early warning" network of millions of dark sensors, honeypots, crawlers, and agents that deliver unique visibility into the Internet and the darknets, where bad actors operate. The entire platform of appliances was able to process hundreds of terabytes daily, and compute over 1,500 distinct risk factors for millions of IP addresses every day. The platform continuously analyzed traffic to identify the compromised hosts, malicious botnets, anonymous proxies and sources of attack.

The platform was able to maximize coverage and sampling rate of malicious and questionable Internet traffic. Analysis of malicious and questionable traffic includes IRC, Tor, P2P, free open-source services (DNS, SSH, VPN), private IP and SOCKS proxies, unassigned and unadvertised address space, attacks against Norse dark sensors, geolocation analysis, and web-crawling for specific data of interest. The information from these data sources was continuously analyzed and correlated using over 1500 criteria, resulting in a risk score, contributing risk factors (rationale), and geolocation information for each IP address. Up to four years of historical data was also factored into the risk analysis.

The platform was able to deliver threat intelligence live and at transaction speed. When the platform identified a malicious event, the data was processed and made available to customers via an API. Moreover, the platform was also able to work inline, such as with financial transactions or individual login checks, and processed these individual requests at transaction speed without noticeable delay.

The platform was built on a heavily customized version of FreeBSD that delivered unmatched stability, performance, and agility to process ever-increasing amounts of data from our global sensor network.

Example 2—High Detection Rate of Threats

The intelligence appliance was able to detect and defend against the newest, most advanced threats on the Internet—even darknets. During benchmark testing against 35 other popular commercial and open source threat intelligence offerings, at least 74% of the threats identified by the appliance were not caught by any other offering, commercial or open source.

The appliance not only identified more new threats, but also told an operator or a network manager which threats were actually worth worrying about. The appliance used an advanced artificial intelligence engine to distill thousands of risk factors on millions of IPs, live, to deliver a single, actionable risk score for any address (or range of addresses) the network manager designated. The network manager easily configured automatic actions based on the risk score for each IP. Furthermore, the appliance protected against malicious traffic—even when it's encrypted—and scaled up to even the largest networks.

Deployed inline or out of band, the appliance leveraged the global attack intelligence network to alert network managers in real-time to malicious inbound or outbound URLs, botnets, anonymous proxies, bogus IPs, and infected embedded devices targeting an entity from anywhere in the world—and allowed network manager to block them, instantly. The appliance was able to work with existing next-generation firewalls, intrusion prevention systems, and SIEMs to dramatically improve the ROI on existing security investments by lightening their loads and stopping attacks they're missing.

Example 3—Appliance Coupled with Attack Intelligence Platform

The appliance included attack detection and virtualization-evading malware from the darknet that current security systems are missing. Moreover, it protected an organization from careless users clicking on dangerous links in phishing emails, risky websites, social media or instant messages. Furthermore, the appliance stopped organizational data theft via Tor or anonymous proxy. The appliance was able to filter and correlate torrents of event data from existing security systems to alert network managers to what's truly important.

Figure 18:
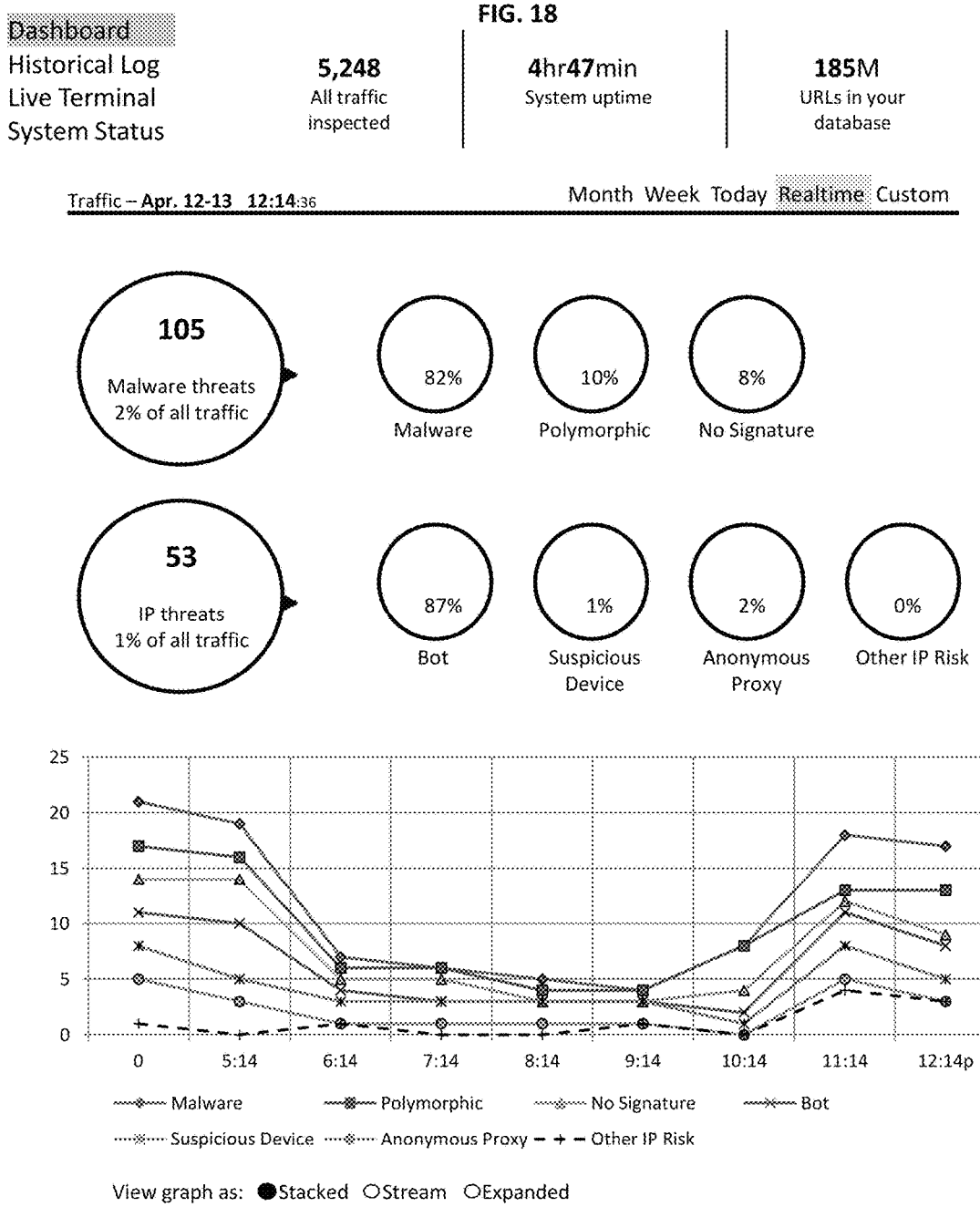
FIG. 18 shows an embodiment of visualizing analytics of network monitoring.

Referring to FIG. 18, the appliance was able to summarize statistics of threats, malware, and virus. The appliance further utilized an "attack intelligence platform" (e.g., a network of honeypot computers, or a network of sensors) to protect against known and unknown malware, and even malware still in development. The attack intelligence platform was a global platform constantly evaluating millions of domains daily for malware still in the developmental phase, identifying new binaries before they're even released on the Internet. In some embodiments, some appliances used virtual machines to trap malware before it makes it to targeted systems. However, modern malware was savvy to the approaches based on virtual machines, and could stay "dormant" while it passes through virtual machine-based malware detection systems. In some embodiments, the appliance disclosed herein was coupled with the platform; it didn't depend on signatures or virtual machines, so it was able to catch as much malware as possible.

Furthermore, the appliance was able to visualize the global map of malware activities. The map provide network management a detailed view of previously unknown threats traversing the network, including anonymous proxy traffic, cloud vectors, advanced malware threats, and compromised embedded device traffic.

On the other hand, the appliance included integrated touchscreen LCD for an operator to configure the network. Using the touchscreen configuration, the appliance could be set up and running in less than 20 minutes.

Example 4—Combating e-Commerce Fraud

The appeal of e-commerce transactions to cyber criminals is not hard to understand. The payoff of a successful attack is significant, impacting multiple targets across the globe in a matter of minutes. In addition to immediate financial gain, e-commerce fraudsters gain access to financial data such as credit card and bank account numbers, as well as personal data such as names and addresses, that allow them to perpetrate ongoing financial fraud against unsuspecting consumers—or even sell the info on the data black market to larger cyber-crime organizations.

In this example, such attacks resulted in the following: Loss of revenue for goods and services that were ordered and delivered but for which no payments were received—$3.4 billion in 2011 alone; Chargeback fees for items purchased fraudulently with another person's credit card; Costs for fulfillment and delivery services, as well as investigation and administration of fraud claims; Loss of customer loyalty and brand reputation.

Today's attackers use advanced methods and tactics that render conventional security and fraud prevention solutions—typically signature- and policy-based—much less effective. E-commerce organizations need a solution that keeps up with the speed of today's advanced attacks.

Figure 19:
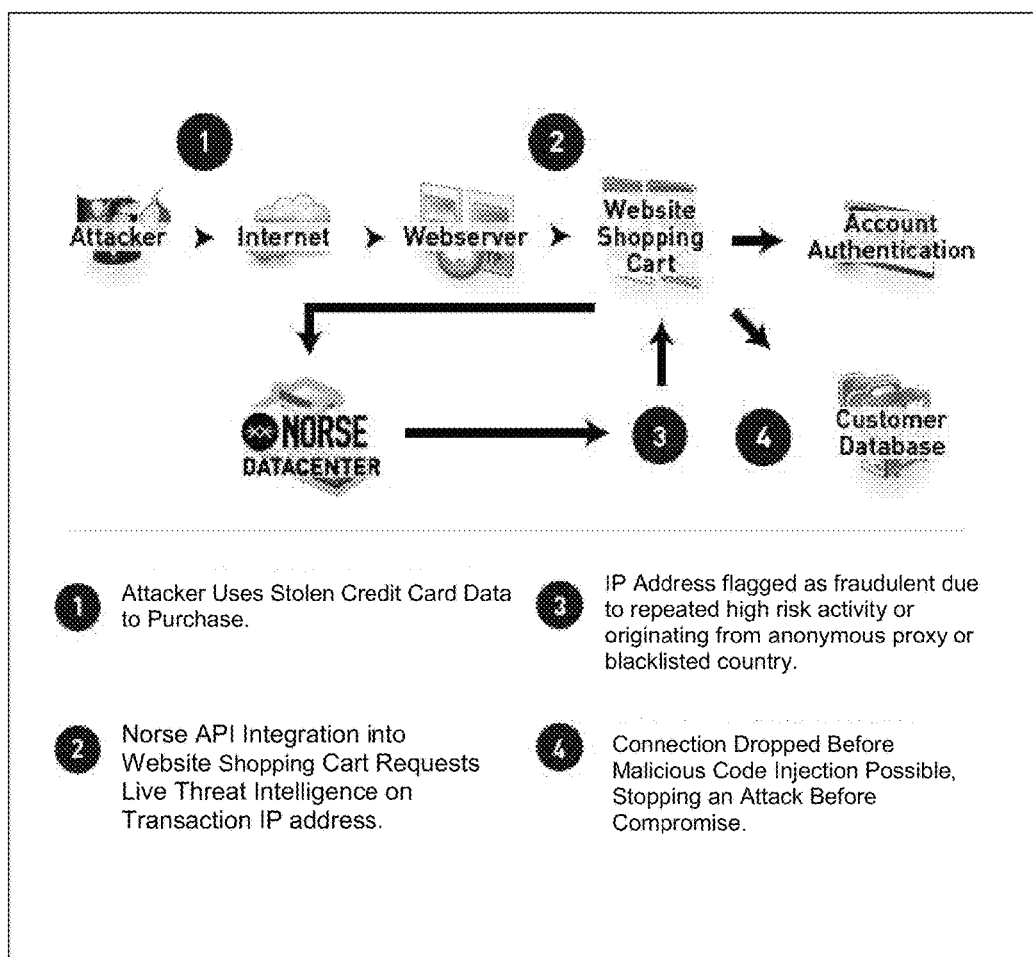
FIG. 19 shows an embodiment of a system for blocking e-commerce fraud.

Referring to FIG. 19, the appliance disclosed herein provided an intelligence solution that enables organizations to quickly and cost-effectively implement proactive security that works at the speed of attackers, raising the organization's overall security posture while lowering its risk profile.

Example 5—Protecting Electronic Health Information

Health care organizations present a uniquely appealing target for bad actors due to the value of the data typically stored by these organizations. This data includes lots of private information of patients: Social Security number, insurance and/or financial account data, birth date, name, billing address, and phone. At the same time, to maintain connection with patients, employees, insurers, and business partners, health care organizations must provide access to an unusually large number of external networks and web applications. The multi-tiered window of exposure makes health care organizations increasingly vulnerable to online attack.

Such attaches resulted in (a) costly data breaches, in terms of both financial and time loss; (b) penalties imposed by the government—because government regulations such as HIPAA mandate strict security for access to electronic health care data, the resultant penalties for a breach were severe; (c) costs for investigation and administration of fraud claims; (d) loss of customer loyalty and brand reputation.

Figure 20:
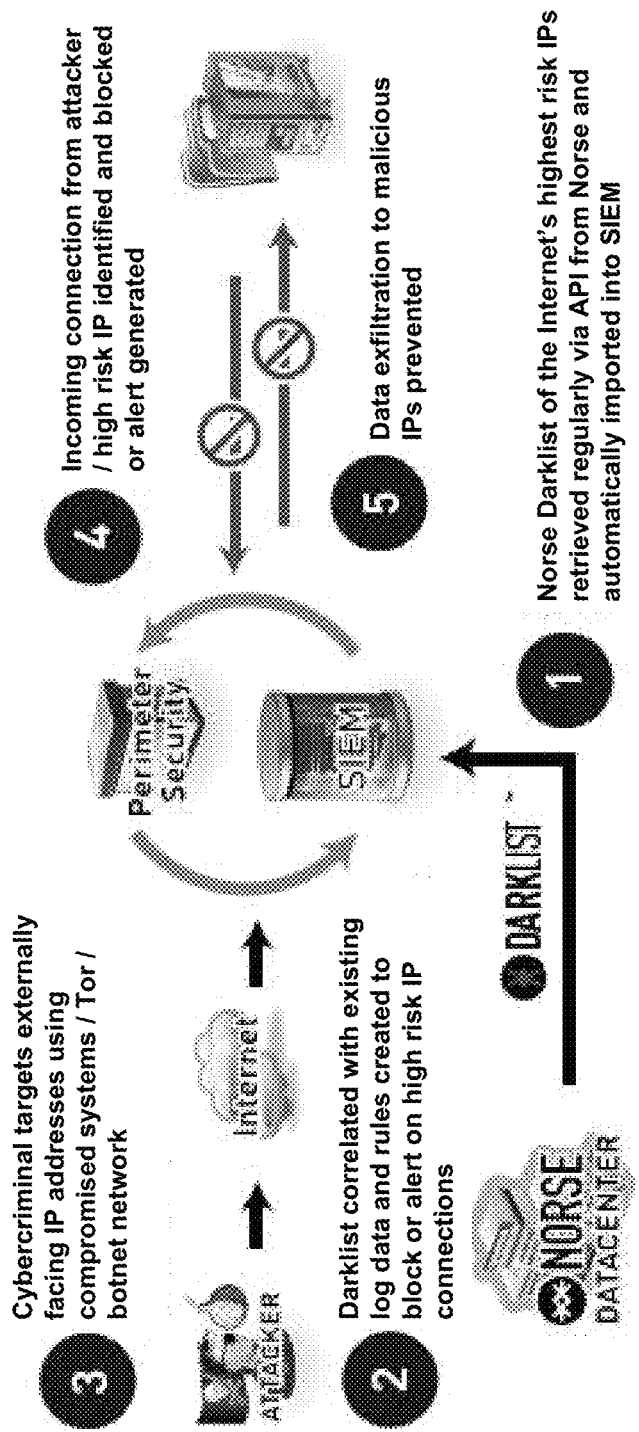
FIG. 20 shows an embodiment of a system for protecting health care information from attacks.

Referring to FIG. 20, the appliance, system and method disclosed herein is able to assist health care organizations to keep up with the speed of today's advanced attacks and protect patients' electronic protected health information (ePHI). The appliance and system created a database of risky source addresses. When a data packet comes, the appliance and system evaluated the association of the data packet with the risky source addresses. If the association score is above a threshold, the data packet is blocked or the risky components are cleared. When installed in a health care organization, the appliance was able to (a) assess the risk level of any attempted data record access in milliseconds; (b) protect against customer account takeover fraud via stolen credentials; (c) block fraudulent account creation; (d) minimize the risk of security-related website downtime; (e) lower the possibility of government-imposed penalties; (f) reduce the risk of security breaches and the associated losses of data, reputation, and revenue, while enhancing the customer experience.

The appliance and system were able to provide (a) real-time delivery of fraud and security intelligence data; (b) configurable live scores that enable true risk prioritization; (c) integration through a simple API to let network managers easily configure the security policy; (d) powerful and visualized analytics that provide rich and comprehensive reporting data; (e) geolocation filter scoring and transaction blocking by geographical attributes; (f) flexible risk categories that let network managers configure rules and polices unique to their business.

Example 6—Preventing Malware Infection

Figure 21:
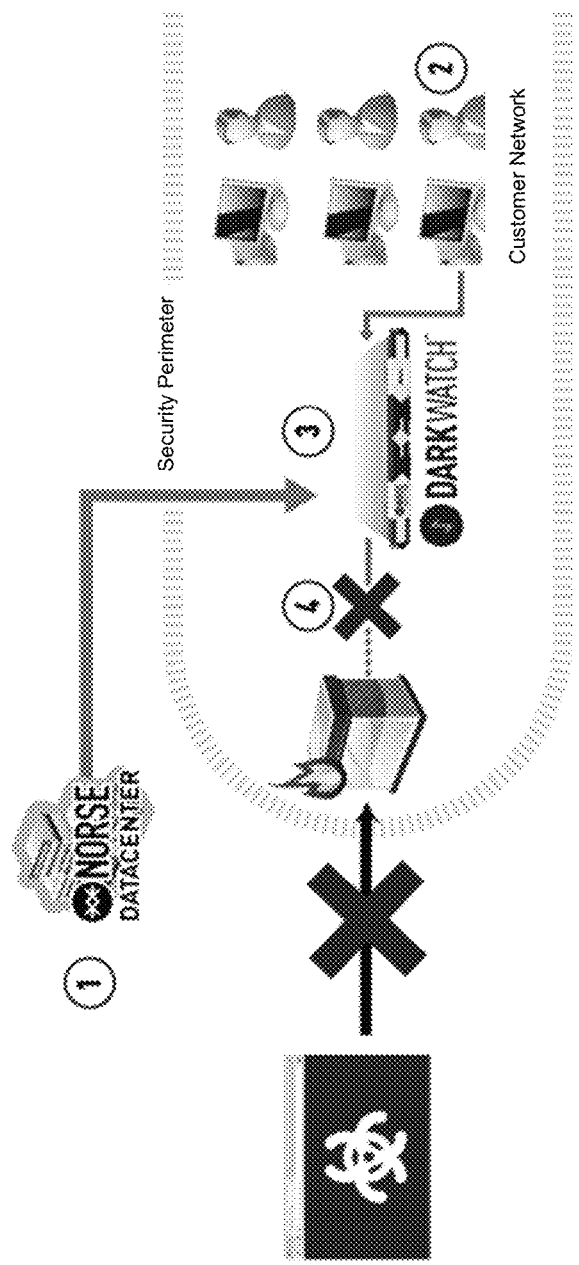
FIG. 21 shows an embodiment of a system for preventing malware infection.

An example of preventing malware infection is visualized in FIG. 21. In this example, the subject matter disclosed herein was implemented as an electronics device, named DarkWatch in FIG. 21. The network appliance was deployed behind the firewall where it could see all outgoing traffic. Periodically, the appliance downloaded the latest IP and URL information from another platform in a data center. When a user clicked on a malicious IP or URL within emails, social media sites, web pages, or even instant message windows, the network appliance matched the IP or URL and then was able to block, reroute, or simply report on it. The matching was based on polymorphic matching. Even if the IP and URL were within encrypted traffic, the network appliance matched the destination URL and then blocked the event or reported on the event.

An importance was that the outgoing connection was blocked before infection could occur. This protection dramatically enhanced the security of an enterprise.

Example 7—System Deployment

This example included a system/appliance that comprised a big data analytics platform. Over 1,500 different threat and risk factors were used to deliver a live risk score and deep contextual information providing visibility into the threat profile of any public IP address. Delivered in milliseconds via a global high-speed delivery platform, the system/appliance provided a proprietary IP address risk grading—the IPQ score—and detailed threat context that enable highly effective solutions for online fraud prevention and protection from cyber attacks including zero-day exploits and APTs.

The architecture and design considerations of the system/appliance are described below. The system/appliance comprised a module to gather dark intelligence. The system/appliance not only watched traffic seen on an own network and/or on customers' networks, but also focused on network traffic from "places" on the Internet where bad actors are found. TOR proxies, botnets, IRC chat rooms and many other areas are a haven for attackers with ill intentions, and it is from these sources that the system/appliance gathered most useful intelligence.

Figure 22:
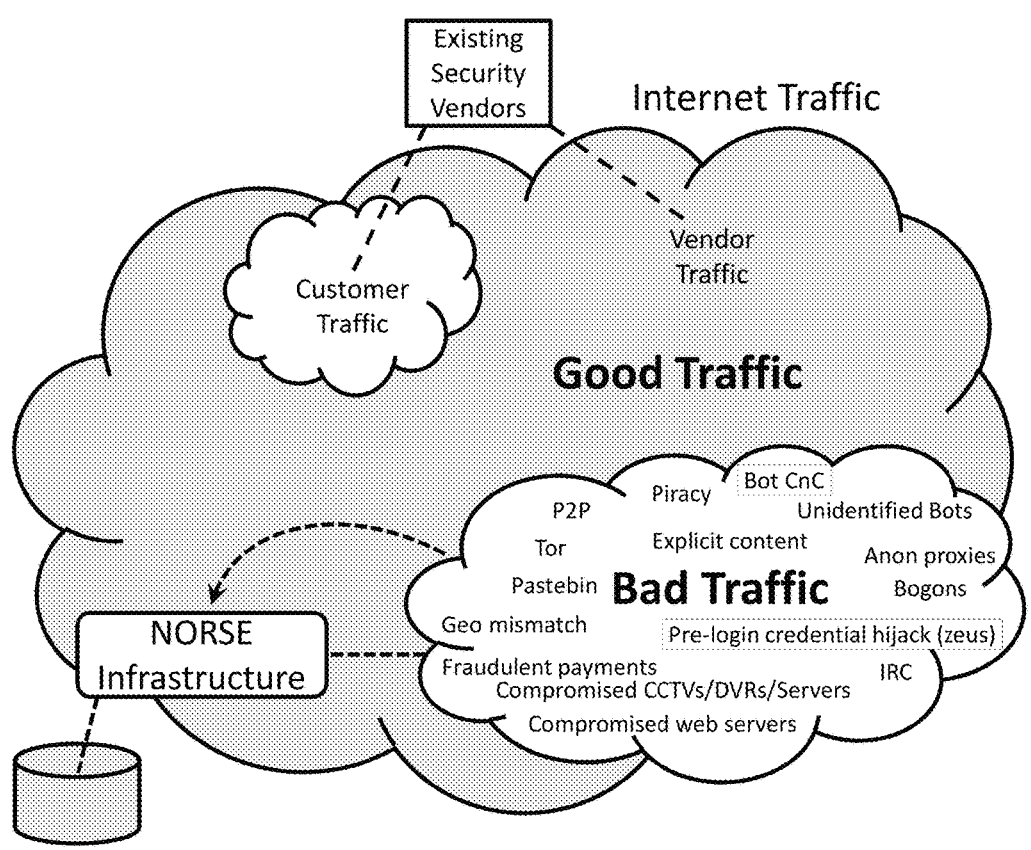
FIG. 22 shows an embodiment of a system continuously collecting and analyzing live high risk Internet traffic identifying the sources of cyber attacks and fraud.

Referring to FIG. 22, the system/appliance used big data analytics to provide context to the dark intelligence it aggregated, and delivered a simple, configurable score that enabled organizations to make allow, block, or quarantine decisions at wire speeds.

The system/appliance gained live contextual insight into the activity of bad actors on the Internet with the ability to provide full global IP space coverage. This was dependent on attaining broad Internet coverage and a high sample rate. A key to this was how much geographically representative threat data the system/appliance was able to collect and how fast was it able to process and analyze the data in order to make it rapidly available to customers as actionable intelligence. Norse achieves this via a massive globally distributed network infrastructure capable of continuously collecting and analyzing tens of terabytes of live cyber attack and high-risk network traffic every day. However, not all data was created equal. The places from which various types of data were collected can be dramatically different between relevant and irrelevant data. Simply analyzing large amounts of Internet data was not particularly valuable for providing threat intelligence. It was actually counter-productive if the data is largely "good." Consequently the system/appliance was designed and architected to find, collect, and analyze the Internet's "bad" and high-risk data and traffic.

The system/appliance comprised a strategically located high performance infrastructure. A portion of the system/appliance included 16 core routers that sit on Tier 1 long haul fiber network rings. Note that the 16 core routers can be replaced with any computing device with at least one core for routing processing. The system/appliance included the infrastructure in over 150 strategically located locations spread across more than 40 countries; the infrastructure was used to collect the widest possible breadth of high risk data types and network traffic. This unique approach and platform architecture achieved massive global coverage including the places where much of the new malware was created and first detected.

The system/appliance had access to approximately 16 million IP addresses spread across every aspect of the IPV4 space to facilitate the collection of threat data in real time. Threat data was then fed to GPU calculation clusters in 40 global NOCs enabling data collection, analysis, and delivery of intelligence in approximately 5 seconds or less. The extremely fast infrastructure and high sample rate enabled the platform to re-sample and risk-assess the entire IP range every few minutes.

The system/appliance comprises a module for big data and big context analytics. For threat intelligence to be truly actionable and valuable and to minimize the risk of false positives, the system/appliance included rich contextual data about the threat profile of an IP address. This was achieved at scale via the collection and real-time analysis of large amounts of live high risk Internet traffic, as well as analysis of a wide variety of data types and live monitoring of many different communications protocols and networks. The system/appliance was architected to enable the automated collection and analysis of all relevant types of threat data from a wide spectrum of sources. This comprehensive approach to breadth and depth of threat data collection is able to provide enterprises with a highly accurate and effective risk score and threat profile with the rich contextual data that organizations needed to design more granular rules and policies than is possible from today's IP blacklists and feeds.

Figure 23:
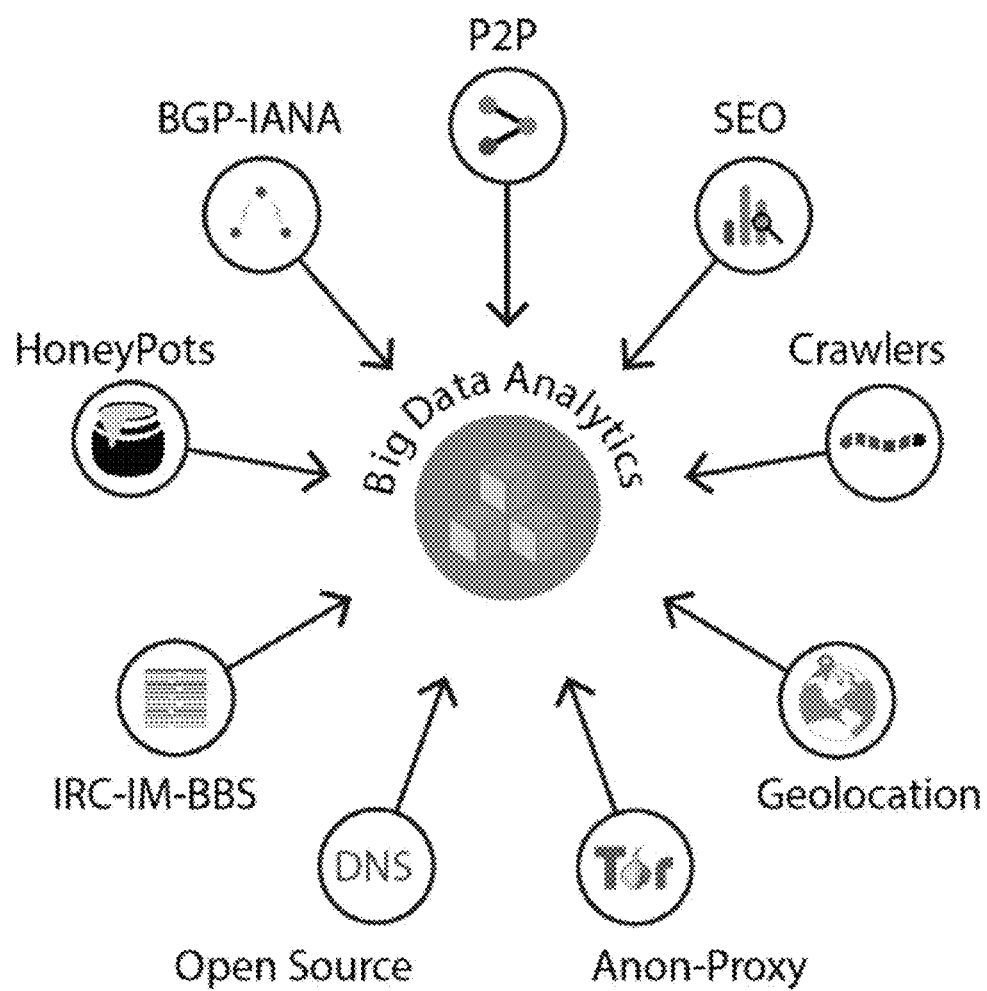
FIG. 23 shows an embodiment of data types and collection methods used by a system/appliance.

Referring to FIG. 23, the system/appliance used some of the data types and collection methods.

Next Generation Honeypots. The system/appliance used honeypots to support the emulation of thousands of networks and applications that appear as desirable targets for malware, bots, and hackers. Supporting both low and high interaction, server and client based configurations, the honeypots were continually accessed and attacked by compromised hosts, networks, and network connected devices. Client-based honeypots emulated browser-based actions causing compromised websites to reveal their malware. Emulating many different types of network infrastructure, protocols, and services, the system/appliance created 6-7 million concurrent transactions at any given time.

IRC: Internet Relay Chat is a popular method for exchanging ideas and plans among bad actors. By participating in these chats, the system/appliance was able to quickly gain intelligence on new and modified attack vectors.

BGP-IANA. Border Gateway Protocol is the routing protocol of the Internet. The Internet Assigned Numbers Authority (IRNA) is responsible for the global coordination of the DNS Root, IP addressing, and other Internet protocol resources. By maintaining current copies of this information, the system/appliance detected if an IP address was valid or bogus (bogon) or if a valid IP address had been hijacked or has being spoofed—all clear indicators of risk.

P2P. Peer-to-Peer connections are created without the need for a central server. P2P networks can be set up within the home, a business, or over the Internet. Participants who are interested in communicating without detection often set these up between interested parties. The system/appliance gained valuable information through its active participation in these P2P networks.

SEO. Search Engine Optimization is a technique to gain rankings for specific criteria. By managing websites that scored highly when people were executing suspicious searches, they expose themselves as bad actors to the system/appliance.

Crawlers. The system/appliance comprised dark-net crawlers searching for a wide range of clear text or documents that are indicators of potential malicious behavior or leaked confidential information including data indicating threat or compromise.

Geolocation. The physical location of an originating IP address can be a useful factor in determining risk. The system/appliance's geolocation capabilities were highly accurate, and the resulting information was factored into its live threat intelligence database.

Anonymous Proxies. Anonymous proxies are used to hide the identity of the participant. While originally designed to protect the innocent, networks like TOR are now widely used to launch and mask cyber attacks, fraud, and malware command and control traffic. The system/appliance does real-time monitoring and detection of new un-published Tor exit nodes providing customers with comprehensive live protection against TOR based attacks.

Open source. By running popular open source applications within the system/appliance's honeypot network, it is possible to emulate applications that are used by many and secured by none. This attracted bad actors that end up divulging their tools and techniques. Also by offering free DNS services that do not log, the system/appliance was able to attract users who obviously did not want to be detected. When bad actors use these hosted services provide by the system/appliance, they added to the live intelligence.

The system/appliance can be integrated with an existing security infrastructure. By adding a few lines of code, an enterprise or developer could begin to integrate the system/appliance's live threat intelligence into their IT infrastructure, websites, account login-forms, and business processes. The delivery method may vary but the system/appliance was capable of being delivered in most common forms such as an API, as a service or via an appliance.

The deployment of the system/appliance service was as simple as creating an API integration point into the existing customer application where risk assessment of the IP address of a connecting party would enable the application to mitigate risk. These integration points could include: the initial connection, a login page, a payment/checkout page. Where other applications require extensive integration efforts, observed behavior for learning, or payload analysis, the system can score risk based solely on the source IP address. The API integration will also accept additional information related to geofiltering and geo-matching of billing/shipping addresses with the IP geographical location, unique transaction identifiers, and other reference points such as unique merchant ID or other reference number. These additional fields were contained within the API so only one point of integration was necessary. It was up to a client/administrator to determine what data was to be sent along with the IP address and date/time stamp.

The system/appliance comprised an API responding to a request. API response to a risk query was a dataset that provided both the risk value and specific factors and context supporting the risk value returned. The IPQ score, or risk value return, would be a numeric value between 0 (No Risk) and 100 (Extreme Risk). For straight-forward consumption and action, the risk value can be used to determine policy handling and action across a variety of integration points including the business application outward to perimeter devices. The supporting factors and context can be used by the customer to better understand the transactional activities being reviewed for risk, or in advanced scenarios can be used to optimize policies, e.g. IPs involved with any Explicit Content should be prevented from account creation regardless of overall risk score.

Figure 24:
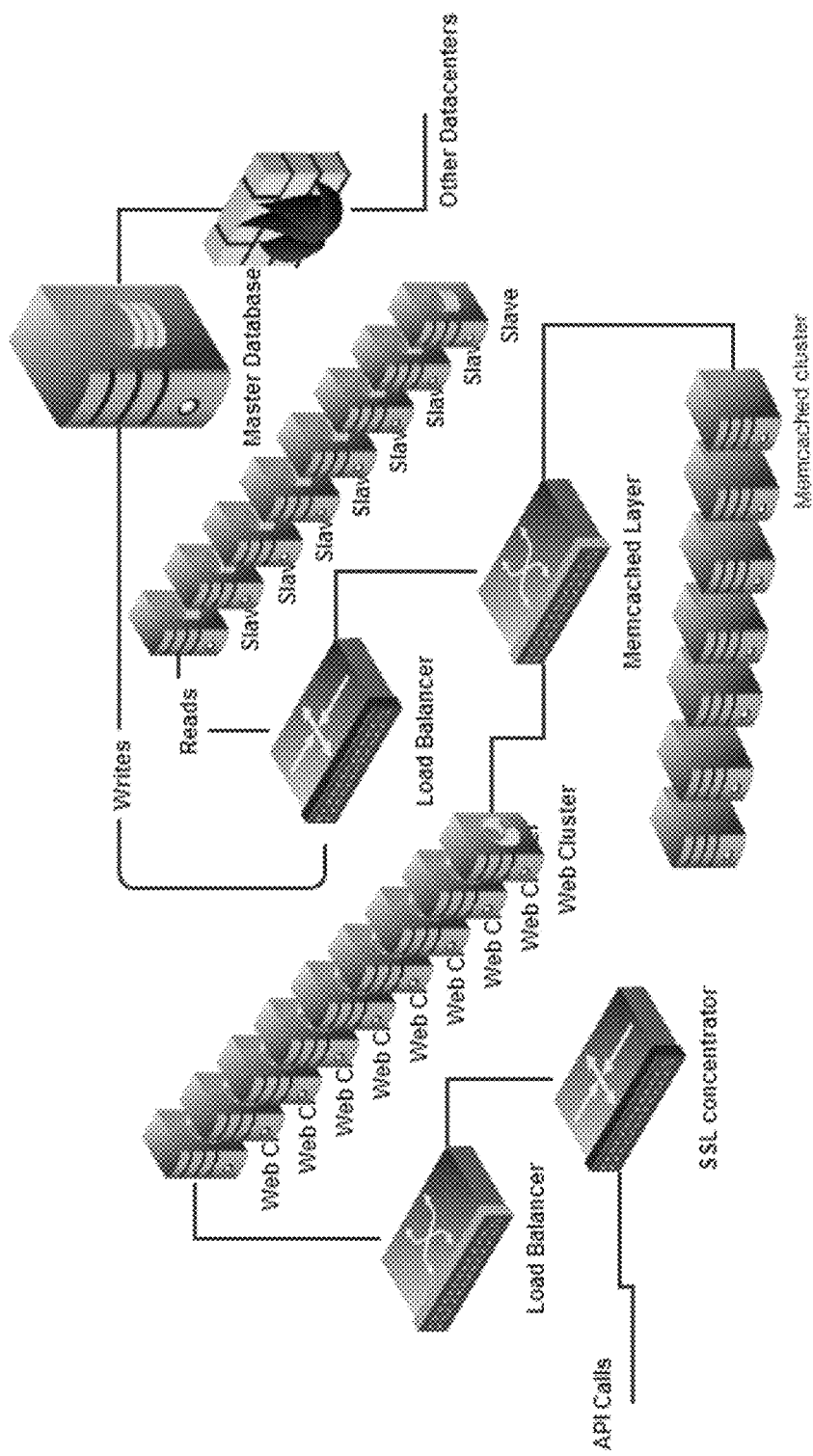
FIG. 24 shows an embodiment of a scalable high-speed delivery infrastructure to ensure extremely fast and reliable delivery of data.

Referring to FIG. 24, the system/appliance comprised a global high speed delivery module. Designed to be integrated with high volume network infrastructure and critical business processes such as routers, firewalls, load balancers, websites, customer login forms, and eCommerce systems, the system/appliance was architected with a highly redundant and scalable high-speed delivery infrastructure that ensures extremely fast and reliable delivery of data with no latency from calculations. Response time against the system/appliance was measured in microseconds with the ability to support hundreds of thousands of queries per second. Dynamic DNS ensured that customers connect to the geographically closest resource to minimize network latency.

Example 8—User Interface

This example demonstrates various aspects of user interfaces included in a system/appliance.

The system/appliance comprised a search centric towards the following search categories: (1) IP, CIDR, ASN, ORG; (2) Keyword, complex telemetry; (3) Geography. Each search would mine databases to derive network telemetry data to be used for user to navigate the search results towards result set of data, which was targeted network telemetry. Search had complex algorithms for relevance and displaying of only relevant data points inside CIDR's, AS's to allow user to navigate a broad result set and drill down to the result data pane. Search saved features that allowed to associate searches into case flows and search history features.

The system/appliance comprised one or more API modules. Referring FIG. 25 which shows an API example, API field can display full IP data records that tied risk and context around the IP. Some information in this screen may be redundant to other panes, but allowed users to have a quick view and assess the data without having to browser more panes to drill down.

Referring to FIG. 25, the system/appliance comprised one or more API modules for displaying malware information. Full Malware URL exposure included LIVE malware URL bundled with name of malware or generic terms. Mime type of the URL was displayed using simple terms. Some URL's had generic terms such as Malware, this indicates that we had not found a signature or the file was still in forensic analysis. In most cases the file could not be signed due to evasion techniques by the malware. Context rationale was also enriched with malware categories and protocols to reflect the risk.

Referring to FIG. 25, the system/appliance comprised one or more API modules for displaying DNS information. In this example, the passive DNS records spanned more than 100 million records. In this example, a limit of 500 passive DNS records was imposed for the API method. Each DNS record included the number of URL's the system had seen and how many of those were malicious. Timestamp given in the result set was based on a last time the system/appliance collected a URL from the FQDN or crawled it. The system/appliance used extensive passive DNS brute forcing to discover domains, including international domain names with special characters.

Referring to FIG. 25, the system/appliance comprised one or more API modules for displaying device information. Device type revealed the following possible devices: desktop, iPad, mobile, server, appliance, laptop, and unknown. Device type category can reveal one of the following: consumer, government, corporate, education, satellite, and unknown. The above was also accompanied by an operating system guess, if present will show the operating system name but not flavors and versioning. Example would be Linux, FreeBSD, Windows, and Mac OSX. Each device type entry had a probability score attached to it that reflected a confidence level of the device type information, ranging from 0 to 100 where 100 means 100% confidence.

The system/appliance comprised one or more API modules for displaying crawler information. Crawler data displayed content from web crawls and also display documents from web crawls. Content was organized for relevance over severity, for example code snippets, sensitive documents, passwords and other secret data will be displayed with higher priority, but also timeline impacted the display where fresh data will be pushed towards the top. In cases where allowed there were buttons to open relationship graph window that will draw the relationships and connections between the crawl content. Examples of crawl content included: TOR content, P2P content, web content (4shared.com, pastebin.com, Evernote, and DropBox etc). The system/appliance also provided very powerful organic crawl data retrieved using DNS brute force mapping. For result sets there was visualization engine that drew icons for documents and thumbnails of content to help visualize the content relevance to the user. Crawling information was displayed interactively as during search in top level pane the crawlers was triggered to do a live crawl and funnel the results into the view pane for the user in addition to already crawled data.

Figure 26:
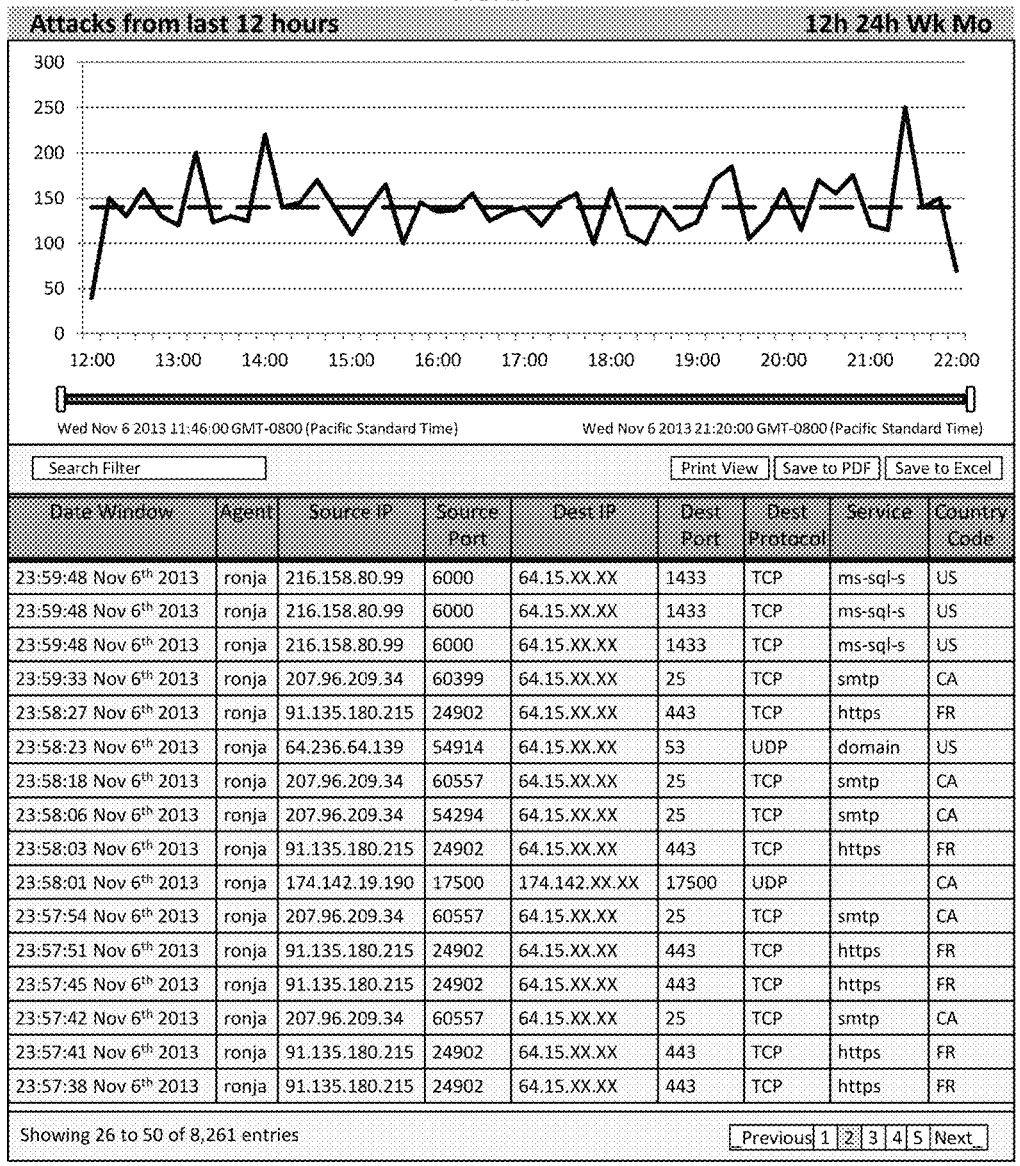
FIG. 26 shows an embodiment of a display showing data flow information.

Referring to FIG. 26, the system/appliance comprised one or more API modules for displaying data flow information. Display included IP header flow data pertinent to the search result network where the system/appliance allowed to drill down into traffic segments and show related timeline of traffic. Elements of this traffic linked to PCAP file library for the events showed and also the crawl data and other related information displays. For some installations or users, flow data had the DST IP masked in order for the system/appliance to keep the infrastructure secret in classified environments.

The system/appliance comprised one or more API modules for displaying packet capture (PCAP) information. The system/appliance constructed a global internal bittorrent system with a central tracker that has allowed us to use thousands of globally situated hardware components as PCAP repositories with a very robust and rapid delivery mechanism. Interface showing the meta information and the databased flow data from PCAP allowed user to trigger download of showed related PCAP files by simply clicking download that will trigger torrent download in backend. Powerful JavaScript libraries visualized the PCAP files in the window pane and allowed to dispatch the window to a multi display setup for deep analysis. Download locally was allowed in some environments directly from the interface or using the torrent magnet link presented in the pane. T The system/appliance comprised one or more API modules for displaying packet capture here was a storage tagging capability, due to high volume the system kept PCAP for maximum of 90 days and in some instances as short as 72 hours. (Note that this time period can be configured based on the need, not limited to 72 hours or 90 days.) Interface allowed to tag PCAP for longer storage and allowed for centralized storage of the PCAP.

The system/appliance comprised one or more API modules for displaying any information in a mode of geographic information system (GIS). GIS mode opened in small window that allowed to be detached into multi display setup and to run full screen or not. The geography rendering used GPU on client computer so powerful GPU was needed for clients. Widgets populated the GIS view that allowed for full interaction with the datasets from the main window. Several layer types and layover data were possible combined with drawing of polygons and placements of icons and pins attached to data and analyst notes. User can click the GIS view and get full screen or medium screen GIS view of the result set with full screen overlays showing different layer pans for each data component the system provided. GIS view provided full analyst layers that allowed analyst subject comments and data creation and view the previous data, and link external sources of data and open source data. GIS overlay also allowed for user to drop points of interest and write up layer information to enrich the already displayed data. GIS display also allowed to drag and drop certain objects and icons that were intelligence related tied to data sources or other knowledge systems. Support overlay allowed to draw polygons and organize them into layers bundled with data sources and analyst comments.

The system/appliance comprised one or more API modules for counter intelligence analyst section that allowed to tap into data sources and also full interaction with analyst using the system/appliance; e.g., differential analysis on targets and subjects surrounding it, relationship disclosure and ties into organizations and geopolitical arenas to reveal ownerships and infrastructure control, link analysis between all parties discovered using data mining and other associated data from the system and from third parties, as well as open source intelligence.

Example 9—Passive DNS Engine

This example describes various aspects of a passive DNA engine included in a system/appliance.

A passive DNA engine provides historical DNS mapping from top level TLD to subdomains. Enrich passive DNS data with other elements for factoring attribution to improve risk scoring methodologies and enable investigative analyst capabilities. In this example, daily domain registration/changes monitor 1.5 Mill Events per 24 hour. DNS mapping tool traverses FQDN's mapping sub domains and folders. Furthermore, URL Honeypot (URLpot) agents and other system infrastructure are used as collection points for DNS lookups. Sandboxing technology for malware attribution contributes to data collection for DNS Diversified collection model accommodates most adversary vectors cross industrial verticals, enabling global reach; including mail parsing uncovering malicious URL's by using public shared email databases (mailing lists) and third party feeds; FQDN monitoring and traversing using table of paths and DNS mapping tools; advanced inference A.I. derived from historical paths and crawl data; Log parsing from public domain logs and vendor log fees; Internal log feeds from the global infrastructure; Attribution platform and crawlers to identify cross related information to enable enrichment of passive DNS data.

Figure 27:
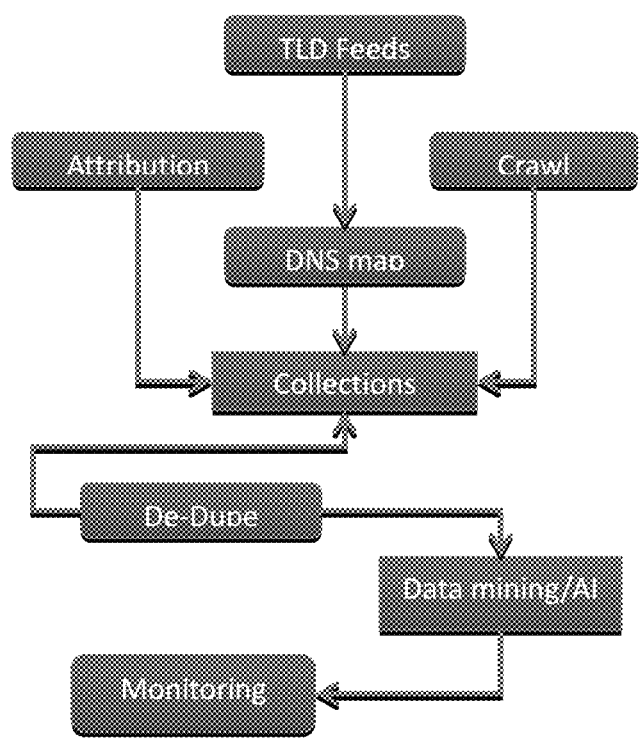
FIG. 27 shows an embodiment of passive DNS analysis.

Referring FIG. 27, the passive DNS engine comprises an analysis module and/or DNS processing computational complex due to attribution enrichment, future Hadoop system to scale needed. The features include: DNS collection done from multi prong agents and cross related data sources; De-dupe of passive DNS data feeds and enrichment data collection; Data mining and cross correlation between hackers, fast flux geographical hackers and adversaries using several approaches; Constant DNS monitoring on discovered paths and correlated data using crawling technology and robust high speed DNS servers that enables 5 million DNS queries per second.

The passive DNS engine comprises product enrichment. All passive DNS data is production ready milliseconds after discovery, and enrichment data takes from 1 second to 10 second depending on the size of data discovered. The data includes: a category and protocols (Passive DNS), API method "IPVIEW" is enriched with Passive DNS details down to the level of each record discovered. Analyst data will not be presented in the API methods, but available in other products. Furthermore, custom factoring assessment overlays with already 1500 factoring tying back into the attribution and enrichment data to enable cybercrime related scoring algorithms.

In an embodiment, the size of data was as follows. Passive DNS records to date were about 123 Million. Daily DNS discovery was about 500,000. Hacker groups tied to Passive DNS was 231. Number of subdomains was 66 Million. Countries TLD supported was 81. Number of DNS servers used for recursion was 12,000.

Example 10—URL Honeypot

This example describes various aspects of a URL honeypot (URLPot) included in a system/appliance. There are several collection points globally spread. Daily domain registration/changes monitor 1.5 Million events per 24 hour. DNS mapping tool traverses FQDN's mapping sub domains and folders. Brute crawler/spider traverses known folders/paths towards FQDN. Advanced diversified sandboxing of Malware combined with third party scanners ranges from online API's to UNIX based software.

URLPot has full support for the new internationalized domain names. The URLPot supports various languages: Cyrillic script, Arabic script, Brahmic script, Chinese Characters, Korean scripts and various others. Support for all punycode prefixes such as xn—using ToASCII and ToUnicode in URLPot Agents and data mining systems. The system/appliance has designed crawlers to detect ASCII spoofing that is widespread among the implementation where malware sites are masked behind similarity in letters such as Cyrillic small letter a can look identical to Unicode character U+0061 (Latin small letter a). For instance, a url http://xn--12c9c1c.zz.mu leads to a site where you can clearly see malware payload.

In a large-scale experimental case, the data metric is described as follows. Passive DNS records to date were 121 Million. Malware URL was 63 Million records during a 7 day period. Malware Samples was 612,000 (downloaded binaries). Malware unknown by major vendors was 43,000 during a week. URL's not detected by the system/appliance needing deep analysis was 62,000 during a week. Number of countries running URLPOT was 22.

What is claimed is:

1. An electronic appliance on a computer network for enhancing computer security, the appliance comprising:
   (a) a data storage configured to store a template of risky addresses, the risky addresses comprising a first numerical address and a portion of a second numerical address;
   (b) a receiving module configured to receive data packets from two or more computing devices at two or more distinct geolocations;
   (c) a detection module configured to:
      1) analyze addresses in the data packets to identify a threat address, wherein the analysis: (i) is based on one or more artificial intelligence algorithms without using any of the following: a deep packet inspection, a signature, and a virtual network machine; and (ii) comprises evaluating a plurality of risk factors of the addresses in the data packets, deriving a single actionable risk score, and determining the threat address based on the single actionable risk score; wherein the analysis further comprises: identifying a source address in the data packets, identifying and tracking a location of the data packets, exploring a history of past analyses, and associating a risk category with the data packets;
      2) block one or more risky data packets associated with the threat address; or remove the one or more risky data packets and generate one or more safe data packets; and
      3) update the template of the risky addresses based on results of the analysis; and
   (d) a transmission module configured to transmit the one or more safe data packets to a destination computing device.

2. The appliance of claim 1, wherein the data storage is further configured to store a template of a risky activity, the risky activity comprising one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication.

3. The appliance of claim 1, wherein the risky addresses comprise one or more of the following: an Internet protocol address, a domain name, a portion of a domain name, and an email address.

4. The appliance of claim 1, wherein one of the two or more computing devices is a remote device on the computer network, a local device on the computer network, or a component of the appliance.

5. The appliance of claim 1, wherein the data packets are sent to the receiving module under a single communication protocol or under different communication protocols.

6. The appliance of claim 1, wherein the analyzing the addresses in the data packets comprises analyzing simultaneously two or more data packets.

7. The appliance of claim 1, wherein the one or more artificial intelligence algorithms comprise one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling.

8. The appliance of claim 1, further comprising an alert module configured to generate an alert when the threat address is identified, the alert comprising one or more of the following: a visual alert, a sound alert, a text alert, and an email alert.

9. An electronic appliance on a computer network for enhancing computer security, the appliance comprising:
   (a) a communication module configured to allow the appliance to communicate with one or more honeypot computers;
   (b) a data storage configured to store information of risky addresses, wherein the information is provided by the one or more honeypot computers regularly or irregularly and the risky addresses comprise a first numerical address and a portion of a second numerical address;
   (c) a receiving module configured to receive data packets from two or more computing devices at two or more distinct geolocations;
   (d) a detection module configured to:
      1) analyze addresses in the data packets to identify a threat address, wherein the analysis: (i) is based on one or more artificial intelligence algorithms without using any of the following: a deep packet inspection, a signature, and a virtual network machine; and (ii) comprises evaluating a plurality of risk factors of the addresses in the data packets, deriving a single actionable risk score, and determining the threat address based on the single actionable risk score; wherein the analysis further comprises: identifying a source address in the data packets, identifying and tracking a location of the data packets, exploring a history of past analyses, and associating a risk category with the data packets;
      2) block one or more risky data packets associated with the threat address; or remove the one or more risky data packets and generate one or more safe data packets; and
      3) update the information of the risky addresses based on results of the analysis; and
   (e) a transmission module configured to transmit the one or more safe data packets to a destination computing device.

10. The appliance of claim 9, wherein the data storage is further configured to store information of a risky activity, the risky activity comprising one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication.

11. The appliance of claim 9, wherein the risky addresses comprise one or more of the following: an Internet protocol address, a domain name, a portion of a domain name, and an email address.

12. The appliance of claim 9, wherein one of the two or more computing devices is a remote device on the computer network, a local device on the computer network, or a component of the appliance.

13. The appliance of claim 9, wherein the data packets are sent to the receiving module under a single communication protocol or under different communication protocols.

14. The appliance of claim 9, wherein the analyzing the addresses in the data packets comprises analyzing simultaneously two or more data packets.

15. The appliance of claim 9, wherein the one or more artificial intelligence algorithms comprise one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling.

16. The appliance of claim 9, further comprising an alert module configured to generate an alert when the threat address is identified, the alert comprising one or more of the following: a visual alert, a sound alert, a text alert, and an email alert.

17. The appliance of claim 9, further comprising an analytics module configured to visualize and summarize one or more risky activities happening within a period of time.

18. A system on a computer network for enhancing computer security, the system comprising:
   (a) a digital signal processor;
   (b) memory; and
   (c) an operating system configured to execute computer instructions to create a software application comprising:
      1) a database configured to store a template of risky addresses, the risky addresses comprising a first numerical address and a portion of a second numerical address;
      2) a receiving module configured to receive one or more data packets from two or more computing devices at two or more distinct geolocations;
      3) a detection module configured to:
         i) analyze addresses in the data packets to identify a threat address, wherein the analysis: (A) is based on one or more artificial intelligence algorithms without using any of the following: a deep packet inspection, a signature, and a virtual network machine, and (B) comprises evaluating a plurality of risk factors of the addresses in the data packets, deriving a single actionable risk score, and determining the threat address based on the single actionable risk score; wherein the analysis further comprises: identifying a source address in the data packets, identifying and tracking a location of the data packets, exploring a history of past analyses, and associating a risk category with the data packets;
         ii) block one or more risky data packets associated with the threat address; or remove the one or more risky data packets and generate one or more safe data packets; and
         iii) update the template of the risky addresses based on results of the analysis; and
      4) a transmission module configured to transmit the one or more safe data packets to a destination computing device.

19. The system of claim 18, wherein the database is further configured to store a template of a risky activity, the risky activity comprising one or more of the following: virus, virus distribution, phishing, intrusion, an attack, malware, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication.

20. The system of claim 18, wherein the risky addresses comprise one or more of the following: an Internet protocol address, a domain name, a portion of a domain name, and an email address.

21. The system of claim 18, wherein one of the two or more computing devices is a remote device on the computer network, a local device on the computer network, or a component of the system.

22. The system of claim 18, wherein the data packets are sent to the receiving module under a single communication protocol or under different communication protocols.

23. The system of claim 18, wherein the one or more artificial intelligence algorithms comprise one or more of the following: pattern recognition, inferential algorithm, planning algorithm, heuristic algorithm, probabilistic reasoning, logical algorithm, search algorithm, decision tree algorithm, red-black tree algorithm, Levensthein algorithm, CacheHill algorithm, PCRE algorithm, Oliver decision graph algorithm, genetic algorithm, learning algorithm, self-teaching algorithm, self-modifying algorithm, optimization, and graphical modeling.

24. The system of claim 18, wherein the software application further comprises:
    (a) an alert module configured to generate an alert when the threat address is identified, the alert comprising one or more of the following: a visual alert, a sound alert, a text alert, and an email alert; or
    (b) an analytics module configured to visualize and summarize one or more risky activities happening within a period of time.

\* \* \* \* \*